US012292121B2

(12) United States Patent
Berryhill

(10) Patent No.: US 12,292,121 B2
(45) Date of Patent: May 6, 2025

(54) VALVE MEMBER INCLUDING CAVITY, AND RELATED ASSEMBLIES, SYSTEMS, AND METHODS

(71) Applicant: Vulcan Industrial Holdings, LLC, Houston, TX (US)

(72) Inventor: Benjamin Berryhill, Houston, TX (US)

(73) Assignee: Vulcan Industrial Holdings, LLC, Houston, TX (US)

( * ) Notice: Subject to any disclaimer, the term of this patent is extended or adjusted under 35 U.S.C. 154(b) by 0 days.

(21) Appl. No.: 18/775,721

(22) Filed: Jul. 17, 2024

(65) Prior Publication Data

US 2025/0052325 A1  Feb. 13, 2025

Related U.S. Application Data

(60) Provisional application No. 63/518,840, filed on Aug. 10, 2023.

(51) Int. Cl.
*F16K 1/36* (2006.01)
*F16K 1/46* (2006.01)
*F16K 15/02* (2006.01)

(52) U.S. Cl.
CPC ............... *F16K 1/36* (2013.01); *F16K 1/46* (2013.01); *F16K 15/026* (2013.01)

(58) Field of Classification Search
CPC ..................................... F16K 1/36; F16K 1/46
See application file for complete search history.

(56) References Cited

U.S. PATENT DOCUMENTS

| 1,316,539 | A | 9/1919 | Ford |
| 1,364,848 | A | 1/1921 | Walsh |
| 1,576,269 | A | 3/1926 | Durant |
| 1,595,459 | A | 8/1926 | Durant |
| 1,671,139 | A | 5/1928 | Wilson |

(Continued)

FOREIGN PATENT DOCUMENTS

| CN | 2556355 Y | 6/2003 |
| CN | 201149099 | 11/2008 |

(Continued)

OTHER PUBLICATIONS

U.S. Appl. No. 16/814,267.

(Continued)

*Primary Examiner* — Eric Keasel
(74) *Attorney, Agent, or Firm* — Womble Bond Dickinson (US) LLP

(57) ABSTRACT

A valve member, and related assemblies, systems, and methods, for a high-power pump may include a valve body having a valve head. The valve head may have a seal engaging surface positioned to receive a valve seal. The seal engaging surface may have a first axial position relative to a valve body axis. The valve head further may have a cavity at least partially defining a cavity interior. The cavity interior may extend between a cavity opening and a cavity end. The cavity interior may extend from the cavity opening at a second axial position spaced from the first axial position of the seal engaging surface and at least partially through the first axial position to the cavity end at a third axial position, thereby to reduce mass of the valve member and substantially maintain the strength of the valve head.

16 Claims, 19 Drawing Sheets

(56) References Cited

U.S. PATENT DOCUMENTS

| | | | |
|---|---|---|---|
| 1,836,068 | A * | 12/1931 | Goldsberry ............ F04B 53/10 137/902 |
| 1,873,318 | A | 8/1932 | Eason |
| 1,914,737 | A | 6/1933 | Elms |
| 1,948,628 | A | 2/1934 | Penick |
| 1,963,684 | A | 6/1934 | Shimer |
| 1,963,685 | A | 6/1934 | Shimer |
| 2,011,547 | A | 8/1935 | Campbell |
| 2,069,443 | A | 2/1937 | Hill |
| 2,103,504 | A | 12/1937 | White |
| 2,143,399 | A | 1/1939 | Abercrombie |
| 2,146,709 | A | 2/1939 | Bird |
| 2,151,442 | A | 3/1939 | Hardy |
| 2,163,472 | A | 6/1939 | Shimer |
| 2,252,488 | A | 8/1941 | Bierend |
| 2,304,991 | A | 12/1942 | Foster |
| 2,506,128 | A | 5/1950 | Ashton |
| 2,539,996 | A | 1/1951 | Gleitz |
| 2,547,831 | A | 4/1951 | Mueller |
| 2,713,522 | A | 7/1955 | Lorenz |
| 2,719,737 | A | 10/1955 | Fletcher |
| 2,745,631 | A | 5/1956 | Shellman |
| 2,756,960 | A | 7/1956 | Church |
| 2,898,082 | A | 8/1959 | Almen |
| 2,969,951 | A | 1/1961 | Walton |
| 2,977,874 | A | 4/1961 | Ritzerfeld et al. |
| 2,982,515 | A | 5/1961 | Clinton |
| 2,983,281 | A | 5/1961 | Bynum |
| 3,049,082 | A | 8/1962 | Barry |
| 3,053,500 | A | 9/1962 | Atkinson |
| 3,063,467 | A | 11/1962 | Roberts, Jr. |
| 3,224,817 | A | 12/1965 | Carter |
| 3,276,390 | A | 10/1966 | Bloudoff |
| 3,277,837 | A | 10/1966 | Pangburn |
| 3,288,475 | A | 11/1966 | Benoit |
| 3,459,363 | A | 8/1969 | Miller |
| 3,474,808 | A | 10/1969 | Elliott |
| 3,483,885 | A | 12/1969 | Leathers |
| 3,489,098 | A | 1/1970 | Roth |
| 3,489,170 | A | 1/1970 | Leman |
| 3,512,787 | A | 5/1970 | Kennedy |
| 3,590,387 | A | 6/1971 | Landis |
| 3,640,501 | A | 2/1972 | Walton |
| 3,698,726 | A | 10/1972 | Schettler |
| 3,809,508 | A | 5/1974 | Uchiyama |
| 3,847,511 | A | 11/1974 | Cole |
| 3,907,307 | A | 9/1975 | Maurer |
| 3,931,755 | A | 1/1976 | Hatridge |
| 4,044,834 | A | 8/1977 | Perkins |
| 4,076,212 | A | 2/1978 | Leman |
| 4,184,814 | A | 1/1980 | Parker |
| 4,219,204 | A | 8/1980 | Pippert |
| 4,277,229 | A | 7/1981 | Pacht |
| 4,306,728 | A | 12/1981 | Huperz |
| 4,331,741 | A | 5/1982 | Wilson |
| 4,395,050 | A | 7/1983 | Wirz |
| 4,398,731 | A | 8/1983 | Gorman |
| 4,440,404 | A | 4/1984 | Roach |
| 4,500,267 | A | 2/1985 | Birdwell |
| 4,508,133 | A | 4/1985 | Hamid |
| 4,518,359 | A | 5/1985 | Yao-Psong |
| 4,527,806 | A | 7/1985 | Ungchusri |
| 4,565,297 | A | 1/1986 | Korner |
| 4,662,392 | A | 5/1987 | Vadasz |
| 4,754,950 | A | 7/1988 | Tada |
| 4,763,876 | A | 8/1988 | Oda |
| 4,768,933 | A | 9/1988 | Stachowiak |
| 4,770,206 | A | 9/1988 | Sjoberg |
| 4,807,890 | A | 2/1989 | Gorman |
| 4,811,758 | A | 3/1989 | Piper |
| 4,861,241 | A | 8/1989 | Gamboa |
| 4,872,395 | A | 10/1989 | Bennitt et al. |
| 4,878,815 | A | 11/1989 | Stachowiak |
| 4,919,719 | A | 4/1990 | Abe |
| 4,951,707 | A | 8/1990 | Johnson |
| 5,020,490 | A | 6/1991 | Seko |
| 5,052,435 | A | 10/1991 | Crudup |
| 5,061,159 | A | 10/1991 | Pryor |
| 5,062,450 | A | 11/1991 | Bailey |
| 5,073,096 | A | 12/1991 | King et al. |
| 5,080,713 | A | 1/1992 | Ishibashi |
| 5,088,521 | A | 2/1992 | Johnson |
| 5,127,807 | A | 7/1992 | Eslinger |
| 5,131,666 | A | 7/1992 | Hutchens |
| 5,135,238 | A | 8/1992 | Wells |
| 5,149,107 | A | 9/1992 | Maringer |
| 5,201,491 | A | 4/1993 | Domangue |
| 5,209,495 | A | 5/1993 | Palmour |
| 5,249,600 | A | 10/1993 | Blume |
| 5,267,736 | A | 12/1993 | Pietsch |
| 5,273,570 | A | 12/1993 | Sato |
| 5,299,812 | A | 4/1994 | Brestel |
| 5,314,659 | A | 5/1994 | Hidaka |
| 5,362,215 | A | 11/1994 | King |
| 5,382,057 | A | 1/1995 | Richter |
| 5,478,048 | A | 12/1995 | Salesky |
| 5,493,951 | A | 2/1996 | Harrison |
| 5,533,245 | A | 7/1996 | Stanton |
| 5,540,570 | A | 7/1996 | Schuller |
| 5,572,920 | A | 11/1996 | Kennedy |
| 5,626,345 | A | 5/1997 | Wallace |
| 5,636,688 | A | 6/1997 | Bassinger |
| 5,674,449 | A | 10/1997 | Liang |
| 5,834,664 | A | 11/1998 | Aonuma |
| 5,859,376 | A | 1/1999 | Ishibashi |
| 5,895,517 | A | 4/1999 | Kawamura |
| 5,924,853 | A | 7/1999 | Pacht |
| 5,949,003 | A | 9/1999 | Aoki |
| 6,139,599 | A | 10/2000 | Takahashi |
| 6,200,688 | B1 | 3/2001 | Liang |
| 6,209,445 | B1 | 4/2001 | Roberts, Jr |
| 6,328,312 | B1 | 12/2001 | Schmitz |
| 6,340,377 | B1 | 1/2002 | Kawata |
| 6,382,940 | B1 | 5/2002 | Blume |
| 6,436,338 | B1 | 8/2002 | Qiao |
| 6,446,939 | B1 | 9/2002 | Hoppe |
| 6,460,620 | B1 | 10/2002 | LaFleur |
| 6,464,749 | B1 | 10/2002 | Kawase |
| 6,482,275 | B1 | 11/2002 | Qiao |
| 6,485,678 | B1 | 11/2002 | Liang |
| 6,544,012 | B1 | 4/2003 | Blume |
| 6,571,684 | B1 | 6/2003 | Nov et al. |
| 6,623,259 | B1 | 9/2003 | Blume |
| 6,634,236 | B2 | 10/2003 | Mars |
| 6,641,112 | B2 | 11/2003 | Antoff |
| 6,695,007 | B2 | 2/2004 | Vicars |
| 6,702,905 | B1 | 3/2004 | Qiao |
| 6,880,802 | B2 | 4/2005 | Hara |
| 6,910,871 | B1 | 6/2005 | Blume |
| 6,916,444 | B1 | 7/2005 | Liang |
| 6,951,165 | B2 | 10/2005 | Kuhn |
| 6,951,579 | B2 | 10/2005 | Koyama |
| 6,955,181 | B1 | 10/2005 | Blume |
| 6,959,916 | B2 | 11/2005 | Chigasaki |
| 7,000,632 | B2 | 2/2006 | McIntire |
| 7,036,824 | B2 | 5/2006 | Kunz |
| 7,144,440 | B2 | 12/2006 | Ando |
| 7,168,440 | B1 | 1/2007 | Blume |
| 7,186,097 | B1 | 3/2007 | Blume |
| 7,222,837 | B1 | 5/2007 | Blume |
| 7,290,560 | B2 | 11/2007 | Orr |
| 7,296,591 | B2 | 11/2007 | Moe |
| 7,335,002 | B2 | 2/2008 | Vicars |
| 7,341,435 | B2 | 3/2008 | Vicars |
| 7,398,955 | B2 | 7/2008 | Weingarten |
| 7,506,574 | B2 | 3/2009 | Jensen |
| 7,513,483 | B1 | 4/2009 | Blume |
| 7,513,759 | B1 | 4/2009 | Blume |
| 7,562,675 | B2 | 7/2009 | Nomichi et al. |
| 7,611,590 | B2 | 11/2009 | Liang |
| 7,681,589 | B2 | 3/2010 | Schwegman |
| 7,682,471 | B2 | 3/2010 | Levin |
| 7,726,026 | B1 | 6/2010 | Blume |
| 7,748,310 | B2 | 7/2010 | Kennedy |

(56) References Cited

U.S. PATENT DOCUMENTS

| | | |
|---|---|---|
| 7,754,142 B2 | 7/2010 | Liang |
| 7,754,143 B2 | 7/2010 | Qiao |
| 7,757,396 B2 | 7/2010 | Sawada |
| 7,789,133 B2 | 9/2010 | McGuire |
| 7,789,161 B2 | 9/2010 | Riley |
| 7,793,913 B2 | 9/2010 | Hara |
| 7,828,053 B2 | 11/2010 | McGuire |
| 7,845,413 B2 | 12/2010 | Shampine |
| 7,861,738 B2 | 1/2011 | Erbes |
| 7,866,346 B1 | 1/2011 | Walters |
| 7,891,374 B2 | 2/2011 | Vicars |
| 7,954,510 B2 | 6/2011 | Schwegman |
| 7,992,635 B2 | 8/2011 | Cherewyk |
| 8,069,923 B2 | 12/2011 | Blanco |
| 8,075,661 B2 | 12/2011 | Chen |
| 8,083,506 B2 | 12/2011 | Maki |
| 8,100,407 B2 | 1/2012 | Stanton |
| 8,141,849 B1 | 3/2012 | Blume |
| 8,147,227 B1 | 4/2012 | Blume |
| 8,181,970 B2 | 5/2012 | Smith |
| 8,261,771 B2 | 9/2012 | Witkowski |
| 8,287,256 B2 | 10/2012 | Shafer |
| 8,291,927 B2 | 10/2012 | Johnson |
| 8,317,498 B2 * | 11/2012 | Gambier ............. F04B 53/1097 417/454 |
| 8,375,980 B2 | 2/2013 | Higashiyama |
| 8,376,723 B2 | 2/2013 | Kugelev |
| 8,402,880 B2 | 3/2013 | Patel |
| 8,430,075 B2 | 4/2013 | Qiao |
| D687,125 S | 7/2013 | Hawes |
| 8,479,700 B2 | 7/2013 | Qiao |
| 8,511,218 B2 | 8/2013 | Cordes |
| 8,522,667 B2 | 9/2013 | Clemens |
| 8,528,585 B2 | 9/2013 | McGuire |
| 8,529,230 B1 | 9/2013 | Colley, III et al. |
| 8,534,691 B2 | 9/2013 | Schaffer |
| 8,613,886 B2 | 12/2013 | Qiao |
| D700,682 S | 3/2014 | Bayyouk et al. |
| 8,662,864 B2 | 3/2014 | Bayyouk |
| 8,662,865 B2 | 3/2014 | Bayyouk |
| 8,668,470 B2 | 3/2014 | Bayyouk |
| 8,707,853 B1 | 4/2014 | Dille |
| 8,733,313 B2 | 5/2014 | Sato |
| 8,784,081 B1 | 7/2014 | Blume |
| 8,828,312 B2 | 9/2014 | Yao |
| 8,870,554 B2 | 10/2014 | Kent |
| 8,893,806 B2 | 11/2014 | Williamson |
| 8,894,392 B1 | 11/2014 | Blume |
| 8,915,722 B1 | 12/2014 | Blume |
| 8,940,110 B2 | 1/2015 | Qiao |
| 8,978,695 B2 | 3/2015 | Witkowkski |
| 8,998,593 B2 | 4/2015 | Vicars |
| 9,010,412 B2 | 4/2015 | McGuire |
| 9,103,448 B2 | 8/2015 | Witkowski |
| 9,150,945 B2 | 10/2015 | Bei |
| 9,157,136 B2 | 10/2015 | Chou |
| 9,157,468 B2 | 10/2015 | Dille |
| 9,206,910 B2 | 12/2015 | Kahn |
| D748,228 S | 1/2016 | Bayyouk |
| 9,243,630 B2 | 1/2016 | Foote |
| 9,260,933 B2 | 2/2016 | Artherholt |
| 9,261,195 B2 | 2/2016 | Toynbee |
| 9,273,543 B2 | 3/2016 | Baca |
| 9,284,631 B2 | 3/2016 | Radon |
| 9,284,953 B2 | 3/2016 | Blume |
| 9,285,040 B2 | 3/2016 | Forrest |
| 9,291,274 B1 | 3/2016 | Blume |
| 9,322,243 B2 | 4/2016 | Baca |
| 9,334,547 B2 | 5/2016 | Qiao |
| 9,340,856 B2 | 5/2016 | Otobe |
| 9,359,921 B2 | 6/2016 | Hashimoto |
| 9,365,913 B2 | 6/2016 | Imaizumi |
| 9,371,919 B2 | 6/2016 | Forrest |
| 9,376,930 B2 | 6/2016 | Kim |
| 9,377,019 B1 | 6/2016 | Blume |
| 9,382,940 B2 | 7/2016 | Lee |
| 9,416,887 B2 | 8/2016 | Blume |
| 9,435,454 B2 | 9/2016 | Blume |
| 9,441,776 B2 | 9/2016 | Bryne |
| 9,458,743 B2 | 10/2016 | Qiao |
| 9,464,730 B2 | 10/2016 | Bihlet |
| 9,500,195 B2 | 11/2016 | Blume |
| 9,506,382 B2 | 11/2016 | Yeager |
| 9,528,508 B2 | 12/2016 | Thomeer |
| 9,528,631 B2 | 12/2016 | McCarty |
| 9,534,473 B2 | 1/2017 | Morris |
| 9,534,691 B2 | 1/2017 | Miller |
| 9,556,761 B2 | 1/2017 | Koyama |
| 9,568,138 B2 | 2/2017 | Arizpe |
| 9,605,767 B2 | 3/2017 | Chhabra |
| 9,631,739 B2 | 4/2017 | Belshan |
| D787,029 S | 5/2017 | Bayyouk |
| 9,638,075 B2 | 5/2017 | Qiao |
| 9,638,337 B2 | 5/2017 | Witkowski |
| 9,650,882 B2 | 5/2017 | Zhang |
| 9,651,067 B2 | 5/2017 | Beschorner |
| 9,689,364 B2 | 6/2017 | Mack |
| 9,695,812 B2 | 7/2017 | Dille |
| 9,732,746 B2 | 8/2017 | Chandrasekaran |
| 9,732,880 B2 | 8/2017 | Haines |
| 9,745,968 B2 | 8/2017 | Kotapish |
| 9,784,262 B2 | 10/2017 | Bayyouk |
| 9,791,082 B2 | 10/2017 | Baxter et al. |
| 9,822,894 B2 | 11/2017 | Bayyouk |
| 9,845,801 B1 | 12/2017 | Shek |
| 9,857,807 B2 | 1/2018 | Baca |
| 9,915,250 B2 | 3/2018 | Brasche |
| 9,920,615 B2 | 3/2018 | Zhang |
| 9,927,036 B2 | 3/2018 | Dille |
| 9,945,362 B2 | 4/2018 | Skurdalsvold |
| 9,945,375 B2 | 4/2018 | Zhang |
| 9,989,044 B2 | 6/2018 | Bayyouk |
| 10,029,540 B2 | 7/2018 | Seeger |
| D826,281 S | 8/2018 | Mead |
| 10,041,490 B1 | 8/2018 | Jahnke |
| 10,082,137 B2 | 9/2018 | Graham |
| 10,094,478 B2 | 10/2018 | Iijima |
| 10,113,679 B2 | 10/2018 | Shuck |
| 10,184,470 B2 | 1/2019 | Barnett, Jr. |
| 10,190,197 B2 | 1/2019 | Baker |
| 10,197,172 B2 | 2/2019 | Fuller |
| 10,215,172 B2 | 2/2019 | Wood |
| 10,221,848 B2 | 3/2019 | Bayyouk |
| 10,240,594 B2 | 3/2019 | Barnhouse, Jr. |
| 10,240,597 B2 | 3/2019 | Bayyouk |
| 10,247,182 B2 | 4/2019 | Zhang |
| 10,247,184 B2 | 4/2019 | Chunn |
| 10,273,954 B2 | 4/2019 | Brown |
| 10,288,178 B2 | 5/2019 | Nowell |
| 10,316,832 B2 | 6/2019 | Byrne |
| 10,330,097 B2 | 6/2019 | Skurdalsvold |
| 10,344,757 B1 | 7/2019 | Stark |
| 10,364,487 B2 | 7/2019 | Park |
| D856,498 S | 8/2019 | Bayyouk |
| 10,378,535 B2 | 8/2019 | Mahmood |
| 10,378,538 B2 | 8/2019 | Blume |
| 10,378,659 B2 | 8/2019 | Scott et al. |
| 10,393,113 B2 | 8/2019 | Wagner |
| 10,400,764 B2 | 9/2019 | Wagner |
| 10,415,348 B2 | 9/2019 | Zhang |
| D861,834 S | 10/2019 | Foster et al. |
| 10,428,406 B2 | 10/2019 | Yao |
| 10,428,949 B2 | 10/2019 | Miller |
| 10,436,193 B1 | 10/2019 | Jahnke |
| 10,443,456 B2 | 10/2019 | Hoeg |
| 10,465,680 B1 | 11/2019 | Guerra |
| 10,472,702 B2 | 11/2019 | Yeh |
| 10,487,528 B2 | 11/2019 | Pozybill |
| D871,455 S | 12/2019 | Crowsley |
| 10,519,070 B2 | 12/2019 | Sanders |
| 10,519,950 B2 | 12/2019 | Foster |
| 10,526,862 B2 | 1/2020 | Witkowski |
| 10,527,036 B2 | 1/2020 | Blume |
| 10,557,446 B2 | 2/2020 | Stecklein |

(56) References Cited

U.S. PATENT DOCUMENTS

| | | |
|---|---|---|
| 10,557,576 B2 | 2/2020 | Witkowski |
| 10,557,580 B2 | 2/2020 | Mendyk |
| 10,563,494 B2 | 2/2020 | Graham |
| 10,563,649 B2 | 2/2020 | Zhang |
| 10,570,491 B2 | 2/2020 | Hong |
| 10,576,538 B2 | 3/2020 | Kato |
| 10,577,580 B2 | 3/2020 | Abbas |
| 10,577,850 B2 | 3/2020 | Ozkan |
| 10,591,070 B2 | 3/2020 | Nowell |
| 10,605,374 B2 | 3/2020 | Takaki |
| D880,661 S | 4/2020 | Foster et al. |
| 10,626,856 B2 | 4/2020 | Coldren |
| 10,633,925 B2 | 4/2020 | Panda |
| 10,634,260 B2 | 4/2020 | Said |
| 10,640,854 B2 | 5/2020 | Hu |
| 10,655,623 B2 | 5/2020 | Blume |
| 10,663,071 B2 | 5/2020 | Bayyouk |
| 10,670,013 B2 | 6/2020 | Foster |
| 10,670,153 B2 | 6/2020 | Filipow |
| 10,670,176 B2 | 6/2020 | Byrne |
| 10,677,109 B2 | 6/2020 | Qiao |
| 10,677,240 B2 | 6/2020 | Graham |
| 10,677,365 B2 | 6/2020 | Said |
| 10,711,567 B2 | 7/2020 | Buckley |
| 10,711,754 B2 | 7/2020 | Nelson |
| 10,711,778 B2 | 7/2020 | Buckley |
| 10,718,441 B2 | 7/2020 | Myers |
| 10,731,523 B2 | 8/2020 | Qu |
| 10,731,643 B2 | 8/2020 | DeLeon |
| 10,738,928 B2 | 8/2020 | Arizpe |
| 10,753,490 B2 | 8/2020 | Fuller |
| 10,753,495 B2 | 8/2020 | Bayyouk |
| 10,767,520 B1 | 9/2020 | Hattiangadi |
| 10,771,567 B2 | 9/2020 | Sundaresan |
| 10,774,828 B1 | 9/2020 | Smith |
| 10,781,803 B2 | 9/2020 | Kumar |
| 10,787,725 B2 | 9/2020 | Fujieda |
| 10,801,627 B2 | 10/2020 | Warbey |
| 10,808,488 B2 | 10/2020 | Witkowski |
| 10,808,851 B1 | 10/2020 | Surjaatmadja et al. |
| 10,815,988 B2 | 10/2020 | Buckley |
| 10,815,989 B2 | 10/2020 | Naedler et al. |
| 10,830,360 B2 | 11/2020 | Frank |
| 10,851,775 B2 | 12/2020 | Stark |
| 10,865,325 B2 | 12/2020 | Nakao |
| 10,895,325 B2 | 1/2021 | Nowell et al. |
| D910,820 S | 2/2021 | Grassl |
| 10,907,738 B2 | 2/2021 | Nowell |
| 10,914,171 B2 | 2/2021 | Foster |
| 10,934,899 B2 | 3/2021 | Hattiangadi |
| 10,941,765 B2 | 3/2021 | Nowell |
| 10,941,866 B2 | 3/2021 | Nowell |
| 10,954,938 B2 | 3/2021 | Stark |
| 10,961,607 B2 | 3/2021 | Oshima |
| 10,962,001 B2 | 3/2021 | Nowell |
| D916,240 S | 4/2021 | Nowell |
| 10,968,717 B2 | 4/2021 | Tran |
| 10,988,834 B2 | 4/2021 | Lee |
| 10,989,321 B2 | 4/2021 | Hattiangadi |
| 10,995,738 B2 | 5/2021 | Blume |
| 11,009,016 B2 | 5/2021 | Berend |
| 11,028,662 B2 | 6/2021 | Rhodes |
| 11,041,570 B1 | 6/2021 | Buckley |
| 11,073,144 B1 | 7/2021 | Hurst et al. |
| 11,078,903 B2 | 8/2021 | Nowell |
| 11,104,981 B2 | 8/2021 | Chen |
| 11,105,185 B2 | 8/2021 | Spencer |
| 11,105,327 B2 | 8/2021 | Hurst |
| 11,105,328 B2 | 8/2021 | Bryne |
| 11,105,428 B2 | 8/2021 | Warbey |
| 11,111,915 B2 | 9/2021 | Bayyouk |
| 11,131,397 B2 | 9/2021 | Yan |
| D933,104 S | 10/2021 | Ellisor |
| D933,105 S | 10/2021 | Ellisor |
| D933,106 S | 10/2021 | Mullins |
| D933,107 S | 10/2021 | Mullins |
| 11,149,514 B2 | 10/2021 | Witkowski |
| 11,156,221 B2 | 10/2021 | Stark et al. |
| 11,162,859 B2 | 11/2021 | Lei |
| 11,181,101 B2 | 11/2021 | Byrne |
| 11,181,108 B2 | 11/2021 | Brooks |
| 11,225,963 B2 | 1/2022 | Naedler et al. |
| 11,231,111 B2 | 1/2022 | Hurst |
| 11,242,849 B1 | 2/2022 | Smith |
| D949,202 S | 4/2022 | Sharpstone |
| 11,353,117 B1 | 6/2022 | Smith |
| 11,359,615 B2 | 6/2022 | Thomas et al. |
| 11,384,756 B1 | 7/2022 | Smith |
| 11,391,374 B1 | 7/2022 | Ellisor |
| 11,421,679 B1 | 8/2022 | Mullins |
| 11,421,680 B1 | 8/2022 | Smith |
| 11,434,900 B1 | 9/2022 | Alex |
| 11,441,683 B2 | 9/2022 | Mullins et al. |
| 11,454,321 B2 | 9/2022 | Mullins et al. |
| 11,473,686 B2 | 10/2022 | Bayyouk |
| 11,566,713 B2 | 1/2023 | Poremski |
| D980,876 S | 3/2023 | Smith |
| D986,928 S | 5/2023 | Smith et al. |
| D997,992 S | 9/2023 | Smith et al. |
| 11,746,778 B2 | 9/2023 | Bayyouk |
| 11,761,441 B1 | 9/2023 | Alex et al. |
| D1,006,059 S | 11/2023 | Waniek |
| 11,846,356 B1 | 12/2023 | Ellisor |
| 11,891,988 B2 | 2/2024 | Mullins et al. |
| 11,920,684 B1 | 3/2024 | Xu et al. |
| 12,038,086 B2 | 7/2024 | Shuck |
| 12,049,889 B2 | 7/2024 | Ellisor et al. |
| 12,055,221 B2 | 8/2024 | Ellisor et al. |
| 12,140,240 B1 | 11/2024 | Xu |
| D1,061,623 S | 2/2025 | Newberg et al. |
| 2002/0084004 A1 | 7/2002 | Takahashi |
| 2002/0124961 A1 | 9/2002 | Porter |
| 2002/0159914 A1 | 10/2002 | Yeh |
| 2003/0205864 A1 | 11/2003 | Dietle |
| 2003/0233910 A1 | 12/2003 | Jeong |
| 2004/0161351 A1 | 8/2004 | Forrest |
| 2004/0170507 A1 | 9/2004 | Vicars |
| 2004/0194576 A1 | 10/2004 | Ando |
| 2004/0234404 A1 | 11/2004 | Vicars |
| 2004/0255410 A1 | 12/2004 | Schonewille |
| 2004/0258557 A1 | 12/2004 | Shun |
| 2005/0095156 A1 | 5/2005 | Wolters |
| 2005/0200081 A1 | 9/2005 | Stanton |
| 2005/0226754 A1 | 10/2005 | Orr |
| 2006/0002806 A1 | 1/2006 | Baxter |
| 2006/0027779 A1 | 2/2006 | McGuire |
| 2006/0045782 A1 | 3/2006 | Kretzinger |
| 2007/0086910 A1 | 4/2007 | Liang |
| 2007/0154342 A1 | 7/2007 | Tu |
| 2007/0261746 A1 | 11/2007 | Nomichi et al. |
| 2007/0273105 A1 | 11/2007 | Stanton |
| 2007/0295411 A1 | 12/2007 | Schwegman |
| 2008/0031769 A1 | 2/2008 | Yeh |
| 2008/0052014 A1 | 2/2008 | Toyosada |
| 2008/0092384 A1 | 4/2008 | Schaake |
| 2008/0240949 A1 | 10/2008 | Tackett et al. |
| 2008/0279706 A1 | 11/2008 | Gambier |
| 2009/0041611 A1 | 2/2009 | Sathian |
| 2009/0278069 A1 | 11/2009 | Blanco |
| 2009/0261575 A1 | 12/2009 | Bull |
| 2010/0143163 A1 | 6/2010 | Patel et al. |
| 2010/0230628 A1 | 9/2010 | Stefina |
| 2010/0272597 A1 | 12/2010 | Qiao |
| 2011/0079302 A1 | 4/2011 | Hawes |
| 2011/0142701 A1 | 6/2011 | Small |
| 2011/0189040 A1 | 8/2011 | Vicars |
| 2011/0255993 A1 | 10/2011 | Ochoa |
| 2011/0296982 A1 | 12/2011 | Dille et al. |
| 2012/0141308 A1 | 6/2012 | Saini |
| 2012/0163969 A1 | 6/2012 | Ongole |
| 2012/0259593 A1 | 10/2012 | El-Zein |
| 2012/0304821 A1 | 12/2012 | Ando |
| 2013/0020521 A1 | 1/2013 | Byrne |
| 2013/0037739 A1 | 2/2013 | Millard |

(56) References Cited

U.S. PATENT DOCUMENTS

| | | |
|---|---|---|
| 2013/0202457 A1 | 8/2013 | Bayyouk |
| 2013/0202458 A1 | 8/2013 | Byrne |
| 2013/0263932 A1 | 10/2013 | Baxter et al. |
| 2013/0319220 A1 | 12/2013 | Luharuka |
| 2014/0083541 A1 | 3/2014 | Chandrasekaran |
| 2014/0083547 A1 | 3/2014 | Hwang |
| 2014/0196883 A1 | 7/2014 | Artherholt |
| 2014/0260954 A1 | 9/2014 | Young |
| 2014/0286805 A1 | 9/2014 | Dyer |
| 2014/0322034 A1 | 10/2014 | Bayyouk |
| 2014/0322050 A1 | 10/2014 | Marette et al. |
| 2014/0348677 A1 | 11/2014 | Moeller |
| 2015/0127308 A1 | 5/2015 | Thomas, Jr. et al. |
| 2015/0132157 A1 | 5/2015 | Whaley |
| 2015/0144826 A1 | 5/2015 | Bayyouk |
| 2015/0147194 A1 | 5/2015 | Foote |
| 2015/0219096 A1 | 8/2015 | Jain |
| 2015/0300332 A1 | 10/2015 | Kotapish |
| 2015/0368775 A1 | 12/2015 | Baker |
| 2016/0201169 A1 | 7/2016 | Vecchio |
| 2016/0215588 A1 | 7/2016 | Belshan |
| 2016/0238156 A1 | 8/2016 | Hubenschmidt |
| 2016/0245280 A1 | 8/2016 | Todorov |
| 2016/0258433 A1 | 9/2016 | Belshan et al. |
| 2016/0319626 A1 | 11/2016 | Dille |
| 2016/0319805 A1 | 11/2016 | Dille |
| 2016/0327165 A1 | 11/2016 | Sundararajan |
| 2017/0067459 A1 | 3/2017 | Bayyouk |
| 2017/0089334 A1 | 3/2017 | Jahnke |
| 2017/0089470 A1 | 3/2017 | Filipow et al. |
| 2017/0089473 A1 | 3/2017 | Nowell |
| 2017/0097107 A1 | 4/2017 | Hotz |
| 2017/0159655 A1 | 6/2017 | Morreale |
| 2017/0175799 A1 | 6/2017 | Arnold |
| 2017/0204852 A1 | 7/2017 | Barnett, Jr. |
| 2017/0218951 A1 | 8/2017 | Graham |
| 2017/0218993 A1 | 8/2017 | Freed |
| 2017/0297149 A1 | 10/2017 | Shinohara |
| 2017/0298932 A1 | 10/2017 | Wagner |
| 2017/0314097 A1 | 11/2017 | Hong |
| 2017/0342776 A1 | 11/2017 | Bullock |
| 2017/0342976 A1 | 11/2017 | Reddy |
| 2018/0017173 A1 | 1/2018 | Nowell |
| 2018/0058431 A1 | 3/2018 | Blume |
| 2018/0073653 A1 | 3/2018 | Bayyouk |
| 2018/0202434 A1 | 7/2018 | Barnhouse, Jr. |
| 2018/0298894 A1 | 10/2018 | Wagner |
| 2018/0312946 A1 | 11/2018 | Gigliotti, Jr. |
| 2018/0320258 A1 | 11/2018 | Stewart |
| 2018/0340245 A1 | 11/2018 | Kernion |
| 2018/0354081 A1 | 12/2018 | Kalyani |
| 2019/0011051 A1 | 1/2019 | Yeung |
| 2019/0017503 A1 | 1/2019 | Foster |
| 2019/0024198 A1 | 1/2019 | Hong |
| 2019/0024225 A1 | 1/2019 | Tang |
| 2019/0032685 A1 | 1/2019 | Foster |
| 2019/0032720 A1 | 1/2019 | Bayyouk |
| 2019/0047049 A1 | 2/2019 | Fujieda |
| 2019/0049052 A1 | 2/2019 | Shuck |
| 2019/0063427 A1 | 2/2019 | Nowell |
| 2019/0071755 A1 | 3/2019 | Lee |
| 2019/0072088 A1 | 3/2019 | DeLeon |
| 2019/0072089 A1 | 3/2019 | Buckley |
| 2019/0085806 A1 | 3/2019 | Meibgeier |
| 2019/0085978 A1 | 3/2019 | Chase |
| 2019/0101109 A1 | 4/2019 | Cortes |
| 2019/0107226 A1 | 4/2019 | Bayyouk |
| 2019/0120389 A1 | 4/2019 | Foster |
| 2019/0136842 A1 | 5/2019 | Nowell |
| 2019/0145400 A1 | 5/2019 | Graham |
| 2019/0145568 A1 | 5/2019 | Nick |
| 2019/0154033 A1 | 5/2019 | Brooks |
| 2019/0170137 A1 | 6/2019 | Chase |
| 2019/0170138 A1 | 6/2019 | Bayyouk |
| 2019/0194786 A1 | 6/2019 | Chuang |
| 2019/0226058 A1 | 7/2019 | Fujieda |
| 2019/0226476 A1 | 7/2019 | Stark et al. |
| 2019/0063430 A1 | 8/2019 | Byrne |
| 2019/0242373 A1 | 8/2019 | Wernig |
| 2019/0247957 A1 | 8/2019 | Stribling |
| 2019/0264683 A1 | 8/2019 | Smith |
| 2019/0292633 A1 | 9/2019 | Porret |
| 2019/0301314 A1 | 10/2019 | Kamo |
| 2019/0301447 A1 | 10/2019 | Skurdalsvold |
| 2019/0316685 A1 | 10/2019 | Wang |
| 2019/0331245 A1 | 10/2019 | Gable et al. |
| 2019/0360483 A1 | 11/2019 | Nowell |
| 2019/0376508 A1 | 12/2019 | Wagner |
| 2020/0023245 A1 | 1/2020 | Story et al. |
| 2020/0056272 A1 | 2/2020 | Hong |
| 2020/0063899 A1 | 2/2020 | Witkowkski |
| 2020/0070034 A1 | 3/2020 | Sukup et al. |
| 2020/0072369 A1 | 3/2020 | Singley et al. |
| 2020/0080660 A1 | 3/2020 | Dyer |
| 2020/0080661 A1 | 3/2020 | Mullins |
| 2020/0157663 A1 | 5/2020 | Yang |
| 2020/0158123 A1 | 5/2020 | Chen |
| 2020/0173317 A1 | 6/2020 | Keating |
| 2020/0208776 A1 | 7/2020 | Bayyouk |
| 2020/0217424 A1 | 7/2020 | Rasmussen |
| 2020/0232455 A1 | 7/2020 | Blume |
| 2020/0240531 A1 | 7/2020 | Nowell |
| 2020/0256149 A1 | 8/2020 | Witkowski |
| 2020/0284253 A1 | 9/2020 | Foster |
| 2020/0284365 A1 | 9/2020 | Bayyouk |
| 2020/0290118 A1 | 9/2020 | Chen |
| 2020/0291731 A1 | 9/2020 | Haiderer |
| 2020/0300240 A1 | 9/2020 | Nowell |
| 2020/0308683 A1 | 10/2020 | Xue |
| 2020/0347843 A1 | 11/2020 | Mullins |
| 2020/0355182 A1 | 11/2020 | DeLeon |
| 2020/0362970 A1 | 11/2020 | Hurst |
| 2020/0392613 A1 | 12/2020 | Won |
| 2020/0393054 A1 | 12/2020 | Fuller |
| 2020/0399979 A1 | 12/2020 | Webster |
| 2020/0400003 A1 | 12/2020 | Webster |
| 2020/0400130 A1 | 12/2020 | Poehls |
| 2020/0400132 A1 | 12/2020 | Kumar |
| 2020/0400140 A1 | 12/2020 | Bayyouk |
| 2020/0400234 A1 | 12/2020 | Mullins et al. |
| 2020/0400242 A1 | 12/2020 | Spencer |
| 2021/0010113 A1 | 1/2021 | Qiao |
| 2021/0010470 A1 | 1/2021 | Blume |
| 2021/0017830 A1 | 1/2021 | Witkowski |
| 2021/0017982 A1 | 1/2021 | Bayyouk |
| 2021/0017983 A1 | 1/2021 | Myers |
| 2021/0040836 A1 | 2/2021 | Baskin |
| 2021/0054486 A1 | 2/2021 | Kim |
| 2021/0102630 A1 | 4/2021 | Nowell |
| 2021/0108734 A1 | 4/2021 | Nowell |
| 2021/0130936 A1 | 5/2021 | Wu |
| 2021/0146397 A1 | 5/2021 | Mittag et al. |
| 2021/0148471 A1 | 5/2021 | Murugesan |
| 2021/0180156 A1 | 6/2021 | Kim |
| 2021/0190053 A1 | 6/2021 | Wagner |
| 2021/0190223 A1 | 6/2021 | Bayyouk |
| 2021/0197524 A1 | 7/2021 | Maroli |
| 2021/0215071 A1 | 7/2021 | Oikawa |
| 2021/0215154 A1 | 7/2021 | Nowell |
| 2021/0230987 A1 | 7/2021 | Tanner |
| 2021/0239111 A1 | 8/2021 | Zitting |
| 2021/0246537 A1 | 8/2021 | Maroli |
| 2021/0260704 A1 | 8/2021 | Hu |
| 2021/0270261 A1 | 9/2021 | Zhang |
| 2021/0285551 A1 | 9/2021 | Renollett |
| 2021/0310484 A1 | 10/2021 | Myers |
| 2021/0381504 A1 | 12/2021 | Wagner |
| 2021/0381615 A1 | 12/2021 | Riedel |
| 2021/0388832 A1 | 12/2021 | Byrne |
| 2022/0026326 A1 | 1/2022 | Wang |
| 2022/0034402 A1 | 2/2022 | Kiani |
| 2022/0056906 A1 | 2/2022 | Lawson et al. |
| 2022/0065063 A1 | 3/2022 | Xu et al. |
| 2022/0163031 A1 | 5/2022 | Chase |

(56) References Cited

U.S. PATENT DOCUMENTS

| | | |
|---|---|---|
| 2022/0163032 A1 | 5/2022 | Chase |
| 2022/0243723 A1 | 8/2022 | Herold et al. |
| 2022/0282719 A1 | 9/2022 | Barnhouse |
| 2022/0349472 A1 | 11/2022 | Ellisor |
| 2022/0390055 A1 | 12/2022 | Ellisor |
| 2022/0403839 A1 | 12/2022 | Mullins |
| 2023/0041201 A1 | 2/2023 | Myers et al. |
| 2023/0129538 A1 | 4/2023 | Miller et al. |
| 2023/0130824 A1 | 6/2023 | Belshan et al. |
| 2023/0184241 A1 | 6/2023 | Avey et al. |
| 2023/0220840 A1 | 7/2023 | Avey et al. |
| 2023/0258175 A1 | 8/2023 | Figgs et al. |
| 2023/0279991 A1 | 9/2023 | Avey et al. |
| 2023/0332596 A1 | 10/2023 | Chase |
| 2023/0383743 A1 | 11/2023 | Brock et al. |
| 2023/0383859 A1 | 11/2023 | Wiegand et al. |
| 2023/0407864 A1 | 12/2023 | Alex et al. |
| 2024/0102460 A1 | 3/2024 | Kachovskiy et al. |
| 2024/0117882 A1 | 4/2024 | Ellisor |
| 2024/0200656 A1 | 6/2024 | Avey |
| 2024/0200666 A1 | 6/2024 | Leake |
| 2024/0369139 A1 | 11/2024 | Ellisor |
| 2024/0376892 A1 | 11/2024 | Ellisor |
| 2024/0376984 A1 | 11/2024 | Ellisor |
| 2024/0418164 A1 | 12/2024 | Peer |
| 2025/0027486 A1 | 1/2025 | Alex et al. |

FOREIGN PATENT DOCUMENTS

| | | |
|---|---|---|
| CN | 102748483 | 10/2012 |
| CN | 202545162 U | 11/2012 |
| CN | 203257342 U | 10/2013 |
| CN | 204040978 U | 12/2014 |
| CN | 104329464 A | 2/2015 |
| CN | 204738957 U | 11/2015 |
| CN | 205315253 U | 6/2016 |
| CN | 109458326 A | 3/2019 |
| CN | 209261799 U | 8/2019 |
| CN | 110374522 A | 10/2019 |
| CN | 209469613 U | 10/2019 |
| CN | 111005695 A | 4/2020 |
| CN | 111073186 A | 4/2020 |
| CN | 102410194 | 4/2021 |
| DE | 102009001560 A1 | 9/2010 |
| DE | 202012104058 U1 | 3/2014 |
| EP | 0 414 955 | 3/1991 |
| EP | 0520567 A1 | 12/1992 |
| EP | 3336356 A1 | 6/2018 |
| EP | 3696408 A1 | 8/2020 |
| WO | 2021195572 | 9/2021 |
| WO | 2022167341 A1 | 8/2022 |
| WO | 2024026432 | 2/2024 |
| WO | 2024076786 A1 | 4/2024 |

OTHER PUBLICATIONS

U.S. Appl. No. 17/120,121.
U.S. Appl. No. 62/234,483.
U.S. Appl. No. 62/315,343.
U.S. Appl. No. 62/318,542.
U.S. Appl. No. 62/346,915.
U.S. Appl. No. 62/379,462.
"Flush Free Sealing Benefits," Oct. 3, 2011, http://empoweringpumps.com/flush-free-sealing-benefits/, accessed May 9, 2020, 5 pages.
Gardner Denver, Well Servicing Pump Model GD-3000—Operating and Service Manual, Apr. 2011, 44 pages.
Gardner Denver, Well Servicing Pump Model GD-1000Q—Fluid End Parts List, Sep. 2011, 24 pages.
Gardner Denver, Well Servicing Pump Model HD-2250—Operating and Service Manual, Jan. 2005, 44 pages.
Cutting Tool Engineering, "Groove milling," Aug. 1, 2012, https://www.ctemag.cojm/news/articles/groove-milling, accessed May 13, 2020, 11 pages.
VargusUSA, "Groovex Innovative Grooving Solutions—Groove Milling," Dec. 12, 2011, http://www.youtube.com/watch?v=vrFxHJUXjvk, 68 pages.
Kerr Pumps, Kerr triplex pump km3250bcb 10,000 psi @ 5.1 gmp, Feb. 2, 2021, http://imged.com/kerr-triplex-pump-km3250bcb-10-000-psi-5-1-gmp-8234739.html, 2 pages.
Lex Machina, 77 Federal district court cases for Alan D Albright of W.D. Tex., http://law.lexmachina.com/court/txwd/judge/5198506/cases?status=open&filed_on-from=2020-02-19&filed_on-to=2020-04-19&pending-, 7 pages.
Lex Machina, Motion Metrics Report for 834 orders issued by District Judge Alan D Albright (ADA) in 1,603 cases from the Search for federal district court cases before Judge Alan D Albright, https://law.lexmachina.com/motions/motion_metrics?cases_key=yyix9Y8-k2k, generated on Sep. 23, 2020, 1 page.
Jonathan Maes, "Machining Square Inside Corners: Conquer the Nightmare!," accessed Sep. 8, 2020, https://makeitfrommetal.com/machining-square-inside-corners-the-night.., 22 pages.
Ross Mackay, "Process Engineering: Properly seal that pump," May 17, 2005, https://www.chemicalprocessing.com/articles/2005/465, 11 pages.
MSI Dixie Iron Works, Ltd., MSI QI-1000 Technical Manual for 1000 HP Quintuplex MSI QI-1000 Pump, Feb. 21, 2004, 90 pages.
MSI, Product Listing and Pricing, accessed Mar. 8, 2016, 19 pages.
National Oilwell Varco, 267Q-6M Quinuplex Plunger Pump: Parts List, Jul. 21, 2008, 13 pages.
Oil and Gas Well Servicing, Audit Procedures for Oil and Gas Well Servicing, May 2010, Texas Comptroller of Public Accounts, Audit Division, 68 pages.
Tony Atkins and Marcel Escudier, Oxford Dictionary of Mechanical Engineering, Oxford University Press, 2013, 10 pages.
Parker Hannifin Corporation and Autoclave Engineers, Technical Information, 2016, 16 pages.
Girdhar, Moniz and Mackay, "Chapter 5.4 Centrifugal pump design," Plant and Process Engineering 360, 2010, pp. 519-536.
Parker Hannifin Corporation, PolyPak Seals for Hydraulic Applications Catalog EPS 5370_PolyPak, 2015, 38 pages.
Paresh Girdhar and Octo Moniz, "Practical Centrifugal Pumps—Design. Operation and Maintenance," Newnes, 2005, 33 pages.
Reinhard Preiss, "Stress concentration factors of flat end to cylindrical shell connection with a fillet or stress relief groove subjected to internal pressure," 1997, Int. J. Pres. Ves. & Piping, vol. 73, pp. 183-190.
Eaton Aerospace Group, Resilient Metallic Seals, TF100-35D, Oct. 2013, 60 pages.
Scott McKeown, "District Court Trial Dates Tend to Slip After PTAB Discretionary Denials—Patents Post-Grant," Jul. 24, 2020, Ropes & Gray, accessed Sep. 23, 2020, 3 pages.
Ricky Smith and R. Keith Mobley, "Rules of Thumb for Maintenance and Reliability Engineers—Chapter 14: Packing and Seals," Elsevier, 2008, pp. 239-250.
Schlumberger, Jet Manual 02—Reciprocating Pumps, Aug. 7, 2015, 63 pages.
Schlumberger, Treating Equipment Manual: Fluid Ends, Section 10, Apr. 2000, 87 pages.
SPM Oil & Gas, SPM QEM 3000 Frac Pump, 2021, 4 pages.
Supplemental Declaration of Steven M. Tipton, Ph.D., P.E.—Case PGR2020-00065, U.S. Pat. No. 10,591,070, Mar. 2, 2021, 35 pages.
Servagroup, TPD 600 Triplex Pump Brochure, Mar. 24, 2011, 2 pages.
Utex Industries, Inc., Well Service Products Catalog, Jun. 2017, 51 pages.
Utex Industries, Inc., Well Service Packing—Packing Assemblies Complete & Replacement, May 2013, 40 pages.
Vargus Ltd., Groove Milling High Precision Tools for Groove Milling, Dec. 2012, pp. 2-22.
Declaration of Duncan Hall from Internet Archive/Wayback Machine, Feb. 3, 2021, Kerr Plunger Pump Manuals, 20 pages.
Michael Agnes, Editor, Webster's New World College Dictionary, Fourth Edition, 1999, 5 pages.
Weir SPM Oil & Gas, Grooveless Fluid End, 2008, 1 page.
Weir SPM Oil & Gas, Weir SPM General Catalog, 2009, 40 pages.

(56) References Cited

OTHER PUBLICATIONS

Weir SPM Oil & Gas, Well Service Pump Reference Guide, 2008, 55 pages.
*Intellectual Ventures I LLC v VMWare, Inc.*, Case No. 1:19-CV-01075-ADA, Document 91 (W.D. Tex Jun. 3, 2020), Defendant VMWare, Inc.'s Stipulation of Invalidity Contentions for U.S. Pat. No. 7,949,752, Jun. 3, 2020, 5 pages.
*Vulcan Industrial Holding, LLC et al.* v. *Kerr Machine Co.* Case No. 4:21-cv-433, Document 1, Complaint for Declaratory Judgment of Patent Non-Infringement, Feb. 9, 2021, 17 pages.
*Trilogy Enterprises, Inc.*, v. *Trilogy Education Services, LLC*, Case. No. 6: 19-cv-199-ADA-JCM, Document 35, Fifth Amended Scheduling Order, Sep. 8, 2020, 4 pages.
*Dr. Corneliu Bolbocean* v *Baylor University*, Case No. 6:19-CV-00465-ADA-JCM, Document 34, Scheduling Order, Apr. 6, 2020, 4 pages.
*Kerr Machine Co.*, v *Vulcan Energy Services, LLC, Vulcan Industrial Holdings, LLC, and Cizion, LLC d/b/a/ Vulcan Industrial Manufacturing*, Case No. 6:21-CV-00044-ADA, Document 4, Plaintiff's Amended Complaint for Patent Infringement and Jury Demand, Jan. 19, 2021, 30 pages.
*Kerr Machine Co.*, v *Vulcan Energy Services, LLC, Vulcan Industrial Holdings, LLC, and Cizion, LLC d/b/a/ Vulcan Industrial Manufacturing*, Case No. 6:21-CV-00044, Document 1, Plaintiff's Original Complaint for Patent Infringement and Jury Demand, Jan. 19, 2021, 47 pages.
*Kerr Machine Co.*, v *Vulcan Energy Services, LLC, Vulcan Industrial Holdings, LLC, and Cizion, LLC d/b/a/ Vulcan Industrial Manufacturing*, Case No. 6:21-CV-00044-ADA, Document 10, Plaintiff's Second Amended Complaint for Patent Infringement and Jury Demand, Feb. 1, 2021, 88 pages.
*Kerr Machine Co.*, v *Vulcan Industrial Holdings, LLC, Vulcan Energy Services, LLC, Cizion, LLC*, Case No. W-20-CV-00200-ADA-24, Order Setting Trial Date, Jun. 14, 2020, 1 page.
*Kerr Machine Co.*, v *Vulcan Industrial Holdings, LLC, Vulcan Energy Services, LLC, Cizion, LLC*, Case No. W-20-CV-00200-ADA-29, Order Setting Trial Date, Aug. 2, 2020, 1 page.
*Kerr Machine Co.*, v *Vulcan Industrial Holdings, LLC*, Case. No. 6:20-CV-00200-ADA, Affidavit of Service, Apr. 7, 2020, 1 page.
*Kerr Machine Co.*, v *Vulcan Industrial Holdings, LLC, Vulcan Energy Services, LLC, and Cizion, LLC d/b/a/ Vulcan Industrial Manufacturing*, Case No. 6:20-CV-00200-ADA, Plaintiff's First Amended Complaint for Patent Infringement and Jury Demand, Jun. 4, 2020, 11 pages.
*Kerr Machine Co.*, v *Vulcan Industrial Holdings, LLC, Vulcan Energy Services, LLC, and Cizion, LLC d/b/a/ Vulcan Industrial Manufacturing*, Case No. 6:20-CV-00200-ADA, Document 26, Defendant Cizion, LLC d/b/a Vulcan Industrial Manufacturing, LLC's Motion to Dismiss or Transfer, Jul. 22, 2020, 10 pages.
*Kerr Machine Co.*, v *Vulcan Industrial Holdings, LLC, Vulcan Energy Services, LLC, and Cizion, LLC d/b/a/ Vulcan Industrial Manufacturing*, Case No. 6:20-CV-00200-ADA, Defendants' Opposed Motion to Stay Litigation Pending the Outcome of the Pending Post-Grant Review Proceeding Before the Patent Trial and Appeal Board, Jul. 31, 2020, 14 pages.
*Kerr Machine Co.*, v *Vulcan Industrial Holdings, LLC*, Case No. 6:20-CV-00200-ADA, Plaintiff's Preliminary Infringement Contentions, May 22, 2020, 50 pages.
*Kerr Machine Co.*, v *Vulcan Industrial Holdings, LLC, Vulcan Energy Services, LLC, and Cizion, LLC d/b/a/ Vulcan Industrial Manufacturing*, Case No. 6:20-CV-00200-ADA, Defendants' Preliminary Invalidity Contentions, Aug. 13, 2020, 29 pages.
*Kerr Machine Co.*, v *Vulcan Industrial Holdings, LLC, Vulcan Energy Services, LLC, and Cizion, LLC d/b/a/ Vulcan Industrial Manufacturing*, Case No. 6:20-CV-00200-ADA, Document 34, Scheduling Order, Aug. 11, 2020, 3 pages.
*Kerr Machine Co.*, v *Vulcan Industrial Holdings, LLC, Vulcan Energy Services, LLC, and Cizion, LLC d/b/a/ Vulcan Industrial Manufacturing*, Case No. 6:20-CV-00200-ADA, Document 38, Plaintiff's Second Amended Complaint for Patent Infringement and Jury Demand, Sep. 25, 2020, 11 pages.
*Kerr Machine Co.*, v *Vulcan Industrial Holdings, LLC, Vulcan Energy Services, LLC, and Cizion, LLC d/b/a/ Vulcan Industrial Manufacturing*, Case No. 6:20-CV-00200-ADA, Document 5, Standing Order regarding Scheduled Hearings in Civil Cases in Light of Chief Judge Garcia's 24 Amended Order, Mar. 24, 2020, 4 pages.
*Kerr Machine Co.*, v *Vulcan Industrial Holdings, LLC, Vulcan Energy Services, LLC, and Cizion, LLC d/b/a/ Vulcan Industrial Manufacturing*, Civil Docket for Case No. 6:20-cv-00200-ADA, accessed Sep. 11, 2020, 7 pages.
*Kerr Machine Co.*, v *Vulcan Industrial Holdings, LLC, Vulcan Energy Services, LLC, and Cizion, LLC d/b/a/ Vulcan Industrial Manufacturing*, Case No. 6:20-CV-00200-ADA, Document 54, Claim Construction Order, Dec. 3, 2020, 3 pages.
*Kerr Machine Co.*, v *Vulcan Industrial Holdings, LLC, Vulcan Energy Services, LLC, and Cizion, LLC d/b/a/ Vulcan Industrial Manufacturing*, Case No. 6:20-CV-00200-ADA, Docket Entry, Aug. 2, 2020, 1 page.
*Kerr Machine Co.*, v *Vulcan Industrial Holdings, LLC*, Case No. 6:20-CV-00200, Document 1, Plaintiff's Original Complaint for Patent Infringement and Jury Demand, Mar. 19, 2020, 39 pages.
*Adriana del Rocio Barberena-Rovira, et. al.*, v *Kuiper Dairy, LLC, et. al.*, Case No. 6:20-CV-00250-ADA-JCM, Document 20, Scheduling Order, Jul. 22, 2020, 4 pages.
*Acquanlan Deonshay Harris* v. *Cenlar, FSB*, Case No. 6:20-CV-00271-ADA-JCM, Document 13, Scheduling Order, Aug. 20, 2020, 4 pages.
*Senior Living Properties, LLC* c. *Ironshore Speciality, Insurance Company*, Case No. 6:20-CV-00282-ADA-JCM, Document 12, Scheduling Order, Jul. 7, 2020, 4 pages.
*Dionne Bracken, Individually and as Next Friend of A.M.B.*, v *Michael D. Ashcraft and Envirovac Waste Transport Systems, Inc.*, Case No. 6:20-CV-00308-ADA-JCM, Document 17, Scheduling Order, Jul. 28, 2020, 4 pages.
*Kendra Coufal* v. *Roger Lee Thomas and Apple Logistics, Inc.*, Case No. 6:20-CV-00356-ADA-JCM, Document 12, Scheduling Order, Jul. 28, 2020, 4 pages.
*Tipton International, Inc.*, v. *Vetbizcorp, LLC and Samuel Cody*, Case No. 6:20-CV-00554-ADA-JCM, Document 8, Scheduling Order, Aug. 20, 2020, 4 pages.
*Dynaenergetics GmbH & Co. KG and Dynaenergetics US, Inc.*, v. *Hunting Titan, Ltd.; Hunting Titan, Inc.; and Hunting Energy Services, Inc.*, Case No. H-17-3784, Order, Sep. 4, 2020, 2 pages.
Slip Opinion, In re Sand Revolution LLC, Case No. 2020-00145 (Fed. Cir. Sep. 28, 2020), 3 pages.
In re Vulcan Industrial Holdings, LLC, Case No. 2020-00151 (Fed. Cir. Sep. 29, 2020), Petition for Writ of Mandamus, 43 pages.
*Densys Ltd.*, v. *3Shape Trios A/S and 3Shape A/S*, Case No. WA:19-CV-00680-ADA, Document 27, Scheduling Order, Apr. 8, 2020, 4 pages.
*Kerr Machine Co.* vs. *Vulcan Industrial Holdings, LLC*, Case No. WA:20-CV-00200-ADA, Order Setting Markman Hearing, May 29, 2020, 1 page.
Sur-Lock Liner Retention System—Product Brochure (p. 16) (Year: 2017).
Sur-Lock Liner Retention System—Video (https://premiumoilfield.com/performance-enhancements/sur-lock/sur-lock-liner-retention-system.html) (https://www.youtube.com/watch?v=6NZGeD5NkF8) (Year: 2017).
U.S. Appl. No. 17/241,680 titled "Fluid End and Center Feed Suction Manifold" filed Apr. 27, 2021.
Karolczuk et al., "Application of the Gaussian Process for Fatigue Life Prediction Under Multiaxial Loading", Mechanical Systems and Signal Processing 167 (2022), Nov. 14, 2021.
Carraro et al. "A Damage Based Model for Crack Initiation in Unidirectional Composites Under Multiaxial Cyclic Loading", Composite Science and Technology 99 (2014), 154-163, May 16, 2014.
Albinmousa et al., "Cyclic Axial and Cyclic Torsional Behaviour of Extruded AZ31B Magnesium Alloy", International Journal of Fatigue 33 (2011), 1403-1416, 2011.
Horstemeyer et al., "Universal Material Constants For Multistage Fatigue (MSF) Modeling of the Process-Structure-Property (PSP)

(56) References Cited

OTHER PUBLICATIONS

Relations of A000, 2000, 5000, and 7000 Series Aluminum Alloys", Integrating Materials and Manufacturing Innovation, vol. 9 (2020), 157-180, Jun. 22, 2020.
Guan et al., "Model Selection, Updating, and Averaging for Probabilistic Fatigue Damage Prognosis", Journal of Structural Safety, Mar. 11, 2011.
Frick et al., "Orientation-Independent Pseudoelasticity in Small-Scale NITI Compression Pillars", Scripta Materialia 59(12), 7-10, 2008.
Naghipour et al., "Fatigue Analysis of Notched Laminates: A Time-Efficient Macro-Mechanical Approach", Ohio Aerospace Institute, Cleveland, 2016.
International Search Report and Written Opinion for international application No. PCT/US2023/066143, mailed Aug. 28, 2023.
International Search Report and Written Opinion for international application No. PCT/US2023/073458, mailed Feb. 1, 2024.
Flowserve, "Dynamic Balance Plug Valve and Double DB Plug Valve: Installation, Operation and Maintenance," 2011, https://www.flowserve.com/sites/default/files/2016-07/NVENIM2005-00_0.pdf, 36 pages.
Weir Oil & Gas, "SPM Well Service Pumps & Flow Control Products TWS600S Fluid End Operation Instruction and Service Manual," Feb. 27, 2017, https://www.global.weir/assets/files/oil%20and%20gas%20ebrochures/manuals/tws600s-fluid-end-2p121260.pdf, 41 pages.
White Star Pump Co., "Maintenance Manual: Triplex Pump WS-1300/1600," 2005, http://www.whitestarpump.com/ES/docs/user_t.pdf, 45 pages.
KerrPumps, "Super Stainless Steel Better Than The Best," http://kerrpumps.com/superstainless?gclid=EAlalQobChMlg47o482q6wlVilTICh2XPA-qEAAYASAAEgKrxPD_BwE, 2013, last accessed: Aug. 21, 2020, 6 pages.
KerrPumps, "Frac One Pumps—Fluid End—Fracing," http://kerrpumps.com/fracone, 2013, last accessed: Aug. 21, 2020, 3 pages.
KerrPumps, "KerrPumps—Frac Pump & Mud Pump Fluid End—Fluid End Pump," http://kerrpumps.com/fluidends, 2013, last accessed: Aug. 21, 2020, 6 pages.
Vulcan Industrial, "Vulcan," http://www.vulcanindustrial.com/, 2019, last accessed: Aug. 21, 2020, 3 pages.
Vulcan Industrial, "Vulcan," http://www.vulcanindustrial.com/fluid-ends/, 2019, last accessed: Aug. 21, 2020, 3 pages.
Covert Manufacturing, Inc., "Fluid End Block: Covert Manufacturing", (site visited Jul. 30, 2021), covertmfg.com, URL: <http://www.covertmfg.com/our-capabilities/fluid-end-block/> (Year: 2021).
Kerr Pumps, "the most advanced fluid ends", (site visited Aug. 5, 2021), Kerrpumps.com, URL: <http://kerrpumps.com/fluidends> (Year: 2021).
Shandong Baorun, 2250 Triplex Plunger Pump Fluid End Exchangeable with Spm, (site visited Aug. 5, 2021), made-in-china.com, URL: <https://sdbaorun.en.made-in-china.com/product/wNixIDXYrshL/China-2250-Triplex-Plunger-Pump-Fluid-End-Exchangeable-with-Spm.html> (Year: 2021).
John Miller, "The Reciprocating Pump, Theory, Design and Use," 1995, 2nd Edition, Krieger Publishing Company, Malabar, Florida, 1 page.
"QIH-1000 HP Quintuplex," Dixie Iron Works, 2017, https://web.archive.org/web/20171031221150/http:/www.diwmsi.com/pumping/qi-1000/.
Technical Manual MSI Hybrid Well Service Pump Triplex and Quintuplex Models, Dixie Iron Works, Mar. 12, 2019, 88 pages.
Carpenter, "CarTech Ferrium C61 Data Sheet," 2015, 2 pages.
The American Heritage Dictionary, Second College Edition, 1982, 6 pages.
Matthew Bultman, "Judge in West Texas Patent Hot Spot Issues Revised Guidelines," Sep. 23, 2020, Bloomberg Law News, 3 pages.
David L. Taylor, "Machine Trades Blueprint Reading: Second Edition," 2005, 3 pages.
Blume, U.S. Pat. No. 6,544,012, issued Apr. 8, 2003, Fig. 12A.
Caterpillar, "Cat Fluid Ends For Well Stimulation Pumps," 2015, 2 pages.
Claim Chart for U.S. Pat. No. 6,544,012, 23 pages.
Claim Chart for U.S. Pat. No. 7,186,097, 22 pages.
Claim Chart for U.S. Pat. No. 7,845,413, 8 pages.
Claim Chart for U.S. Pat. No. 9,534,472, 8 pages.
Claim Chart for U.S. Pat. Pub. No. 2013/0319220, 17 pages.
Claim Chart for U.S. Pat. Pub. No. 2014/0348677, 10 pages.
Claim Chart for U.S. Pat. Pub. No. 2015/0132157, 23 pages.
Claim Chart for "GD-3000," 9 pages.
Claim Chart for "NOV-267Q," 14 pages.
Collins English Dictionary, "annular," https://www.collinsdictionary.com/us/dictionary/english/annular, 2021, 4 pages.
Collins English Dictionary, "circumference," https://www.collinsdictionary.com/us/dictionary/english/circumference, 2021, 7 pages.
Collins English Dictionary, "plug," https://www.collinsdictionary.com/us/dictionary/english/plug, 2021, 17 pages.
Collins English Dictionary, "profile," https://www.collinsdictionary.com/us/dictionary/english/profile, 2021, 10 pages.
Collins English Dictionary, "space," https://www.collinsdictionary.com/us/dictionary/english/space, 2021, 13 pages.
Collins English Dictionary, "stairstep," https://www.collinsdictionary.com/us/dictionary/english/stairstep, 2021, 3 pages.
Congressional Record—Extensions of Remarks, Apr. 18, 2007, pp. E773-E775.
Congressional Record, Mar. 7, 2011, 31 pages.
"Declaration of Steven M. Tipton, Ph.D., P.E., Submitted with Patent Owner's Preliminary Response," Sep. 11, 2020, 155 pages.
"Declaration of William D. Marscher, P.E.—U.S. Pat. No. 10,914,171," Feb. 11, 2021, 308 pages.
"Declaration of William D. Marscher, P.E.—U.S. Pat. No. 10,591,070," May 25, 2020, 209 pages.
Email dated Sep. 22, 2020 in PGR2020-00065, 3 pages.
Email dated Sep. 25, 2020 in *Kerr Machine* v *Vulcan Industrial Holdings*, 1 page.
U.S. Appl. No. 16/722,139.
U.S. Appl. No. 13/773,271.
U.S. Appl. No. 15/719,124.
Vulcan, High-Impact Replacement Parts, Fortified Valves and Seats, found at: https://www.vulcanindustrial.com/energy-products/replacement-parts, 2021.
Gardner Denver, GD 2500Q HDF Frac & Well Service Pump, 3 pages, 2021.
Kerr Pumps, Kerr KA-3500B/KA-3500BCB Plunger Pump Parts and Service Manual, 41 pages, 2008.
Kerr Pumps, Kerr KD-1250B/KD-1250BCB Plunger Pump Service Manual, 38 pages, 2017.
Kerr Pumps, Kerr KJ-2250B and KJ-2250BCB Plunger Pump Service Manual, 38 pages, 2008.
Kerr Pumps, Kerr KM-3250B / KM-3250BCB Plunger Pump Service Manual, 35 pages, 2008.
Kerr Pumps, Kerr KP-3300B / KP-3300BCB Plunger Pump Service Manual, 41 pages, 2008.
Kerr Pumps, Kerr KT-3350B/BCB KT-3400BCB Plunger Pump Service Manual, 46 pages, 2008.
Lex Machina, 6:20-cv-00200-ADA, *Kerr Machine Co.* v. *Vulcan Industrial Holdings, LLC* Docket Entries, https://law.lexmachina.com/cases/2004206451#docket-entries, 6 pages, 2020.
MSI Fluid End Components, https://www.scribd.com/document/421304589/Fluid-End, 1 page, 2016.
Caterpillar, WS255 Quintuplex Well Stimulation Pump, 2 pages, 2013.
Gardner Denver Pumps, Redline Series Brochure, 3 pages, 2021. https://www.diwmsi.com/pumping/qi-1000/, 2000.
Collins English Dictionary, "sleeve," "therethrough," "through," "tube," and "tubular," 8 pages, 2017.

* cited by examiner

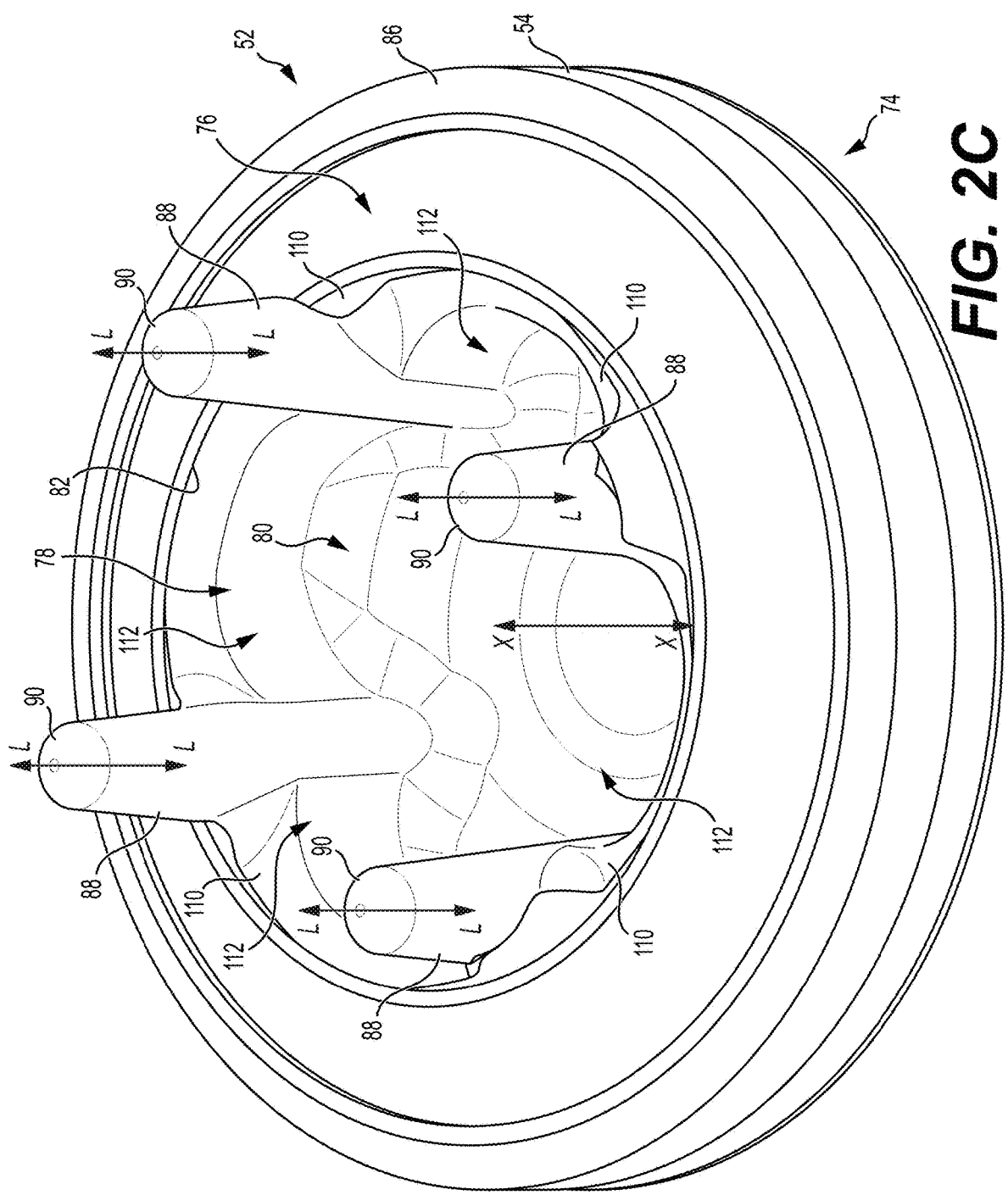

FIG. 2E

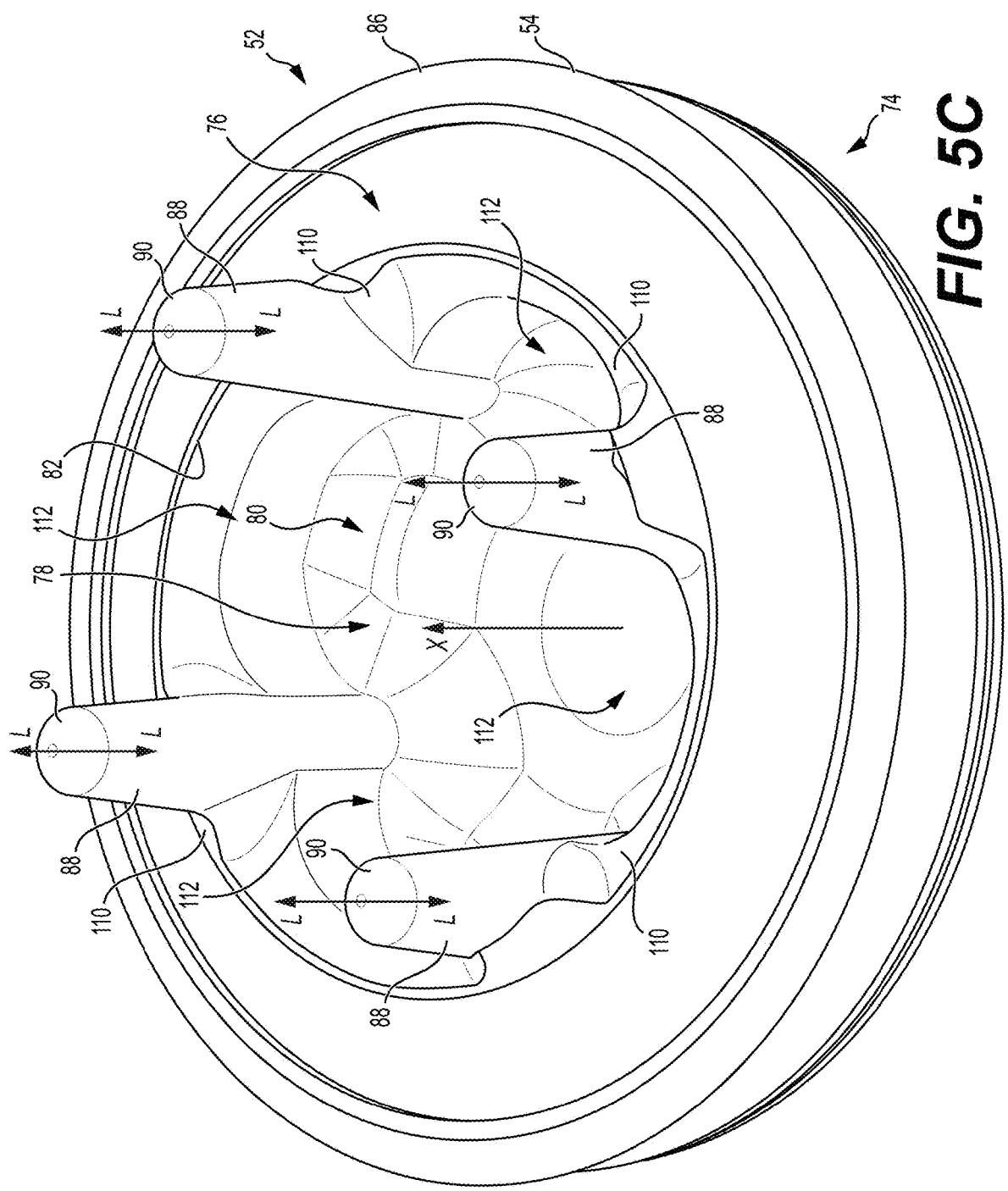

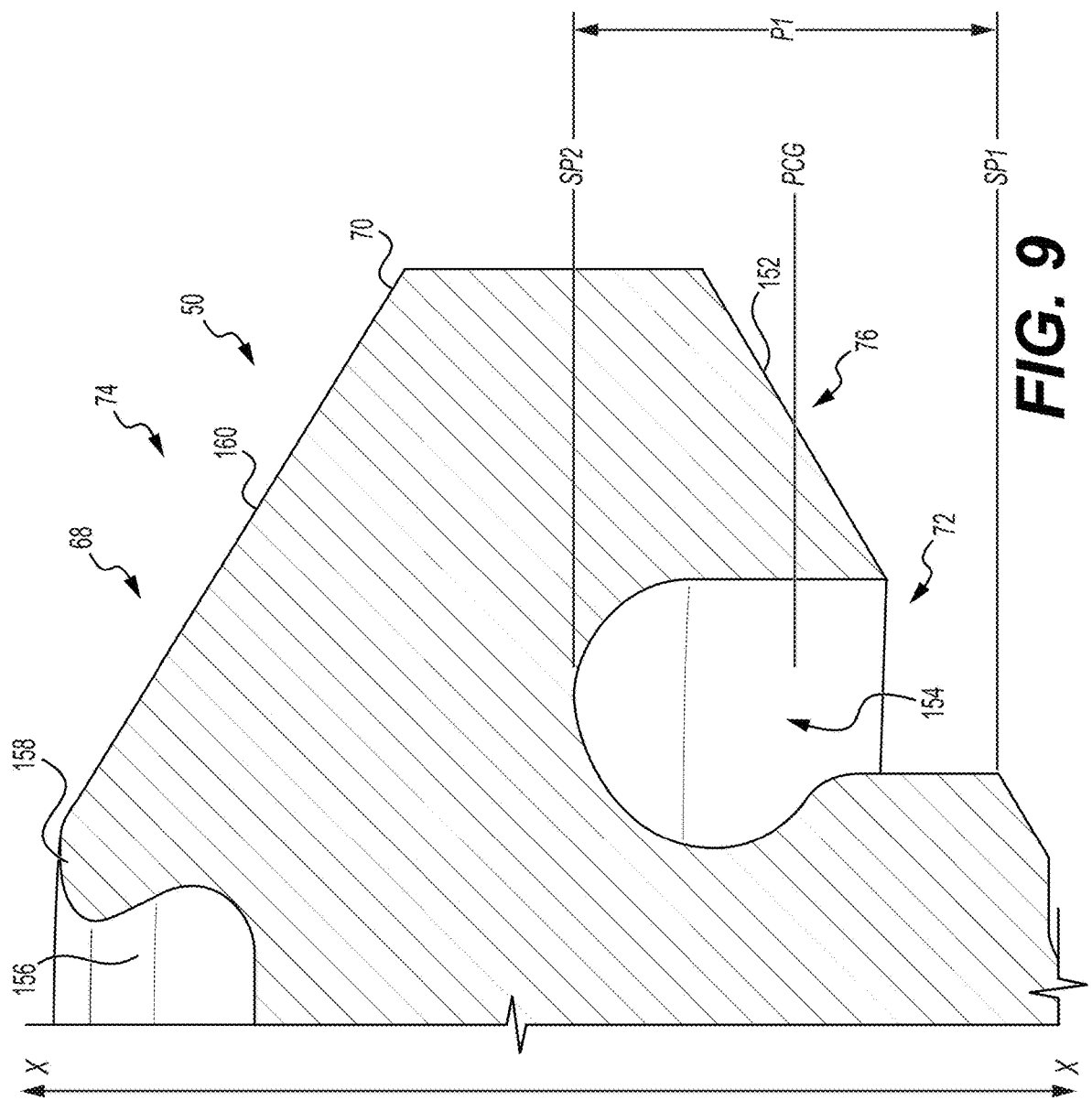

VALVE MEMBER INCLUDING CAVITY, AND RELATED ASSEMBLIES, SYSTEMS, AND METHODS

PRIORITY CLAIM

This U.S. non-provisional patent application claims priority to and the benefit of U.S. Provisional Application No. 63/518,840, filed Aug. 10, 2023, titled "VALVE MEMBER INCLUDING CAVITY, AND RELATED ASSEMBLIES, SYSTEMS, AND METHODS," the disclosure of which is incorporated herein by reference in its entirety.

TECHNICAL FIELD

The present disclosure relates to a valve member including a dome-shaped cavity, and related assemblies, systems, and methods and, more particularly, to a valve member including a dome-shaped cavity, and related assemblies, systems, and methods for high-power pumps.

BACKGROUND

Pumps may be used to transfer fluid having a first pressure from one location to another location at a second pressure greater than the first pressure. Pumps often include valves to control the flow of fluid into, from, and through a pump chamber of the pump. For example, a reciprocating plunger pump may include a first one-way valve or check valve to allow fluid to be drawn into the pump and a second one-way valve or check valve to permit the discharge of the fluid drawn into the pump while the first valve is closed. For example, the first valve may open to allow fluid to be drawn into the pump while the second valve is closed, and thereafter the first valve may close while the second valve is open while a plunger in the pump increases the pressure of the fluid and forces the fluid through the second valve to pump the fluid.

An example of a high-power pump may be used, for example, to pump fracturing fluid at high pressures and high flow rates during a hydraulic fracturing operation. For example, a hydraulic fracturing operation involves pumping a fracturing fluid at high flow rates and high pressures sufficient to fracture a reservoir formation to allow hydrocarbons to more easily flow from the formation toward a wellbore for production. Such high flow rates and high pressures may result in significant wear to components associated with the fluid flow, such as the pumps used to pump the fracturing fluid. In addition, the fracturing fluid may contain substances, for example, proppants and fluids, having abrasive and corrosive characteristics, and thus, components associated with the fracturing operation may exhibit high wear rates or high failure rates. As a result, components associated with pumps, such as valves and seals, may be particularly susceptible high wear rates and failures, thereby requiring replacement. For example, it may not be uncommon to replace valves and/or seals relatively frequently during the service life of a high-power pump, such as a pump used for a hydraulic fracturing operation, which may result in relatively high maintenance and service costs over the service life of the high-power pump.

For at least these reasons, Applicant has recognized that it may be desirable to provide valve members, and related assemblies, systems, and methods resulting in relatively increased economic efficiencies associated with replacing the valve members of a high-power pumps. At least some examples described herein may address one or more of the above-noted potential issues, as well as possibly others.

SUMMARY

As referenced above, it may be desirable to provide valve members, and related assemblies, systems, and methods resulting in relatively increased economic efficiencies associated with replacing the valve members of high-power pumps, such as, for example, valve members used in the oil and gas industry, where the operating conditions and fluids may present a particularly harsh environment. In some embodiments, the valve members presented herein may have a relatively reduced mass and may substantially maintain the strength of a valve head of the valve member, even though the valve head may have a relatively reduced mass. For example, in some embodiments, a valve member may include a valve head at least partially defining a cavity that may serve to reduce the mass of the valve member, for example, by reducing the amount of material from which the valve member is formed. This, in turn, may result in economic efficiencies associated with, for example, manufacturing and/or shipping the valve member. In some embodiments, the valve member may substantially maintain its resistance to stress associated with forces applied to an exterior surface of the valve head during operation of a high-power pump including the valve member, for example, even though the valve member has a relatively reduced mass.

According to some embodiments, a valve member for a high-power pump may include a valve body defining a valve body axis, an axial cross-section transverse to the valve body axis, and a radial cross-section defined by a radial plane extending through the valve body and coextensive with the valve body axis. The valve body may include a valve head having a substantially circular axial cross-section including a radially outer perimeter. The valve head further may have a seal engaging surface positioned to receive a valve seal. The seal engaging surface may be associated with the radially outer perimeter and may have a first axial position relative to the valve body axis. The valve head also may have an exterior side facing in a first direction along the valve body axis, and an interior side facing in a second direction opposite the first direction. The valve head further may have a cavity at least partially defining a cavity interior. The cavity interior may extend between a cavity opening and a cavity end. The cavity interior may extend from the cavity opening at a second axial position spaced from the first axial position of the seal engaging surface relative to the valve body axis and to at least an axial mid-point of the first axial position to the cavity end at a third axial position relative to the valve body axis, thereby to reduce mass of the valve member and substantially maintain strength of the valve head.

According to some embodiments, a valve member for a high-power pump may include a valve body defining a valve body axis, an axial cross-section transverse to the valve body axis, and a radial cross-section defined by a radial plane extending through the valve body and coextensive with the valve body axis. The valve body may include a valve head having a substantially circular axial cross-section including a radially outer perimeter. The valve head further may have a seal engaging surface positioned to receive a valve seal. The seal engaging surface may be associated with the radially outer perimeter and may have a first axial position relative to the valve body axis. The valve head also may have an exterior side facing in a first direction along the valve body axis, and an interior side facing in a second direction opposite the first direction. The valve head further may have a cavity at least partially defining a cavity interior. The cavity interior may extend between a cavity opening and a cavity end. The cavity interior may extend from the cavity opening at a second axial position spaced from the first axial position of the seal engaging surface relative to the valve body axis and to at least an axial mid-point of the first axial position to the cavity end at a third axial position relative to the valve body axis, thereby to reduce mass of the valve member and substantially maintain strength of the valve head.

According to some embodiments, a valve assembly to enhance sealing of a fluid flow in a high-pressure pump assembly may include a valve member positioned to move between an open position allowing fluid flow through the valve assembly and a closed position preventing fluid flow through the valve assembly. The valve member may include a valve body defining a valve body axis, an axial cross-section transverse to the valve body axis, and a radial cross-section defined by a radial plane extending through the valve body and coextensive with the valve body axis. The valve body may include a valve head having a substantially circular axial cross-section including a radially outer perimeter. The valve head further may have a seal engaging surface positioned to receive a valve seal. The seal engaging surface may be associated with the radially outer perimeter and may have a first axial position relative to the valve body axis. The valve head also may have an exterior side facing in a first direction along the valve body axis, and an interior side facing in a second direction opposite the first direction. The valve head further may have a cavity at least partially defining a cavity interior. The cavity interior may extend between a cavity opening and a cavity end. The cavity interior may extend from the cavity opening at a second axial position spaced from the first axial position of the seal engaging surface relative to the valve body axis and to at least an axial mid-point of the first axial position to the cavity end at a third axial position relative to the valve body axis, thereby to reduce mass of the valve member and substantially maintain strength of the valve head. The valve assembly further may include a valve seal engaged with the seal engaging surface of the valve head. The valve seal also may include a seat engaging surface. The valve assembly also may include a valve seat including a substantially cylindrical body at least partially defining an opening therethrough and a seat surface. The seat surface may be positioned to abut the seat engaging surface of the valve seal to thereby prevent fluid flow through the valve assembly.

According to some embodiments, a fluid end assembly for a high-pressure reciprocating pump may include a fluid end housing at least partially defining a chamber, a port positioned to provide fluid communication with the chamber, and a valve assembly received in the port of the fluid end housing and positioned control fluid flow through the port. The valve assembly may have a valve member positioned to move between an open position allowing fluid flow through the valve assembly and a closed position preventing fluid flow through the valve assembly. The valve member may include a valve body defining a valve body axis, an axial cross-section transverse to the valve body axis, and a radial cross-section defined by a radial plane extending through the valve body and coextensive with the valve body axis. The valve body may include a valve head having a substantially circular axial cross-section including a radially outer perimeter. The valve head further may have a seal engaging surface positioned to receive a valve seal. The seal engaging surface may be associated with the radially outer perimeter and may have a first axial position relative to the valve body axis. The valve head also may have an exterior side facing in a first direction along the valve body axis, and an interior side facing in a second direction opposite the first direction. The valve head further may have a cavity at least partially defining a cavity interior. The cavity interior may extend between a cavity opening and a cavity end. The cavity interior may extend from the cavity opening at a second axial position spaced from the first axial position of the seal engaging surface relative to the valve body axis and to at least an axial mid-point of the first axial position to the cavity end at a third axial position relative to the valve body axis, thereby to reduce mass of the valve member and substantially maintain strength of the valve head. The valve member further may include a valve seal engaged with the seal engaging surface of the valve head. The valve seal further may include a seat engaging surface. The fluid end assembly further may include a valve seat including a substantially cylindrical body at least partially defining an opening therethrough and a seat surface. The seat surface may be positioned to abut the seat engaging surface of the valve seal, to thereby prevent fluid flow through the valve assembly.

According to some embodiments, a method for increasing a strength-to-weight ratio of a valve member for a high-power pump may include providing a valve head of the valve member, such that the valve head includes a cavity having a cavity interior extending from a cavity opening to a cavity end. The method further may include positioning the cavity interior, such that the cavity opening is spaced from a seal engaging surface of the valve head and the cavity end includes one of: (a) substantially aligned with an axial mid-point of the seal engaging surface or (b) on an opposite side of the seal engaging surface relative to the cavity opening.

According to some embodiments, a valve member for a high-power pump may include a valve body defining a valve body axis, an axial cross-section transverse to the valve body axis, and a radial cross-section defined by a radial plane extending through the valve body and coextensive with the valve body axis. The valve body may include a valve head having a substantially circular axial cross-section including a radially outer perimeter. The valve head further may include an exterior side facing in a first direction and an interior side facing in a second direction opposite the first direction. The valve head also may include a seal engaging surface positioned to receive a valve seal. The seal engaging surface may be associated with the radially outer perimeter and may at least partially face the second direction. The exterior side may have an exterior surface, and the exterior surface may define a concave portion and a protrusion extending axially from the concave portion to a remote end spaced from the concave portion, thereby to reduce mass of the valve member and substantially maintain strength of the valve head.

Still other aspects and advantages of these exemplary embodiments and other embodiments, are discussed in detail herein. Moreover, it is to be understood that both the foregoing information and the following detailed description provide merely illustrative examples of various aspects and embodiments and are intended to provide an overview or framework for understanding the nature and character of the claimed aspects and embodiments. Accordingly, these and other objects, along with advantages and features of the present disclosure, will become apparent through reference to the following description and the accompanying drawings. Furthermore, it is to be understood that the features of the various embodiments described herein are not mutually exclusive and may exist in various combinations and permutations.

BRIEF DESCRIPTION OF THE DRAWINGS

The accompanying drawings, which are included to provide a further understanding of the embodiments of the present disclosure, are incorporated in and constitute a part of this specification, illustrate embodiments of the present disclosure, and together with the detailed description, serve to explain principles of the embodiments discussed herein. No attempt is made to show structural details of this disclosure in more detail than may be necessary for a fundamental understanding of the embodiments discussed herein and the various ways in which they may be practiced. According to common practice, the various features of the drawings discussed below are not necessarily drawn to scale. Dimensions of various features and elements in the drawings may be expanded or reduced to more clearly illustrate embodiments of the disclosure.

FIG. 2C is a schematic bottom perspective view of the example valve member shown in FIG. 2B, according to embodiments of the disclosure.

FIG. 2E is a schematic side section view of the example valve member shown in FIG. 2B, according to embodiments of the disclosure.

FIG. 5C is a schematic perspective bottom view of the example valve member shown in FIG. 5A, according to embodiments of the disclosure.

FIG. 9 is a schematic partial side section view of another example valve member, according to embodiments of the disclosure.

DETAILED DESCRIPTION

Figure 1:
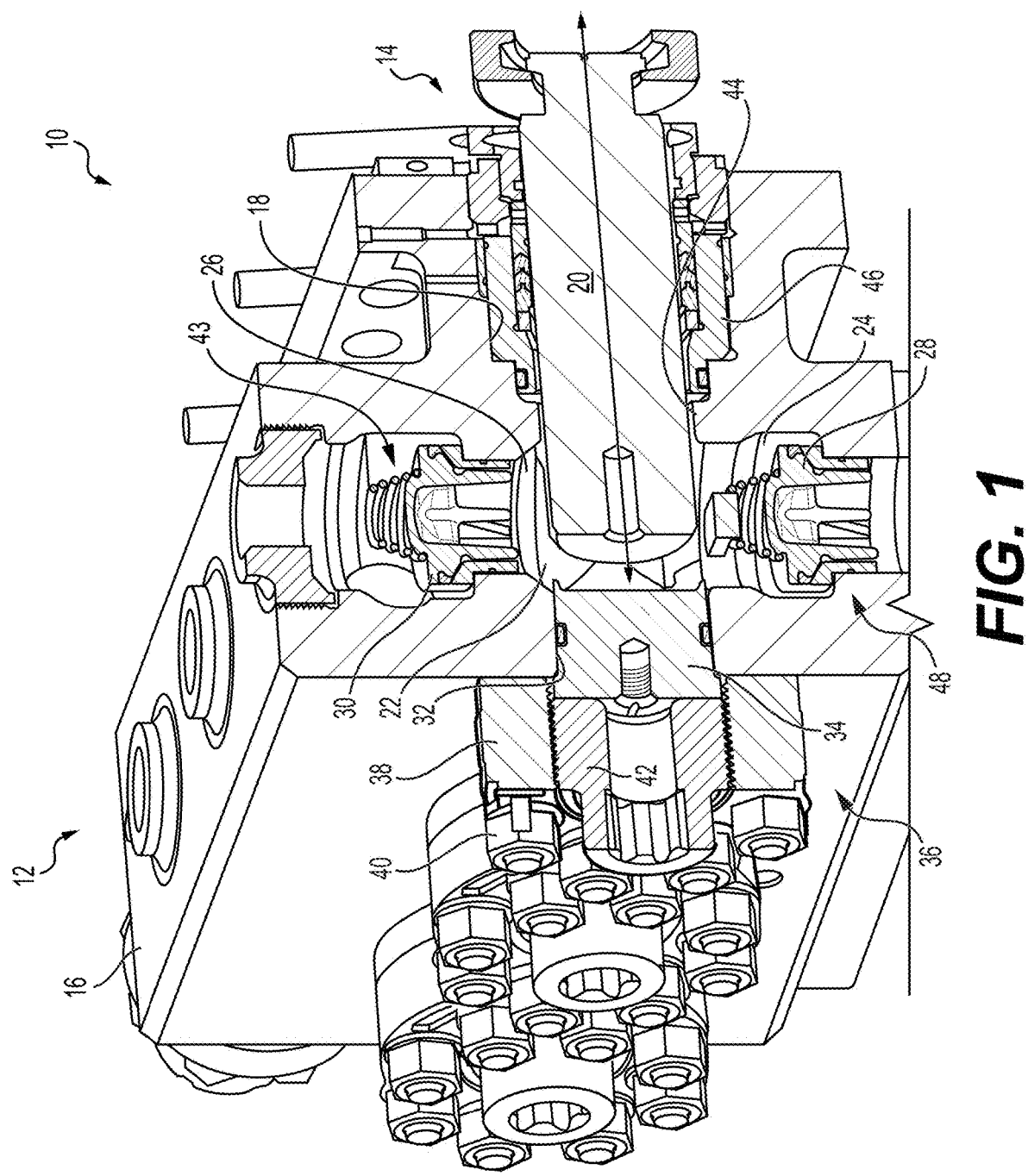
FIG. 1 is a schematic perspective section view of an example high-power pump and fluid end including example valve assemblies, according to embodiments of the disclosure.

The drawings include like numerals to indicate like parts throughout the several views, the following description is provided as an enabling teaching of exemplary embodiments, and those skilled in the relevant art will recognize that many changes may be made to the embodiments described. It also will be apparent that some of the desired benefits of the embodiments described may be obtained by selecting some of the features of the embodiments without utilizing other features. Accordingly, those skilled in the art will recognize that many modifications and adaptations to the embodiments described are possible and may even be desirable in certain circumstances. Thus, the following description is provided as illustrative of the principles of the embodiments and not in limitation thereof.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, in particular, to mean "including but not limited to," unless otherwise stated. Thus, the use of such terms is meant to encompass the items listed thereafter, and equivalents thereof, as well as additional items. The transitional phrases "consisting of" and "consisting essentially of," are closed or semi-closed transitional phrases, respectively, with respect to any claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish claim elements.

The present disclosure generally is directed to valve members including a cavity, and related assemblies, systems, and methods for high-power pumps. For example, in some embodiments, the valve members presented herein may have a relatively reduced mass and may substantially maintain the strength of a valve head of the valve member, even though the valve head may have a relatively reduced mass. For example, in some embodiments, a valve member may include a valve head at least partially defining a cavity that may serve to reduce the mass of the valve member, for example, by reducing the amount of material from which the valve member is formed. This, in turn, may result in economic efficiencies associated with, for example, manufacturing and/or shipping the valve member. In some embodiments, the valve member may substantially maintain its strength associated with forces applied to an exterior surface of the valve head (e.g., from fluid pressure) during operation of a high-power pump including the valve member, for example, even though the valve member has a relatively reduced mass. In some embodiments, the cavity may be one or more of substantially concave or substantially dome-shaped. In some embodiments, the interior of the cavity may be one or more of substantially concave or substantially dome-shaped.

For example, FIG. 1 is a schematic partial perspective section view of an example pump 10, including an example fluid end assembly 12 and a schematic depiction of an example power end assembly 14, according to embodiments of the disclosure. The pump 10 may be any high-power pump, high-pressure pump, reciprocating pump, and/or high-flow rate pump suitable for pumping solids, semi-solids, slurries, liquids, fluids, or combinations thereof. In some embodiments, the pump 10 may be, for example, a hydraulic fracturing pump for pumping hydraulic fracturing fluid. Although embodiments of the pump 10 are described herein as being a "hydraulic fracturing pump" for pumping hydraulic fracturing fluid for the purpose of discussion, the pump 10 may be any other type of pump, such as, for example, any type of high-power pump, high-pressure pump, reciprocating pump, and/or high-flow rate pump suitable for pumping solids, semi-solids, slurries, liquids, fluids, or combinations thereof. In some embodiments, the pump 10 may be, for example, a hydraulic fracturing pump for pumping solids, semi-solids, slurries, liquids, fluids, or combinations thereof, such as hydraulic fracturing fluid.

For example, a reciprocating plunger pump may be used to pump a fracturing fluid at high flow rates and high pressures sufficient to fracture a reservoir formation to allow hydrocarbons to more easily flow from the formation toward a wellbore for production. A hydraulic fracturing operation may include as many as six or more hydraulic fracturing units, and each of the hydraulic fracturing units may include a prime mover, such as an electric motor or internal combustion engine, either directly connected, or connected via a transmission, to the reciprocating plunger pump to supply power to drive the reciprocating plunger pump to pump the fracturing fluid into the formation to stimulate production of the well. For example, typical flow rates for a hydraulic fracturing operation may range from about 1,500 to about 4,000 gallons per minute, and typical pressures may range from about 7,500 to about 15,000 pounds per square inch. Although many examples discussed in this disclosure are explained in relation to hydraulic fracturing pumps, such as reciprocating plunger pumps for pumping fracturing fluid and related methods, other flow control-related and/or pumping-related operations, components, and methods are contemplated.

As shown in FIG. 1, the example pump 10 may be a reciprocating plunger pump and may include the fluid end assembly 12 and a power end assembly 14. The power end assembly 14 may include, for example, a housing with mechanical power transmission components, such as a crankshaft, bearings supporting the crankshaft in the housing, crossheads, reduction gears, and/or connecting rods and plungers connected to the connecting rods. As shown in FIG. 1, the fluid end assembly 12 may include, for example, a fluid end housing 16 including one or more cylinders 18 in which respective plungers 20 reciprocate, one or more chambers 22 receiving fluid, one or more suction ports 24 for drawing fluid into the one or more chambers 22, and one or more discharge ports 26 for discharging fluid from the one or more chambers 22 at a higher pressure. For example, as each plunger 20, moved via operation of the crankshaft and a respective connecting rod of the power end assembly 14, at least partially retracts into a respective cylinder 18, fluid is drawn into the chamber 22 of the fluid end assembly 12 via the suction port 24 in the fluid end housing 16 while an intake valve 28 is open and a discharge valve 30 is closed. As each plunger 20 extends back toward the chamber 22, moved via operation of the crankshaft and the respective connecting rod of the power end assembly 14, pressurized fluid is discharged from the fluid end assembly 12 via the discharge port 26 in the fluid end housing 16 while the discharge valve 30 is open and the intake valve 28 is closed. The intake valve 28 and discharge valve 30 may be one-way valves or check valves, allowing fluid to flow only in a single direction, either into the chamber 22 of the fluid end housing 16 via the intake valve 28, or from the chamber 22 of the fluid end housing 16 via the discharge valve 30. In this example manner, the fluid end assembly 12 draws fluid into the fluid end assembly 12 at a first pressure and discharges the fluid from the fluid end assembly 12 at a higher pressure. In some pump embodiments, the fluid end assembly 12 may include multiple (e.g., two, three, four, or five) sets of intake ports, cylinders, plungers, and discharge ports to pump fluid at high pressures and/or high flow rates.

As shown in FIG. 1, according to some embodiments, the fluid end assembly 12 may include an access port 32 providing access to the chamber 22, for example, for use during assembly and/or maintenance of the fluid end assembly 12. The access port 32 may be selectively closed via a cover 34 received in the access port 32. In some embodiments, the access port 32 may be defined in the fluid end housing 16 by a circular aperture having an interior face having a substantially cylindrical configuration, for example, as shown in FIG. 1. In some embodiments, the cover 34 may have a substantially circular cross-section and may have a substantially cylindrical configuration sized and shaped to fit within the interior face of the access port 32, for example, as shown in FIG. 1. In some embodiments, the cover 34 may be sized and shaped to fit snugly within the access port 32. In some embodiments, a retainer assembly 36 may be used to secure the cover 34 within the access port 32. As shown, in some embodiments, the retainer assembly 36 may include an outer housing 38 configured to be secured to an exterior surface of the fluid end housing 16 adjacent the access port 32, for example, via one of more fasteners 40 (e.g., studs and nuts), as shown. The outer housing 38 may define a receiver aperture provided with interior threads. The retainer assembly 36 further may include a retainer 42, which may include a substantially cylindrical body having exterior threads configured to threadedly engage the interior threads of the outer housing 38. In some embodiments, the retainer 42 may be threaded into the outer housing 38 and abut an exterior end of the cover 34, thereby to secure the cover 34 in the access port 32.

As shown in FIG. 1, in some embodiments, the fluid end housing 16 may include a plunger port 44 and a sleeve 46 received in the plunger port 44. The plunger port 44 and the sleeve 46 may be substantially cylindrical, with the plunger port 44 having a substantially circular cross-section and the sleeve 46 having a substantially cylindrical outer surface received in the plunger port 44. The sleeve 46 may be configured to at least partially receive therein the plunger 20 as the plunger 20 reciprocates, thereby to draw fluid into the chamber 22 at a first pressure via the suction port 24 during movement of the plunger 20 in a first direction and discharge the fluid from the chamber 22 at a second pressure greater than the first pressure via the discharge port 26 during movement of the plunger 20 in a second direction opposite the first direction.

Figure 2A:
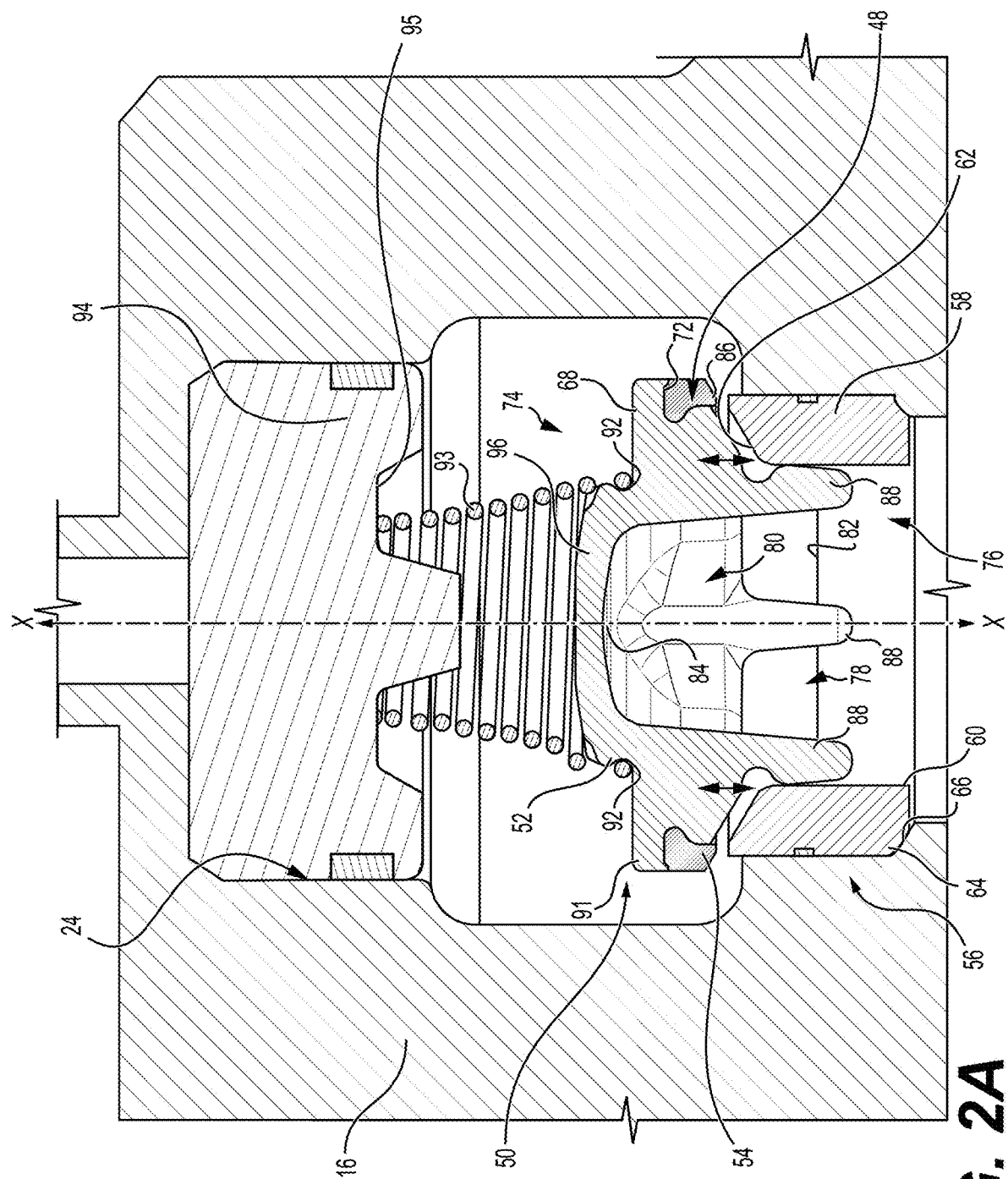
FIG. 2A is a schematic section view of an example valve assembly in an open condition in an example fluid end assembly, according to embodiments of the disclosure.

FIG. 2A is a schematic partial section view of an example valve assembly 48 in an open condition in an example fluid end assembly 12, according to embodiments of the disclosure. As shown in FIG. 2A, some embodiments of the valve assembly 48 may include a valve member 50 positioned in the valve assembly 48 to move between an open position allowing fluid flow through the valve assembly 48 (e.g., as shown in FIG. 2A) and a closed position preventing fluid flow through the valve assembly 48. As shown, some embodiments of the valve member 50 may include a valve body 52 and a valve seal 54 connected to the valve body 52. The valve assembly 48 further may include a valve seat 56 including a substantially cylindrical valve seat body 58 at least partially defining an opening 60 therethrough and a seat surface 62. The seat surface 62 may be positioned and configured to abut the valve seal 54 to thereby prevent fluid flow through the valve assembly 48 and the suction port 24 or discharge port 26, depending on the location and function of the valve assembly 48 in the fluid end housing 16.

In some embodiments, as shown in FIG. 2A, the valve seat body 58 also may include a tapered end 64 at an end of the valve seat body 58 opposite the seat surface 62 and configured to abut or engage a passage shoulder 66 of the intake port 24 and/or the discharge port 26, depending on the location of the valve assembly 48 in the fluid end housing 16. The valve seat body 58, in some embodiments, may be configured to be installed in the intake port 24 and/or the discharge port 26 via a press fit, for example, to abut the passage shoulder 66, and in some embodiments, the exterior surface of the valve seat body 58 may include external threads configured to be threadedly engaged with internal threads in the intake port 24 and/or the discharge port 26.

Figure 2B:
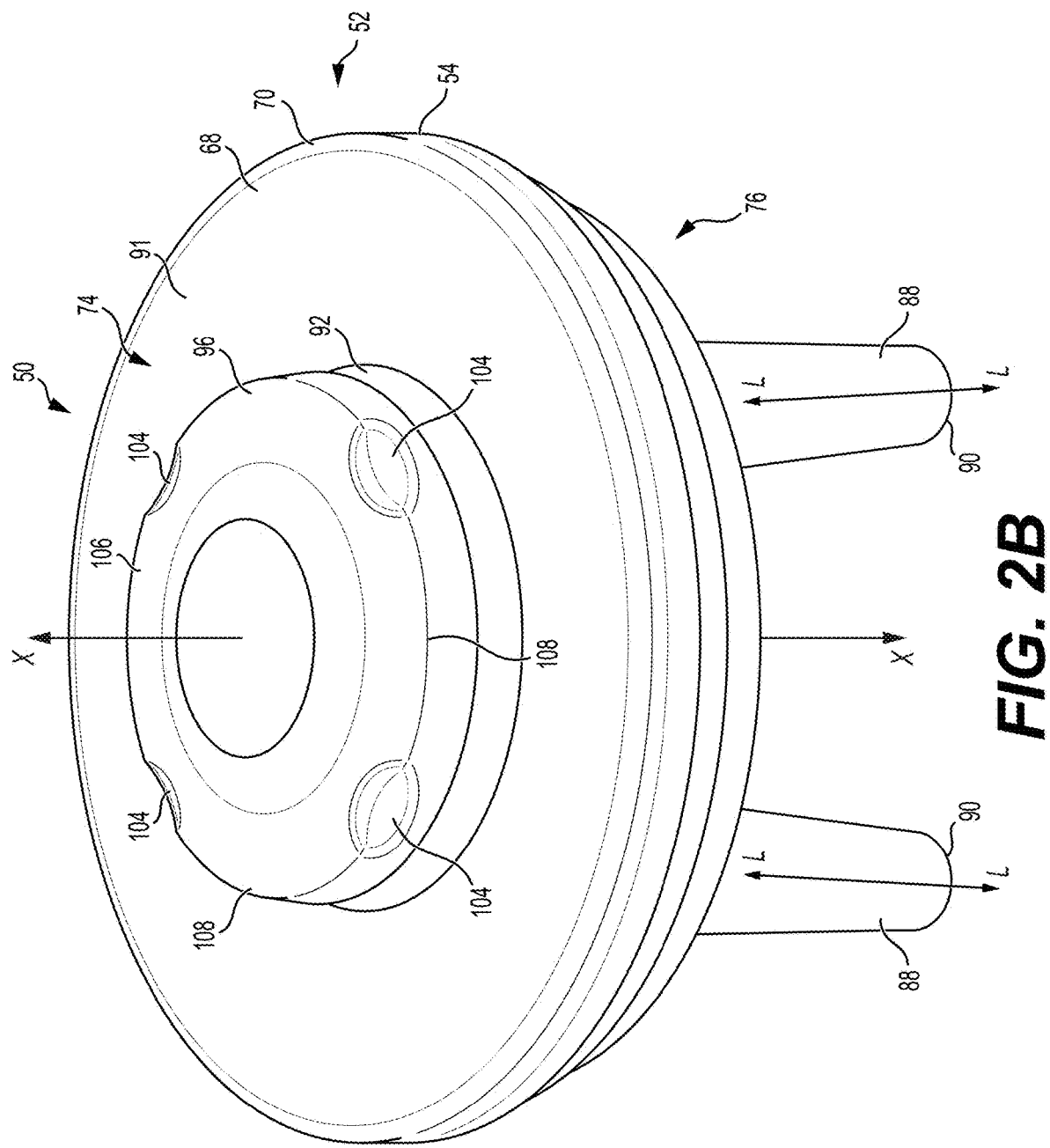
FIG. 2B is a schematic top perspective view of an example valve member of the example valve assembly shown in FIG. 2A, according to embodiments of the disclosure.
Figure 2D:
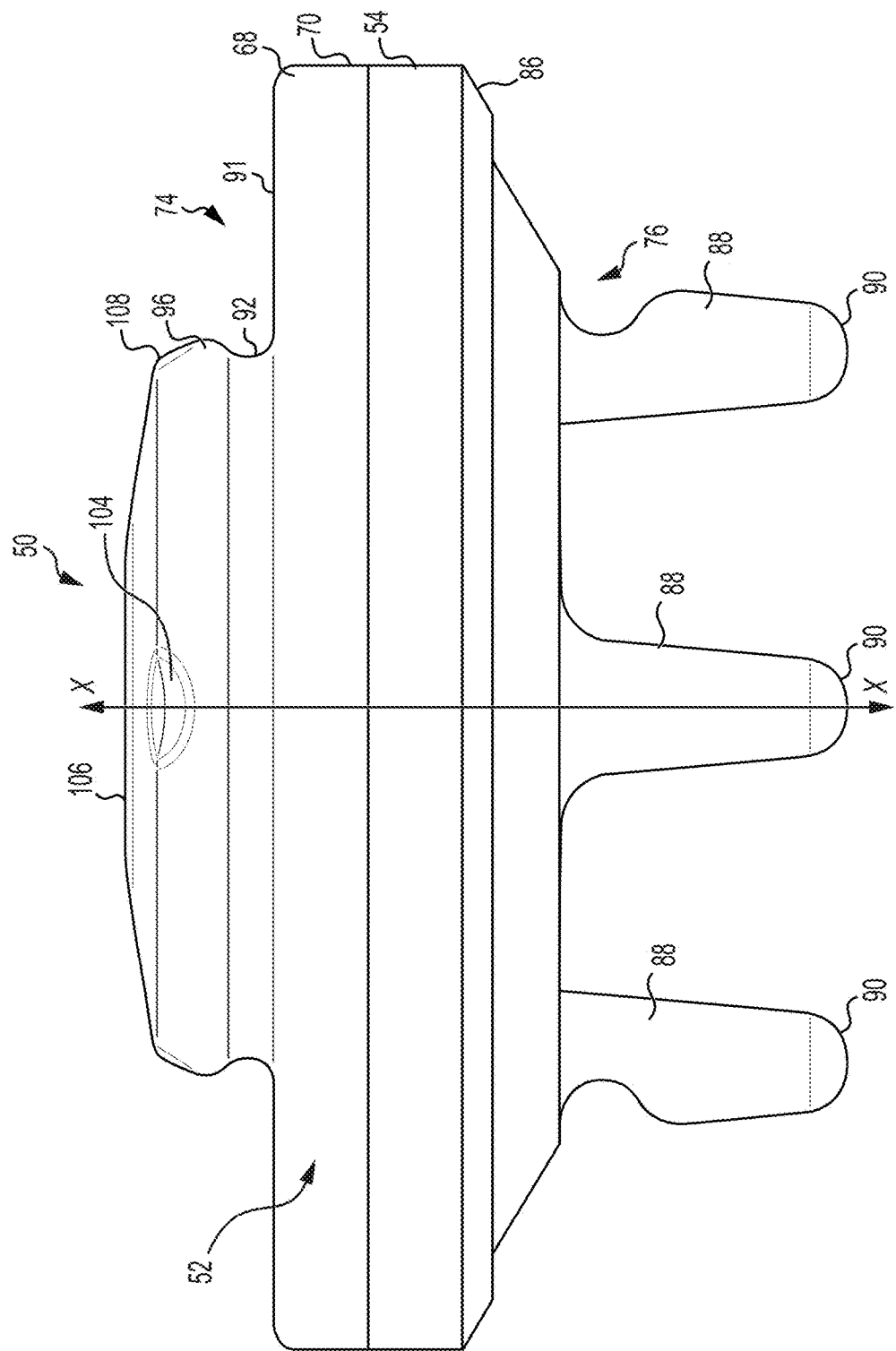
FIG. 2D is a schematic side view of the example valve member shown in FIG. 2B, according to embodiments of the disclosure.
Figure 2E:
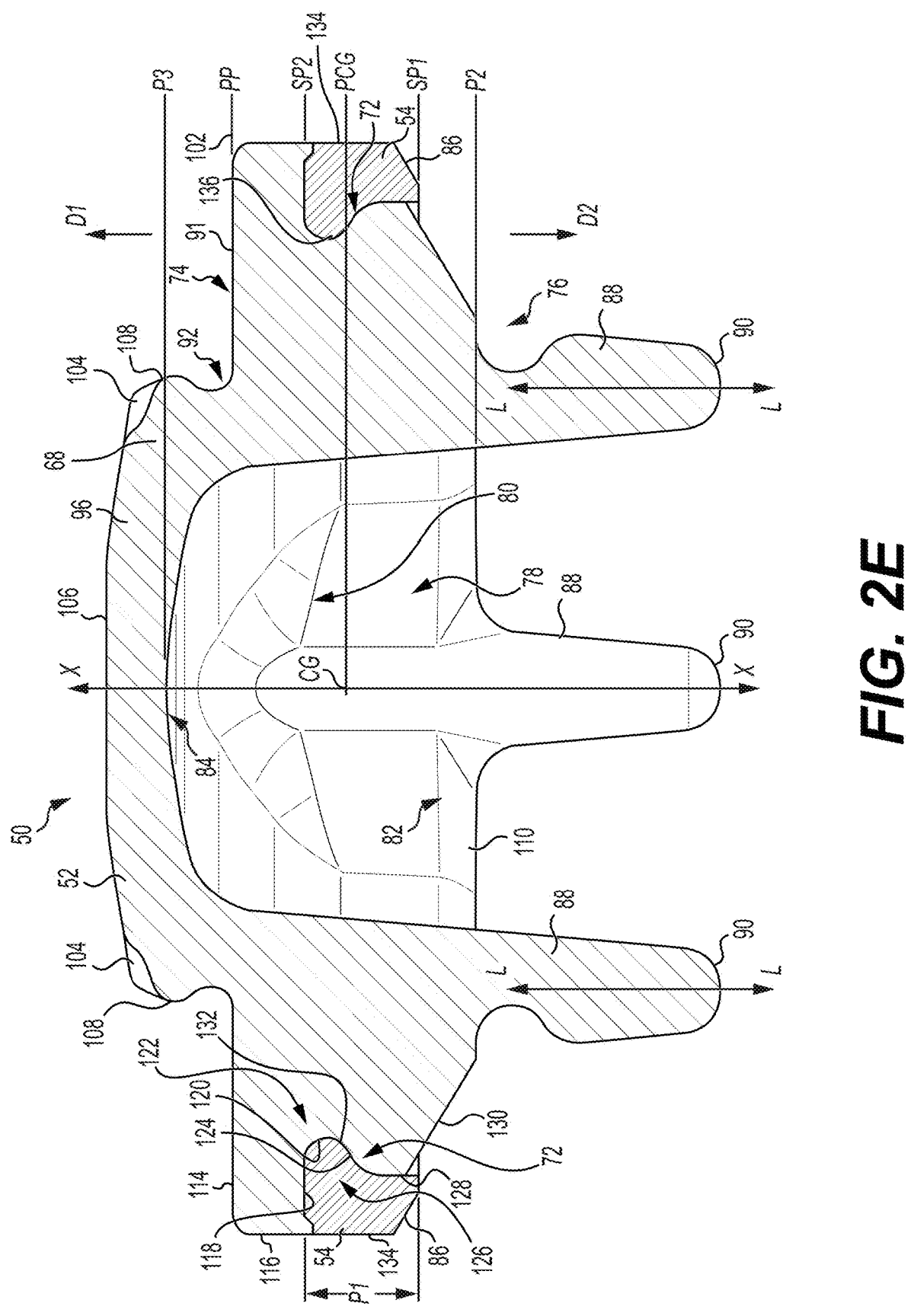
Figure 2F:
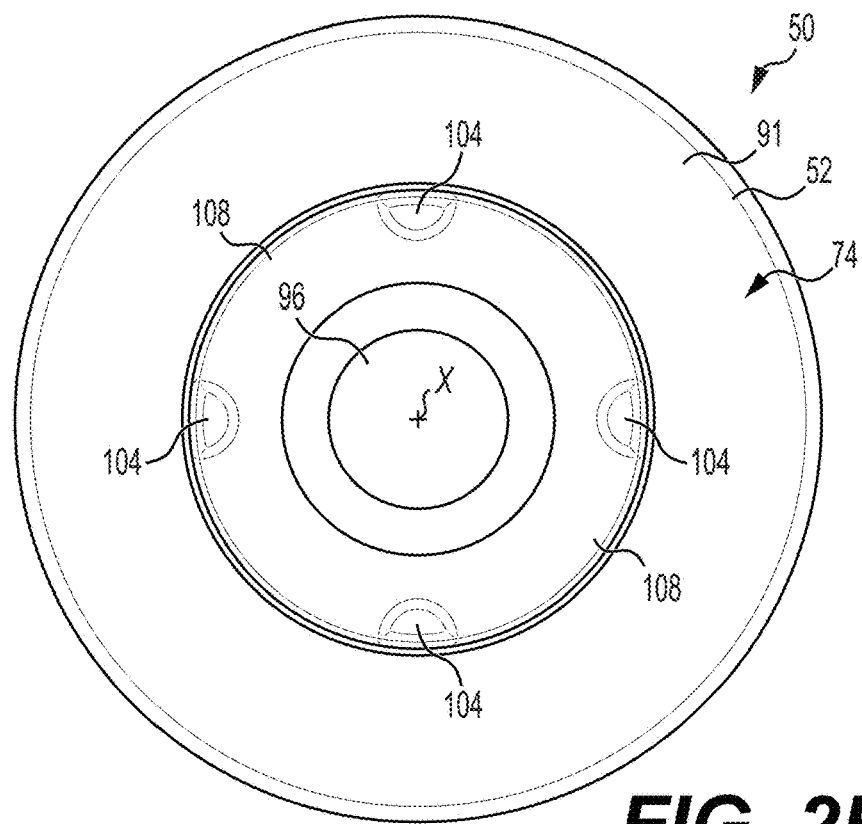
FIG. 2F is a schematic top view of the example valve member shown in FIG. 2B, according to embodiments of the disclosure.
Figure 2G:
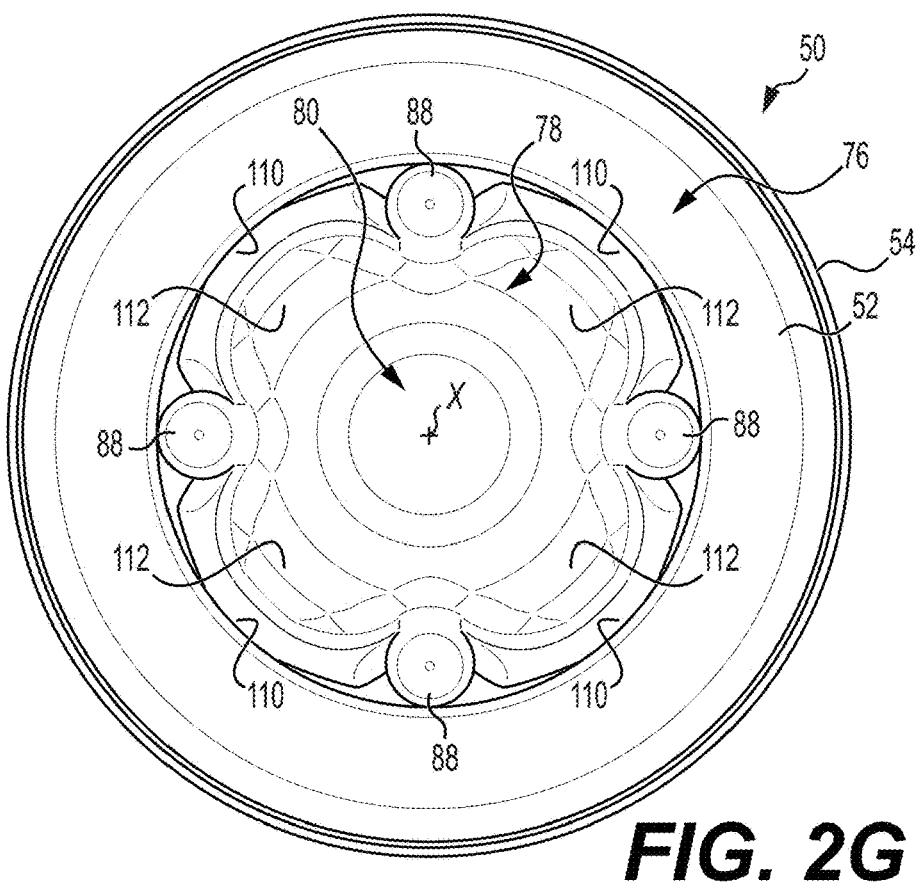
FIG. 2G is a schematic bottom view of the example valve member shown in FIG. 2B, according to embodiments of the disclosure.

FIG. 2B is a schematic top perspective view of an example valve member 50 of the example valve assembly 48 shown in FIG. 2A, according to embodiments of the disclosure. FIG. 2C is a schematic bottom perspective view of the example valve member 50 shown in FIG. 2B. FIG. 2D is a schematic side view of the example valve member shown in FIG. 2B. FIG. 2E is a schematic side section view of the example valve member 50 shown in FIG. 2B. FIG. 2F is a schematic top view of the example valve member shown in FIG. 2B, and FIG. 2G is a schematic bottom view of the example valve member shown in FIG. 2B.

As shown in FIG. 2A, in some embodiments, the valve body 52 defines a longitudinal valve body axis X, an axial cross-section transverse to the valve body axis X (see, e.g., FIG. 2G, which shows a schematic bottom view of an example valve body 52), and a radial cross-section defined by a radial plane extending through the valve body 52 and coextensive with the valve body axis X (see, e.g., FIGS. 2A and 2E). As shown in FIG. 2A through FIG. 2G, the valve body 52 may include a valve head 68. As shown, the valve head 68 may have a substantially circular axial cross-section including a radially outer perimeter 70. The valve head 68 further may have a seal engaging surface 72 positioned to receive the valve seal 54. As shown in, for example, FIG. 2E, the seal engaging surface 72 may be associated with the radially outer perimeter 70 of the valve head 68. The seal engaging surface 72 may be located at a first axial position P1 relative to the valve body axis X. In some embodiments, one or more of the valve body 52 or the valve head 68 may comprise (or be formed from) one or more of a polymeric material, a composite material, or a corrosion-resistant alloy. The corrosion-resistant alloy may include any alloy comprising at least about 10.5% chromium.

As shown in FIGS. 2B, 2E, and 2F, the valve head 68 further may have an exterior side 74 facing in a first direction D1 along the valve body axis X, for example, substantially parallel to the valve body axis X. The valve head 68 also may have an interior side 76 facing in a second direction D2 opposite the first direction D1, for example, along the valve body axis X (e.g., substantially parallel to the valve body axis X).

As shown in, for example, FIGS. 2A and 2E, in some embodiments, the valve head 68 further may have a cavity 78 at least partially defining a cavity interior 80. The cavity interior 80 may extend between a cavity opening 82 and a cavity end 84, for example, as shown in FIG. 2E. In some embodiments, the cavity opening 82 may be axially positioned at a second axial position P2 relative to the valve body axis X, and the cavity end 84 may be axially positioned at a third axial position P3 relative to the valve body axis X, for example, as shown in FIG. 2E. According to some embodiments, this example configuration may result in reducing the mass of the valve member 50 and substantially maintaining the strength of the valve head 68. In some embodiments, the cavity 78 may be one or more of substantially concave or substantially dome-shaped. In some embodiments, the cavity interior 80 may be one or more of substantially concave or substantially dome-shaped. In some embodiments, the cavity end 84 may be located at a most axially remote extent of the cavity interior (e.g., from the axial position of the cavity opening 82) and/or a cavity apex.

For example, as shown in FIG. 2E, the cavity opening 82 may face in the second direction D2 along the valve body axis X. In some embodiments, the cavity interior 80 may extend from the second axial position P2 and at least partially overlap the first axial position P1 associated with the axial position of the seal engaging surface 72. For example, in some embodiments, the cavity interior 80 may extend between the cavity opening 82 and a cavity end 84, with the cavity interior 80 extending from the cavity opening 82 at the second axial position P2 spaced from the first axial position P1 of the seal engaging surface 72 relative to the valve body axis X and to at least an axial mid-point of the first axial position P1 to the cavity end 84 at the third axial position P3 relative to the valve body axis X. For example, the cavity interior 80 may extend from the second axial position P2 beyond the first axial position P1 to the third axial position P3, and the third axial position P3 may be opposite the second axial position P2 relative to the first axial position P1, for example, being on the opposite side of the first axial position P1 of the seal engaging surface 72 from the second axial position P2, for example, as shown in FIG. 2E.

As shown in FIG. 2E, in some embodiments, the seal engaging surface 72 may extend axially from a first axial seal engaging surface position SP1 closest to the second axial position P2 of the cavity opening 82 to a second axial seal engaging surface position SP2. In some embodiments, as shown in FIG. 2E, the third axial position P3 of the cavity end 84 may be axially located between the first axial seal engaging surface position SP1 and the second axial seal engaging surface position SP2.

The valve seal 54 may have a center of gravity CG at an axial seal position PCG relative to the valve body axis X, as shown in FIG. 2E. In at least some such embodiments, the cavity interior 80 of the valve head 68 may extend from the cavity opening 82 at the second axial position P2 to the cavity end 84 at the third axial position P3. For example, the cavity interior 80 may extend from the second axial position P2 to at least the axial seal position PCG, thereby to reduce mass of the valve member 50 and substantially maintain the strength of the valve head 68.

In some embodiments, the axial seal position of the center of gravity PCG of the valve seal 54 may be coextensive with the first axial position P1 of the seal engaging surface 72. For example, the axial seal position of the center of gravity PCG of the valve seal 54 may be axially positioned between (and in some embodiments, including) the first axial seal engaging surface position SP1 and the second axial seal engaging surface position SP2, for example, as shown in FIG. 2E. In at least some embodiments consistent with FIGS. 2A-2G, the example configuration of the cavity 78 and/or other portions of the valve member 50 may result in the valve member 50 having one or more of: (1) a relatively reduced mass or weight as compared to other valve members; (2) a relatively higher strength-to-weight ratio as compared to other valve members; (3) a relatively higher fatigue-resistance as compared to other valve members, or (4) relatively more cost-efficient manufacturing and shipping as compared to other valve members.

As shown in FIGS. 2A and 2E, in some embodiments, the valve seal 54 may include a seat engaging surface 86 positioned to abut the seat surface 62 of the valve seat 56, thereby to prevent fluid flow through the valve assembly 48 in the closed condition. For example, the seat engaging surface 86 of the valve seal 54 and the seat surface 62 of the valve seat 56 may be configured to prevent fluid flow through the opening 60 in the valve seat 56. The seat engaging surface 86 may be substantially annular and may extend in a direction oblique with respect to the valve body axis X and, in some embodiments, the seat surface 62 of the valve seat 56 may be substantially annular and may extend in a direction substantially parallel to the seat engaging surface 86, or within a range of acute angles of being substantially parallel.

As shown in FIGS. 2A, 2C, 2E, and 2G, in some embodiments, the valve body 52 further may include a plurality of guide legs 88 extending from the interior side 76 of the valve head 68. In some embodiments, each of the guide legs 88 may at least partially define a guide leg axis L extending in the second direction D2. The guide legs 88 and the opening 60 in the valve seat 56 may at least partially define a flow channel through which fluid flows when the valve member 50 is in an open position. In some embodiments, the guide legs 88 may be positioned and configured to slide axially adjacent the opening 60 in the valve seat 56 as the valve member 50 reciprocates relative to the valve seat 56 during opening and closing of the valve member 50 relative to the valve seat 56. The guide legs 88 may reduce the likelihood or prevent the valve member 50 from becoming misaligned relative to the valve seat 56. For example, as shown in FIG. 2A, the radially outer surfaces of the guide legs 88 opposite the valve head 68 may ride and/or slide along the interior surface of the opening 60 in the valve seat body 58.

In some embodiments, the guide legs 88 may include four guide legs, for example, as shown, although other numbers of guide legs 88 are contemplated, and in embodiments having two or more guide legs 88, the guide legs 88 may arranged symmetrically or asymmetrically, and in some embodiments, the guide legs 88 may be axisymmetric with respect to the valve body axis X (e.g., as shown in FIGS. 2C and 2G). Some embodiments of the valve body 52 may include three guide legs 88.

As shown in FIG. 2A, in some embodiments, the valve head 68 may include an exterior surface 91 facing in a direction away from the valve seal 54, for example, in a direction substantially parallel to the first direction D1. In some embodiments, the exterior surface 91 may at least partially define a spring recess 92, and the valve assembly 48 further may include a valve spring 93 having an end abutting the spring recess 92 (e.g., a spring coil abutting the spring recess 92) and biasing the valve member 50 against the valve seat 56. As shown in FIG. 2A, the valve assembly 48 may further include a spring retainer 94 opposite the exterior surface 91 of the valve head 68 and the spring recess 92 and configured to provide a support for the valve spring 93, which may provide a biasing force against the valve member 50. In some embodiments, the spring retainer 94 may include retainer recess 95 configured to receive therein an end of the valve spring 93 opposite the valve member 50. In some embodiments, the retainer recess 95 may be a substantially annular recess, and the spring retainer 94 may include a spring centering boss positioned and configured to substantially maintain alignment of the valve spring 93 relative to the valve member 50. As shown in FIG. 2A, the valve spring 93 is at least partially compressed, such that the valve member 50 has moved away from the valve seat 56 to an open position, thereby opening the valve assembly 48 and allowing fluid to pass between the valve seal 54 and the seat surface 62 of the valve seat 56, through the one or more guide legs 88 of the valve body 52, and through the valve assembly 48. In some embodiments, the valve spring 93 may be selected to provide a biasing force to close the valve assembly 48, for example, to maintain the seat engaging surface 86 of the valve seal 54 against the seat surface 62 of the valve seat 56 until fluid pressure of fluid pressing against the valve member 50 reaches a predetermined magnitude and overcomes the biasing force, thereby allowing fluid to flow through the valve assembly 48, for example, until the fluid pressure drops below a predetermined magnitude.

As shown in FIGS. 2A, 2E, and 2F, in some embodiments, the valve member 50 further may include a protrusion 96 extending in the first direction D1 from the exterior side 74 of the valve head 68 opposite the cavity 78. As shown in FIG. 2E, in some embodiments, an interior side 98 of the protrusion 96 may be coexistent with the cavity end 84. In some embodiments, the exterior side 74 of the valve head 68 may at least partially define the exterior surface 91. The exterior surface 91 may substantially lie in an exterior plane 102 having an axial plane position PP relative to the valve body axis X. In some embodiments, the exterior surface may not be perpendicular relative to the valve body axis X (see, e.g., FIGS. 7 and 8). As shown in FIG. 2E, the third axial position P3 of the cavity end 84 may be opposite the second axial position P2 of the cavity opening 82 relative to the axial plane position PP of the exterior surface 91.

Figure 3:
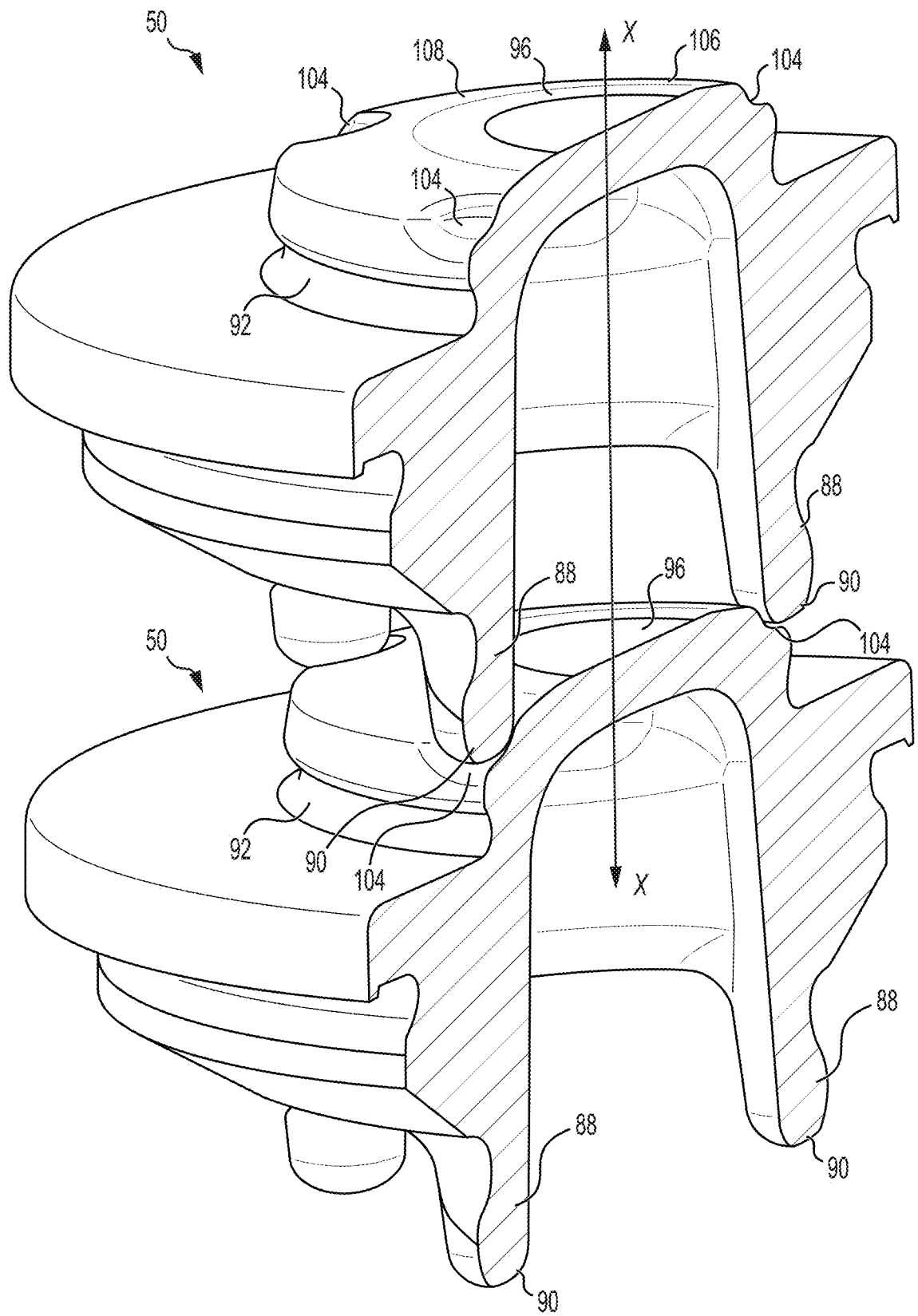
FIG. 3 is a schematic perspective section view of two of the example valve members shown in FIG. 2B in an example stacked relationship, according to embodiments of the disclosure.

As shown in FIGS. 2B, 2E, and 2F, in some embodiments, the exterior side 74 of the valve head 68 may at least partially define a plurality of recesses 104. For example, the protrusion 96 may at least partially define the plurality of recesses 104. The protrusion 96 may extend from the exterior side 74 (e.g., from the exterior surface 91) of the valve head 68 to a remote end 106 of the protrusion 96, and the remote end 106 of the protrusion 96 may at least partially define a protrusion perimeter 108. In some embodiments, the plurality of recesses 104 may be located at the protrusion perimeter 108, for example, as shown. In some embodiments, each of the plurality of recesses 104 may be positioned to receive the distal end 90 of one of the plurality of guide legs 88, thereby to facilitate vertical stacking of multiple valve members 50, for example, as shown in FIG. 3, which is a schematic perspective section view of two of the example valve members 50 shown in FIG. 2B in an example stacked relationship, according to embodiments of the disclosure. Although the embodiments shown include four recesses 104, other numbers of recesses are contemplated, such as three, five, or more, depending, for example, on the number and configuration of the guide legs 88. The combination of the recesses 104 and the guide legs 88 may result in a relatively more stable stacking arrangement, which may assist with storage and/or shipping of the valve members 50.

As shown in FIGS. 2C and 2G, in some embodiments, the cavity opening 82 may at least partially define a cavity opening perimeter 110, and one or more of the plurality of guide legs 88 may be connected to the valve head 68 at the cavity opening perimeter 110. In some embodiments, the cavity interior 80 may at least partially define an axial cross-section of the cavity 78 transverse to the valve body axis X. The axial cross-section of the cavity interior 80 may at least partially define one or more hollow lobes 112 between one or more of adjacent guide legs 88. In some embodiments, for example, as shown in FIGS. 2C and 2G, the valve member 50 may include four guide legs 88, and the axial cross-section of the cavity 78 may at least partially define four hollow lobes 112 between the adjacent guide legs 88, for example, approximating a hollow four-leaf clover-like shape, as shown. Other numbers of hollow lobes 112 are contemplated, depending on, for example, the number of guide legs 88. The hollow lobes 112, in some embodiments, may serve to further decrease the mass of the valve member 50 and substantially maintain the resistance to force applied against the exterior side 74 of the valve head 68, which may render the valve member 50 relatively more fatigue-resistant as compared to valve members having other configurations.

As shown in, for example, FIG. 2E, the valve head 68 may have a radial cross-section including a flange face 114 facing substantially parallel to the first direction D1. The radial cross-section of the valve head 68 further may include a flange edge 116 extending substantially axially in a direction substantially parallel to the valve body axis X. The seal engaging surface 72 may at least partially define a radial cross-section, and the radial cross-section of the seal engaging surface 72, in at least some embodiments, may include a return edge 118 extending radially inward from the flange edge 116 and terminating at a neck edge 120 of the seal engaging surface 72 at least partially defined by a neck 122 of the valve body 52. The radial cross-section of the seal engaging surface 72 further may include a pocket edge 124 extending from the neck edge 120, thereby to at least partially form an annular pocket 126 positioned to receive the valve seal 54. As shown, in some embodiments, the pocket edge 124 may extend obliquely relative to the valve body axis X and radially outward. The radial cross-section of the seal engaging surface 72 further may include an axial edge 128 extending axially from the pocket edge 124 to a conical edge 130 at least partially defined by the radial cross-section of valve body 52. The conical edge 130 may extend radially inward and obliquely relative to the valve body axis X. In some embodiments, the radial cross-section of the seal engaging surface 72 also may include a seal retainer lip 131 at an intersection between the flange edge 116 and the return edge 118, and the seal retainer lip 131 may extend axially in a direction substantially the same as the second direction D2.

As shown in FIG. 2E, for example, some embodiments of the valve seal 54 may be annular and may have a radial cross-section that is substantially complimentary to the radial cross-section of the seal engaging surface 72. For example, the radial cross-section of the valve seal 54 may include a valve body engaging surface 132 that substantially follows the radial cross-section of the seal engaging surface 72. The radial cross-section of the valve seal 54 may at least partially define a radially outward facing axial surface 134 intersecting with the seat engaging surface 86, and the seat engaging surface 86 may be connected to the valve body engaging surface 132.

In some embodiments, components of the valve assembly 48, such as the valve body 52, the valve seat 56, and a spring retainer 94 (see FIG. 2A), may include, or be formed from, metal, such as, for example, stainless steel and/or other similar metals. In some embodiments, at least the valve member 50 may be formed via a forging process, resulting in a forged material component, which may be relatively stronger than a similar component having a comparable mass or weight, but formed by other processes, such as, for example, casting. In some embodiments, the valve member 50 may be configured in a manner that facilitates formation via forging, for example, having draft angles that facilitate formation via forging. In at least some such examples, the valve member 50 may be formed without the need for significant post-forging machining. In some embodiments, this may result in the valve member 50 having one or more of: (1) a relatively reduced mass or weight as compared to other valve members; (2) a relatively higher strength-to-weight ratio as compared to other valve members; (3) a relatively higher fatigue-resistance as compared to other valve members, or (4) relatively more cost-efficient manufacturing and/or shipping as compared to other valve members. In some embodiments, metallic surfaces of the components may be surface-treated, heat-treated, carburized, nitride-treated, peening, and/or subjected to other surface-treating procedures to increase the durability and/or wear-resistance of the surfaces.

Figure 4A:
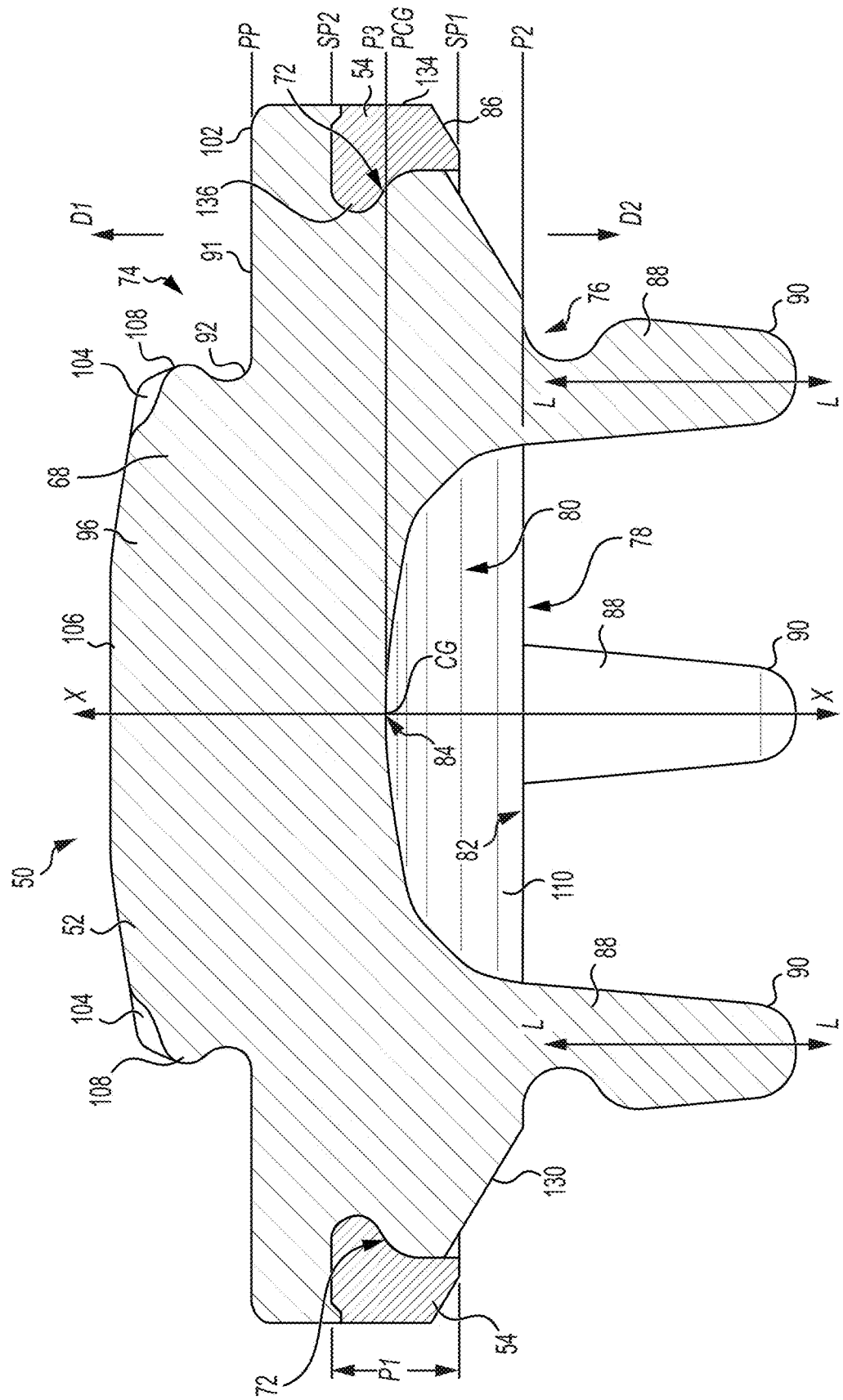
FIG. 4A is a schematic side section view of another example valve member, according to embodiments of the disclosure.
Figure 4B:
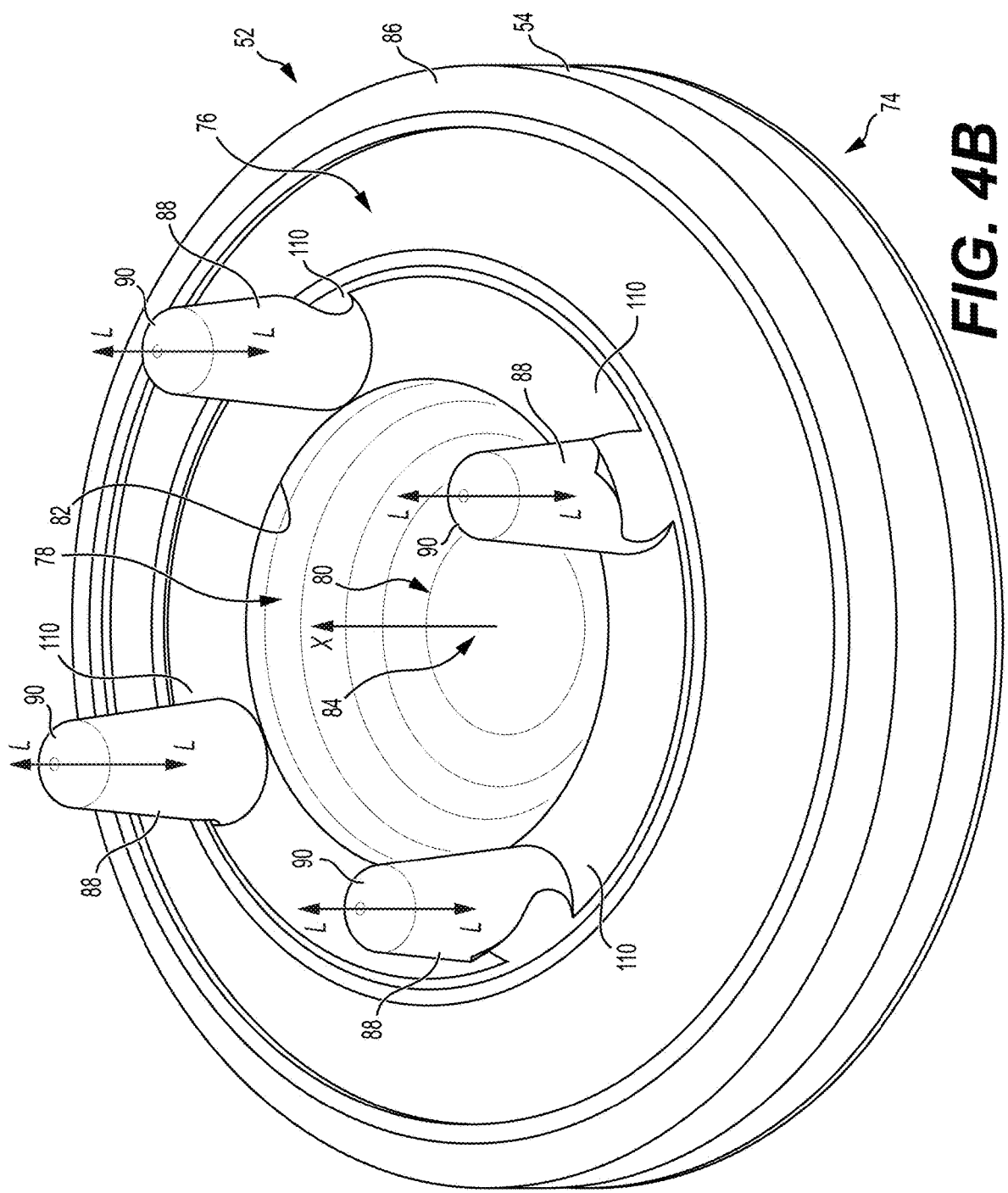
FIG. 4B is a schematic perspective bottom view of the example valve member shown in FIG. 4A, according to embodiments of the disclosure.
Figure 4C:
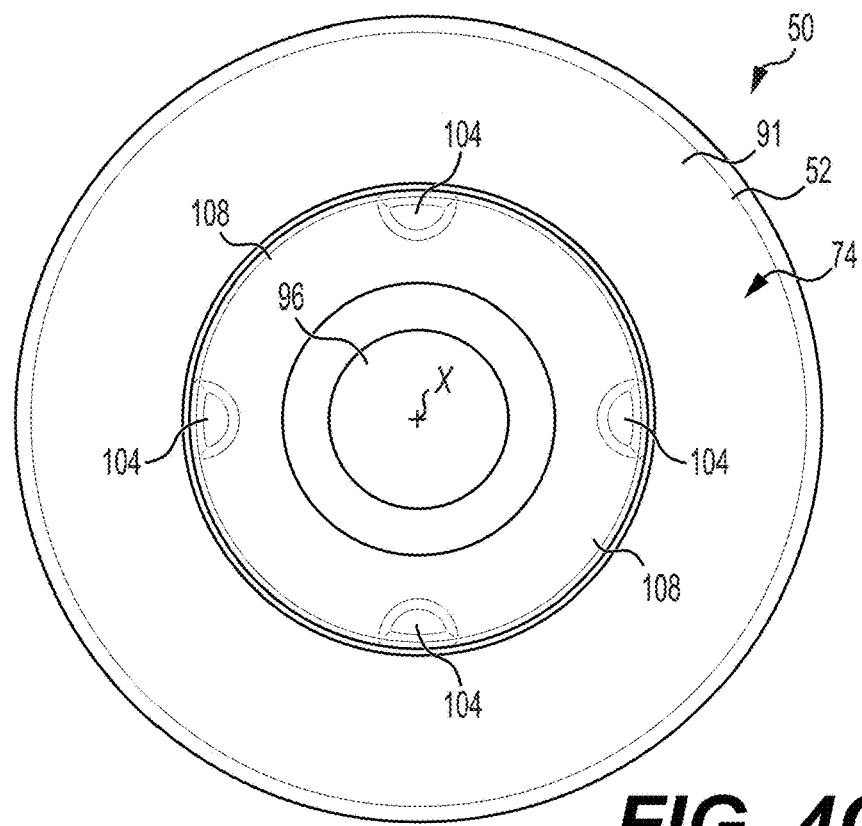
FIG. 4C is a schematic top view of the example valve member shown in FIG. 4A, according to embodiments of the disclosure.
Figure 4D:
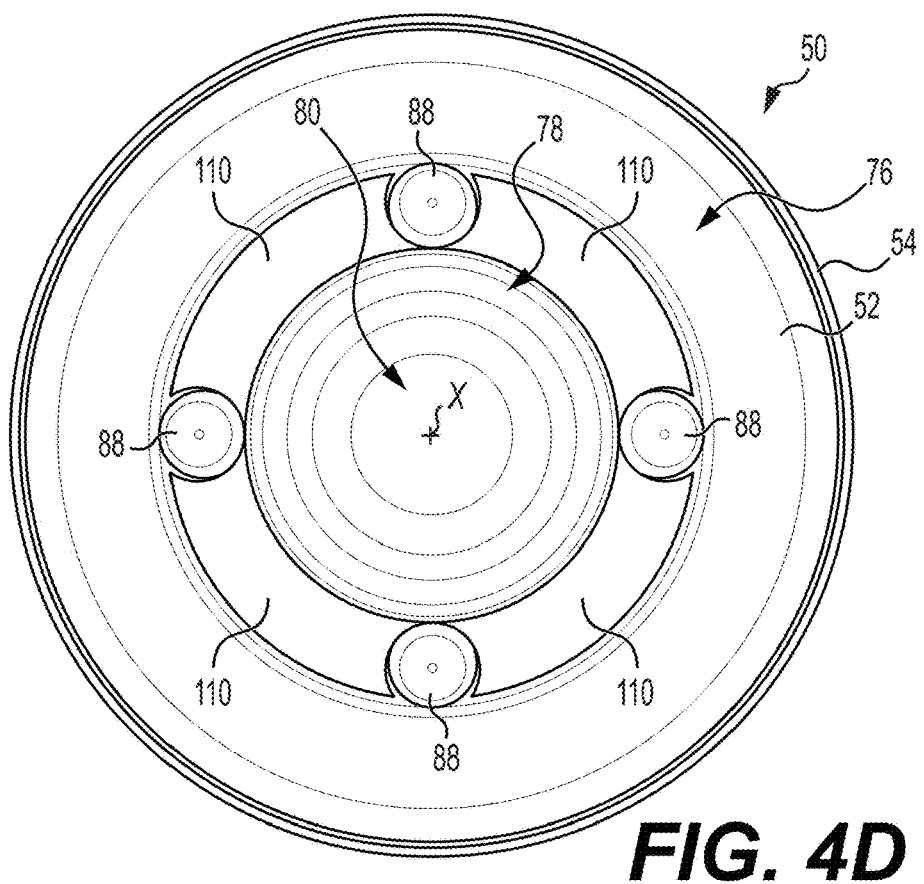
FIG. 4D is a schematic bottom view of the example valve member shown in FIG. 4A, according to embodiments of the disclosure.

FIG. 4A is a schematic side section view of another example valve member 50, according to embodiments of the disclosure. FIG. 4B is a schematic perspective bottom view of the example valve member 50 shown in FIG. 4A, FIG. 4C is a schematic top view of the example valve member shown in FIG. 4A, and FIG. 4D is a schematic bottom view of the example valve member 50 shown in FIG. 4A.

As shown in FIGS. 4A-4D, in some embodiments, the third axial position P3 of the cavity end 84 of the cavity interior 80 may be substantially axially aligned with the first axial position P1 associated with the seal engaging surface 72, for example, as shown FIG. 4A. As shown in FIG. 4A, the seal engaging surface 72 extends axially from a first axial seal engaging surface position SP1 closest to the second axial position P2 of the cavity opening 82 to a second axial seal engaging surface position SP2, and the third axial position P3 of the cavity end 84 is axially located between the first axial seal engaging surface position SP1 and the second axial seal engaging surface position SP2. Thus, the third axial position P3 falls between the first axial seal engaging surface position SP1 and the second axial seal engaging surface position SP2. Thus, the cavity interior 80 of the embodiment shown in FIG. 4A is relatively shallower and extends a shorter distance into the valve head 68 as compared to the embodiment shown in in FIG. 2E. The embodiment shown in FIG. 4A still provides a cavity interior 80 that extends between the cavity opening 82 and the cavity end 84, thereby to reduce mass of the valve member 50 and substantially maintain the strength of the valve head 68. For example, the cavity interior 80 may be configured such that the cavity interior 80 is subjected to substantially only compressive forces when force is applied against the exterior side 74 of the valve head 68, which may render the valve member 50 relatively more fatigue-resistant as compared to valve members having other configurations. In some embodiments, the cavity 78 may be one or more of substantially concave or substantially dome-shaped. In some embodiments, the cavity interior 80 may be one or more of substantially concave or substantially dome-shaped. In at least some embodiments consistent with FIGS. 4A-4D, the example configuration of the cavity 78 and/or other portions of the valve member 50 may result in the valve member 50 having one or more of: (1) a relatively reduced mass or weight as compared to other valve members; (2) a relatively higher strength-to-weight ratio as compared to other valve members; (3) a relatively higher fatigue-resistance as compared to other valve members, or (4) relatively more cost-efficient manufacturing and/or shipping as compared to other valve members.

As shown in FIG. 4A, the valve seal 54 may have a center of gravity CG, and the center of gravity CG of the valve seal 54 may have an axial seal position PCG substantially coextensive with the first axial position P1 of the seal engaging surface 72. In embodiments consistent with FIGS. 4A-4D, the cavity interior 80 may extend from the second axial position P2 to the axial seal position PCG, with the third axial position P3 of the cavity end 84 being substantially axially aligned with the axial seal position PCG.

As shown in FIGS. 4A-4D, in some embodiments, the cavity opening 82 may at least partially define a cavity opening perimeter 110, and one or more of guide legs 88 may be connected to the valve head 68 at the cavity opening perimeter 110. In embodiments consistent with FIGS. 4A-4D, in contrast to the embodiment shown in FIGS. 2A-2G, the cavity interior 80 may not include hollow lobes between adjacent guide legs 88. Where not inconsistent with the example embodiment of the valve member 50 shown in FIGS. 2A-2G, embodiments consistent with FIGS. 4A-4D may have one or more similarities and/or characteristics in common with the embodiment shown in FIGS. 2A-2G.

Figure 5A:
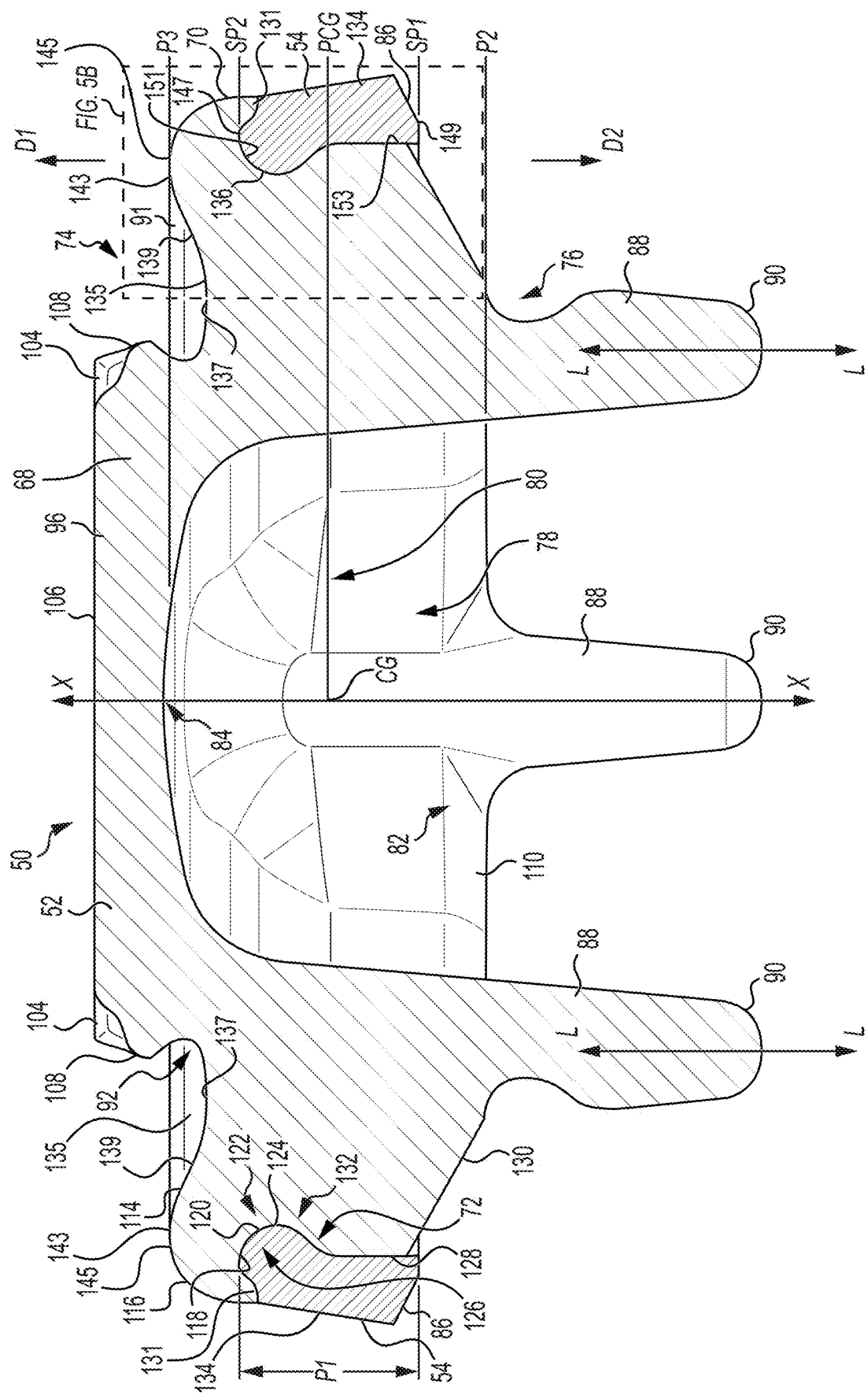
FIG. 5A is a schematic side section view of another example valve member, according to embodiments of the disclosure.
Figure 5B:
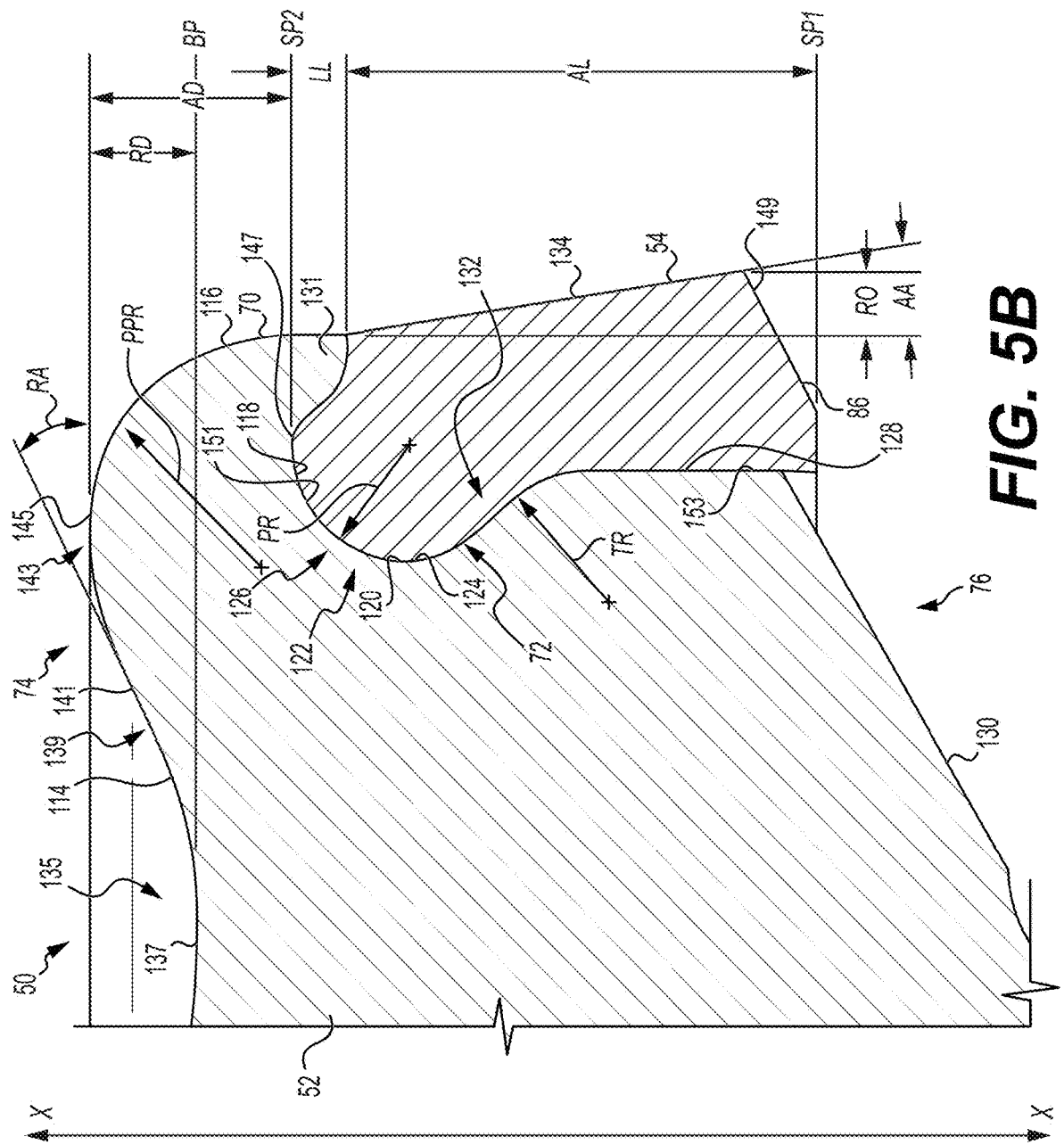
FIG. 5B is a detailed section view of a portion of the example valve member shown in FIG. 5A, according to embodiments of the disclosure.
Figure 5D:
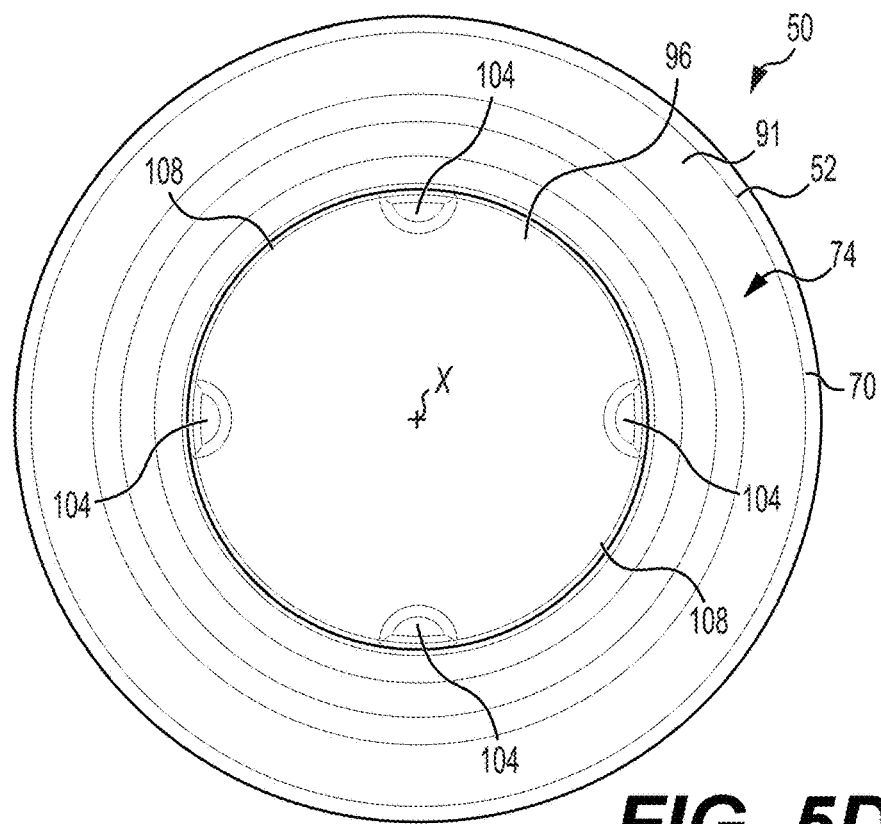
FIG. 5D is a schematic top view of the example valve member shown in FIG. 5A, according to embodiments of the disclosure.
Figure 5E:
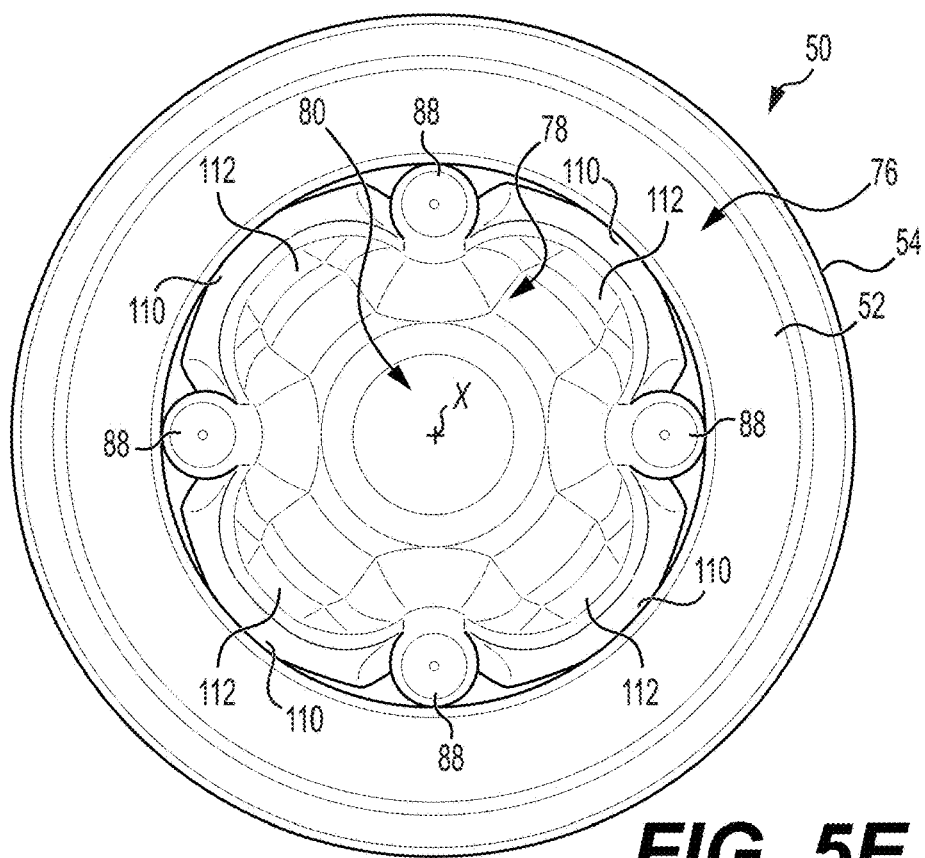
FIG. 5E is a schematic bottom view of the example valve member shown in FIG. 5A, according to embodiments of the disclosure.

FIG. 5A is a schematic side section view of another example valve member 50, according to embodiments of the disclosure. FIG. 5B is a detailed section view of a portion of the example valve member 50 shown in FIG. 5A, FIG. 5C is a schematic perspective bottom view of the example valve member 50 shown in FIG. 5A, FIG. 5D is a schematic top view of the example valve member shown in FIG. 5A, and FIG. 5E is a schematic bottom view of the example valve member 50 shown in FIG. 4A.

As shown in FIG. 5A, in some embodiments, the valve body 52 defines a longitudinal valve body axis X, an axial cross-section transverse to the valve body axis X (see, e.g., FIG. 5E, which shows a schematic bottom view of an example valve body 52), and a radial cross-section defined by a radial plane extending through the valve body 52 and coextensive with the valve body axis X (see, e.g., FIG. 5A). As shown in FIGS. 5A-5E, the valve body 52 may include a valve head 68. As shown, the valve head 68 may have a substantially circular axial cross-section including a radially outer perimeter 70. The valve head 68 further may have a seal engaging surface 72 positioned to receive the valve seal 54. As shown in, for example, FIG. 5A, the seal engaging surface 72 may be associated with the radially outer perimeter 70 of the valve head 68 and may at least partially face the second direction D2. The seal engaging surface 72 may be located at a first axial position P1 relative to the valve body axis X. In some embodiments, one or more of the valve body 52 or the valve head 68 may comprise (or be formed from) one or more of a polymeric material, a composite material, or a corrosion-resistant alloy. The corrosion-resistant alloy may include any alloy comprising at least about 10.5% chromium.

As shown in FIGS. 5A-5E, the valve head 68 further may have an exterior side 74 facing in a first direction D1 along the valve body axis X, for example, substantially parallel to the valve body axis X. The valve head 68 also may have an interior side 76 facing in a second direction D2 opposite the first direction D1, for example, along the valve body axis X (e.g., substantially parallel to the valve body axis X).

As shown in, for example, FIG. 5A, in some embodiments, the valve head 68 further may have a cavity 78 at least partially defining a cavity interior 80. The cavity interior 80 may extend between a cavity opening 82 and a cavity end 84, for example, as shown in FIG. 5A. In some embodiments, the cavity opening 82 may be axially positioned at a second axial position P2 relative to the valve body axis X, and the cavity end 84 may be axially positioned at a third axial position P3 relative to the valve body axis X, for example, as shown in FIG. 5A. According to some embodiments, this example configuration may result in reducing the mass of the valve member 50 and substantially maintaining the strength of the valve head 68. In some embodiments, the cavity 78 may be one or more of substantially concave or substantially dome-shaped. In some embodiments, the cavity interior 80 may be one or more of substantially concave or substantially dome-shaped. In some embodiments, the cavity end 84 may be located at a most axially remote extent of the cavity interior (e.g., from the second axial position P2 of the cavity opening 82) and/or a cavity apex.

For example, as shown in FIG. 5A, the cavity opening 82 may face in the second direction D2 along the valve body axis X. In some embodiments, the cavity interior 80 may extend from the second axial position P2 and at least partially overlap the first axial position P1 associated with the axial position of the seal engaging surface 72. For example, in some embodiments, the cavity interior 80 may extend between the cavity opening 82 and a cavity end 84, with the cavity interior 80 extending from the cavity opening 82 at the second axial position P2 spaced from the first axial position P1 of the seal engaging surface 72 relative to the valve body axis X and to at least an axial mid-point of the first axial position P1 to the cavity end 84 at the third axial position P3 relative to the valve body axis X. For example, the cavity interior 80 may extend from the second axial position P2 beyond the first axial position P1 to the third axial position P3, and the third axial position P3 may be opposite the second axial position P2 relative to the first axial position P1, for example, being on the opposite side of the first axial position P1 of the seal engaging surface 72 from the second axial position P2, for example, as shown in FIG. 5A.

As shown in FIG. 5A, in some embodiments, the seal engaging surface 72 may extend axially from a first axial seal engaging surface position SP1 closest to the second axial position P2 of the cavity opening 82 to a second axial seal engaging surface position SP2. In some embodiments, as shown in FIG. 5A, the third axial position P3 of the cavity end 84 may be axially located between the first axial seal engaging surface position SP1 and the second axial seal engaging surface position SP2.

The valve seal 54 may have a center of gravity CG at an axial seal position PCG relative to the valve body axis X, as shown in FIG. 5A. In at least some such embodiments, the cavity interior 80 of the valve head 68 may extend from the cavity opening 82 at the second axial position P2 to the cavity end 84 at the third axial position P3. For example, the cavity interior 80 may extend from the second axial position P2 to at least the axial seal position PCG, thereby to reduce mass of the valve member 50 and substantially maintain the strength of the valve head 68.

In some embodiments, the axial seal position of the center of gravity PCG of the valve seal 54 may be coextensive with the first axial position P1 of the seal engaging surface 72. For example, the axial seal position of the center of gravity PCG of the valve seal 54 may be axially positioned between (and in some embodiments, including) the first axial seal engaging surface position SP1 and the second axial seal engaging surface position SP2, for example, as shown in FIG. 5A. In at least some embodiments consistent with FIGS. 5A-5E, the example configuration of the cavity 78 and/or other portions of the valve member 50 may result in the valve member 50 having one or more of: (1) a relatively reduced mass or weight as compared to other valve members; (2) a relatively higher strength-to-weight ratio as compared to other valve members; (3) a relatively higher fatigue-resistance as compared to other valve members, or (4) relatively more cost-efficient manufacturing and shipping as compared to other valve members.

As shown in FIG. 5A, in some embodiments, the valve seal 54 may include a seat engaging surface 86 positioned to abut the seat surface 62 of the valve seat 56 (see, e.g., FIG. 2A), thereby to prevent fluid flow through the valve assembly 48 in the closed condition. For example, the seat engaging surface 86 of the valve seal 54 and the seat surface 62 of the valve seat 56 may be configured to prevent fluid flow through the opening 60 in the valve seat 56. The seat engaging surface 86 may be substantially annular and may extend in a direction oblique with respect to the valve body axis X and, in some embodiments, the seat surface 62 of the valve seat 56 may be substantially annular and may extend in a direction substantially parallel to the seat engaging surface 86, or within a range of acute angles of being substantially parallel.

As shown in FIGS. 5A, 5C, and 5E, in some embodiments, the valve body 52 further may include a plurality of guide legs 88 extending from the interior side 76 of the valve head 68. In some embodiments, each of the guide legs 88 may at least partially define a guide leg axis L and may extend in the second direction D2. The guide legs 88 and the opening 60 in the valve seat 56 may at least partially define one or more flow channels through which fluid flows when the valve member 50 is in an open position. In some embodiments, the guide legs 88 may be positioned and configured to slide axially adjacent the opening 60 in the valve seat 56 as the valve member 50 reciprocates relative to the valve seat 56 during opening and closing of the valve member 50 relative to the valve seat 56. The guide legs 88 may reduce the likelihood or prevent the valve member 50 from becoming misaligned relative to the valve seat 56. For example, as shown in FIG. 2A, the radially outer surfaces of the guide legs 88 opposite the valve head 68 may ride and/or slide along the interior surface of the opening 60 in the valve seat body 58.

In some embodiments, the guide legs 88 may include four guide legs, for example, as shown, although other numbers of guide legs 88 are contemplated, and in embodiments having two or more guide legs 88, the guide legs 88 may arranged symmetrically or asymmetrically, and in some embodiments, the guide legs 88 may be axisymmetric with respect to the valve body axis X (e.g., as shown in FIGS. 5C and 5E). Some embodiments of the valve body 52 may include three guide legs 88.

As shown in FIG. 5A, in some embodiments, the valve head 68 may include an exterior surface 91 facing in a direction away from the valve seal 54, for example, in a direction substantially parallel to the first direction D1. In some embodiments, the exterior surface 91 may at least partially define a spring recess 92, and the valve spring 93 of the valve assembly 48 may have an end abutting the spring recess 92 (e.g., a spring coil abutting the spring recess 92) and biasing the valve member 50 against the valve seat 56, for example, as shown in FIG. 2A. In at least some embodiments consistent with FIGS. 5A-5E, when the valve spring 93 is at least partially compressed, the valve member 50 is separated from the valve seat 56 (see, e.g., FIG. 2A) and opening the valve assembly 48, thereby to allow fluid to pass between the valve seal 54 and the seat surface 62 of the valve seat 56, through the one or more guide legs 88 of the valve body 52, and through the valve assembly 48. The valve spring 93 may be selected to provide a biasing force to close the valve assembly 48, for example, to maintain the seat engaging surface 86 of the valve seal 54 against the seat surface 62 of the valve seat 56 until fluid pressure of fluid pressing against the valve member 50 reaches a predetermined magnitude and overcomes the biasing force, thereby moving the valve member 50 to the open position and allowing fluid to flow through the valve assembly 48, for example, until the fluid pressure drops below a predetermined magnitude.

As shown in FIGS. 5A and 5D, in some embodiments, the valve member 50 further may include a protrusion 96 extending in the first direction D1 from the exterior side 74 of the valve head 68 opposite the cavity 78. As shown in FIG. 5A, in some embodiments, an interior side 98 of the protrusion 96 may be coexistent with the cavity end 84. In some embodiments, the exterior side 74 of the valve head 68 may at least partially define the exterior surface 91. In some embodiments, the exterior surface 91 may not be generally perpendicular relative to the valve body axis X (see, e.g., FIGS. 5A, 5B, and 7-9).

As shown in FIGS. 5A and 5D, in some embodiments, the exterior side 74 of the valve head 68 may at least partially define a plurality of recesses 104. For example, the protrusion 96 may at least partially define the plurality of recesses 104. The protrusion 96 may extend from the exterior side 74 (e.g., from the exterior surface 91) of the valve head 68 to a remote end 106 of the protrusion 96, and the remote end 106 of the protrusion 96 may at least partially define a protrusion perimeter 108. In some embodiments, the plurality of recesses 104 may be located at the protrusion perimeter 108, for example, as shown. In some embodiments, each of the plurality of recesses 104 may be positioned to receive the distal end 90 of one of the plurality of guide legs 88 of another valve member 50, thereby to facilitate vertical stacking of multiple valve members 50, for example, as shown in FIG. 3, which is a schematic perspective section view of two of the example valve members 50 shown in FIG. 2B in an example stacked relationship, according to embodiments of the disclosure. Although the embodiments shown include four recesses 104, other numbers of recesses are contemplated, such as three, five, or more, depending, for example, on the number and configuration of the guide legs 88. The combination of the recesses 104 and the guide legs 88 may result in a relatively more stable stacking arrangement, which may assist with storage and/or shipping of the valve members 50.

As shown in FIGS. 5A, 5C, and 5E, in some embodiments, the cavity opening 82 may at least partially define a cavity opening perimeter 110, and one or more of the plurality of guide legs 88 may be connected to the valve head 68 at the cavity opening perimeter 110. In some embodiments, the cavity interior 80 may at least partially define an axial cross-section of the cavity 78 transverse to the valve body axis X. The axial cross-section of the cavity interior 80 may at least partially define one or more hollow lobes 112 between one or more of adjacent guide legs 88. In some embodiments, for example, as shown in FIGS. 5C and 5E, the valve member 50 may include four guide legs 88, and the axial cross-section of the cavity 78 may at least partially define four hollow lobes 112 between the adjacent guide legs 88, for example, approximating a hollow four-leaf clover-like shape, as shown. Other numbers of hollow lobes 112 are contemplated, depending on, for example, the number of guide legs 88. The hollow lobes 112, in some embodiments, may serve to further decrease the mass of the valve member 50 and substantially maintain the resistance to force applied against the exterior side 74 of the valve head 68, which may render the valve member 50 relatively more fatigue-resistant as compared to valve members having other configurations.

As shown in, for example, FIGS. 5A and 5B, the valve head 68 may have a radial cross-section including a flange face 114 generally facing in the first direction D1. The radial cross-section of the valve head 68 further may include a flange edge 116 extending substantially axially in a direction parallel to, or offset by an acute angle relative to, the valve body axis X. As shown in FIGS. 5A and 5B, the seal engaging surface 72 may at least partially define a radial cross-section, and the radial cross-section of the seal engaging surface 72, in at least some embodiments, may include a return edge 118 extending radially inward from the flange edge 116 and terminating at a neck edge 120 of the seal engaging surface 72 at least partially defined by a neck 122 of the valve body 52. The radial cross-section of the seal engaging surface 72 further may include a pocket edge 124 extending from the neck edge 120, thereby to at least partially form an annular pocket 126 positioned to receive the valve seal 54. The radial cross-section of the seal engaging surface 72 further may include an axial edge 128 extending axially from the pocket edge 124 to a conical edge 130 at least partially defined by the radial cross-section of valve body 52. The conical edge 130 may extend radially inward and obliquely relative to the valve body axis X. In some embodiments, the radial cross-section of the seal engaging surface 72 also may include a seal retainer lip 131 at an intersection between the flange edge 116 and the return edge 118, and the seal retainer lip 131 may extend axially in a direction substantially the same as the second direction D2. For example, as shown in FIG. 5B, the seal retainer lip 131 may define an axial lip length LL generally consistent with an amount of axial overlap between the seal retainer lip 131 and an axial end of the valve seal 54 adjacent the seal retainer lip 131.

As shown in FIG. 5A, for example, some embodiments of the valve seal 54 may be annular and may have a radial cross-section that is substantially complementary to the radial cross-section of the seal engaging surface 72. For example, the radial cross-section of the valve seal 54 may include a valve body engaging surface 132 that substantially follows (and/or conforms to) the radial cross-section of the seal engaging surface 72. The radial cross-section of the valve seal 54 may at least partially define a radially outward facing axial surface 134 intersecting with the seat engaging surface 86, and the seat engaging surface 86 may be connected to the valve body engaging surface 132.

In some embodiments, components of the valve assembly 48, such as the valve body 52, the valve seat 56, and a spring retainer 94 (see, e.g., FIG. 2A), may include, or be formed from, metal, such as, for example, stainless steel and/or other similar metals. In some embodiments, at least the valve member 50 may be formed via a forging process, resulting in a forged material component, which may be relatively stronger than a similar component having a comparable mass or weight, but formed by other processes, such as, for example, casting. In some embodiments, the valve member 50 may be configured in a manner that facilitates formation via forging, for example, having draft angles that facilitate formation via forging. In at least some such examples, the valve member 50 may be formed without the need for significant post-forging machining. In some embodiments, this may result in the valve member 50 having one or more of: (1) a relatively reduced mass or weight as compared to other valve members; (2) a relatively higher strength-to-weight ratio as compared to other valve members; (3) a relatively higher fatigue-resistance as compared to other valve members, or (4) relatively more cost-efficient manufacturing and/or shipping as compared to other valve members. In some embodiments, metallic surfaces of the components may be surface-treated, heat-treated, carburized, nitride-treated, peened, and/or subjected to other surface-treating procedures to increase the durability and/or wear-resistance of the surfaces.

As shown in FIGS. 5A and 5B, for example, in some embodiments, the exterior surface 91 of the valve head 68 may at least partially define a concave portion 135, and the protrusion 96 may extend axially from the concave portion 135 to a remote end 106 spaced from the concave portion 135. For example, as shown in FIG. 5B, in some embodiments, the concave portion 135 may at least partially define a base portion 137 and a ramp portion 139. The base portion 137 may be annular and substantially planar, and ramp portion 139 may be annular and have a ramp cross-section including a ramp edge 141 extending obliquely relative to the valve body axis X. In some embodiments, the ramp edge 141 may extend at a ramp angle RA relative to a radial plane perpendicular to the valve body axis X ranging from about 5 degrees to about 85 degrees, for example, from about 10 degrees to about 75 degrees, from about 20 degrees to about 65 degrees, from about 25 degrees to about 55 degrees, from about 30 degrees to about 45 degrees, from about 20 degrees to about 35 degrees, or from about 25 degrees to about 35 degrees. Other ramp angles RA are contemplated.

As shown in FIG. 5B, for example, in some embodiments, the exterior surface 91 of the valve head 68 further may at least partially define a perimeter portion 143 extending radially outward from the ramp portion 139. The perimeter portion 143 may be annular, and the base portion 137 and the perimeter portion 143 may at least partially define a recess depth RD between an axial position of the base portion 137 and a perimeter apex 145 of the perimeter portion 143, for example, as shown in FIG. 5B. In some embodiments, the seal engaging surface 72 may have an axial seal engaging length extending axially from the first axial seal engaging surface position SP1 remote from the perimeter portion 143 to the second axial seal engaging surface position SP2 adjacent the perimeter portion 143. In some embodiments, the seal engaging length may be greater than the recess depth RD, for example, as shown in FIG. 5B. In some embodiments, the seal engaging length may be less than or equal to the recess depth RD. In some embodiments, the seal engaging length may be greater than an axial distance AD between the perimeter apex 145 and the second axial seal engaging surface position SP2, for example, as shown in FIG. 5B. In some embodiments, the seal engaging length may be less than or equal to the axial distance AD between the perimeter apex 145 and the second axial seal engaging surface position SP2.

As shown in FIG. 5B, for example, in some embodiments, the perimeter portion 143 may be at least partially convex and may extend from the ramp portion 139 to the radially outer perimeter 70 of the valve head 68. As shown, a cross-section of the perimeter portion 143 may at least partially define a perimeter portion radius PPR, and the perimeter portion radius PPR may at least partially define the substantially convex annular surface. In some embodiments, the radially outer perimeter 70 of the valve head 68 may at least partially define the seal retainer lip 131. The seal retainer lip 131 may be annular and may at least partially define a portion of the seal engaging surface 72.

In at least some embodiments consistent with FIGS. 5A-5E, the seal engaging surface 72 may at least partially define a radial cross-section, and the radial cross-section of the seal engaging surface 72 may include one or more of a return edge 118, a pocket edge 124, or an axial edge 128, for example, as shown in FIG. 5B. In some embodiments, the return edge 118 may extend radially inward from the radially outer perimeter 70 of the valve head 68 and terminate at a neck edge 120 of the seal engaging surface 72 at least partially defined by the neck 122 of the valve body 68. In some embodiments, the pocket edge 124 may extend from the neck edge 120, thereby to at least partially form an annular pocket 126 positioned to receive a corresponding portion of the valve seal 54. In some embodiments, the axial edge 128 may extend axially from the pocket edge 124 to a conical edge 130 at least partially defined by the radial cross-section of valve body 52. In some embodiments, the conical edge 130 may extend radially inward and obliquely relative to the valve body axis X. In some embodiments, as shown in FIG. 5B, the radial cross-section of the seal engaging surface 72 further may include the seal retainer lip 131 at an intersection between the radially outer perimeter 70 and the return edge 118, and the seal retainer lip 131 may extend generally axially in the second direction D2.

As shown in FIG. 5B, for example, in some embodiments, the pocket edge 124 may at least partially define a pocket radius PR, and the pocket radius PR may at least partially define a substantially concave annular surface. In some embodiments, one or more of the pocket edge 124 or the axial edge 128 may at least partially defines a transition radius TR connecting the pocket edge 124 and the axial edge 128 to one another, and the transition radius TR may at least partially define a substantially convex annular surface, for example, as shown in FIG. 5B. In some embodiments, the pocket radius PR and the transition radius TR may be substantially equal, for example, as shown in FIG. 5B. In some embodiments, the pocket radius PR may be greater than the transition radius TR, and in some embodiments, the pocket radius PR may be less than the transition radius TR. In some embodiments, for example as shown in FIG. 5B, the perimeter portion radius PPR may be greater than the pocket radius PR and/or the transition radius TR. For example, the perimeter portion radius PPR may range from about 25 percent greater to about 100 percent greater than the pocket radius PR and/or the transition radius TR, for example, from about 40 percent greater to about 90 percent greater, from about 50 percent greater to about 80 percent greater, or from about 50 percent greater to about 70 percent greater than the pocket radius PR and/or the transition radius TR. Other relative radii magnitudes are contemplated.

As shown in FIG. 5B, for example, in some embodiments, the base portion 137 of the concave portion 135 of the valve head 68 may have an axial base position BP relative to the valve body axis X, and the third axial position P3 (see FIG. 5A) of the cavity end 84 may be opposite the second axial position P2 of the cavity opening 82 relative to the axial base position BP of the base portion 137. In some embodiments, the third axial position SP3 of the cavity end 84 may be substantially axially aligned with the axial base position BP of the base portion 137, and in some embodiments, the axial base position BP of the base portion 137 may be located axially between the second axial position SP2 of the cavity opening 82 and the third axial position SP3 of the cavity end 84.

In some embodiments, as shown in FIG. 5A, the seal engaging surface 72 may have an axial seal engaging length extending axially from the first axial seal engaging surface position SP1 to the second axial seal engaging surface position SP2, and the cavity 78 may have an axial cavity length extending between the second axial position P2 of the cavity opening 82 to the third axial position P3 of the cavity end 84. In some embodiments, the seal engaging length may range from about 25 percent to about 95 percent of the axial cavity length, for example, from about 30 percent to about 90 percent of the axial cavity length, from about 40 percent to about 80 percent of the axial cavity length, or from about 50 percent to about 70 percent of the axial cavity length. Other percentage ranges are contemplated.

In some embodiments, for example, as shown in FIG. 5B, the seal engaging surface 72 may be located on the interior side 76 of the valve head 68 and may be radially interior relative the radially outer perimeter 70 of the valve head 68. As shown, in some embodiments, the valve seal 54 may extend generally in the second direction D2 axially from a first axial seal end 147 to a second axial seal end 149. As shown in FIG. 5B, the valve seal 54 may have a seal cross-section, when the valve seal 54 is engaged with the valve head 68 at the seal engaging surface 72, and the seal cross-section may have an axial seal edge 134 extending obliquely relative to the valve body axis X. For example, the axial seal edge 134 may extend at an acute angle AA relative to the valve body axis X ranging from about 5 degrees to about 45 degrees, thereby to create a radial offset RO relative to the radially outer perimeter 70 of the valve head 68, as shown in FIG. 5B. As shown in FIG. 5B, the first axial seal end 147 may have a first outer seal diameter when the valve seal 54 is engaged with the valve head 68, and the first outer seal diameter may be substantially equal to a perimeter diameter of the radially outer perimeter 70 of the valve head 68 at a first end 151 of the seal engaging surface 72. The second axial seal end 149 adjacent a second end 153 of the seal engaging surface 72 may have a second outer seal diameter, when the valve seal 54 is engaged with the valve head 68, and the second outer seal diameter may be greater than the first outer seal diameter, for example, as shown in FIG. 5B. In some embodiments, the second outer seal diameter may be less than or equal to the first outer seal diameter. As shown in, for example, FIG. 5B, an inner diameter of the valve seal 54, when the valve seal 54 is engaged with the valve head 68 at the seal engaging surface 72, may substantially conform to the seal engaging surface 72.

As shown in FIG. 5B, for example, in some embodiments, the cross-section of the valve seal 54, when engaged with the seal engaging surface 72 of the valve head 68, may define an axial length AL corresponding generally to the length of a portion of the valve seal 54 in a direction substantially parallel to the valve body axis X that is facing radially outward from the valve head 68. As shown, in some embodiments, the axial length of the valve seal 54, when engaged with the seal engaging surface 72 of valve head 68, may generally equal to the sum of the lip length LL of the seal retainer lip 131 and the axial length AL, as shown in FIG. 5B. In some embodiments, the ratio of the axial length of the valve seal 54 to the axial distance between the cavity opening 82 at the second axial position P2 and the cavity end 84 at the third axial position P3 may range from about 0.25 to about 0.95, for example, from about 0.30 to about 0.90, from about 0.40 to about 0.80, from about 0.50 to about 0.70, or from about 0.50 to about 0.60. Other ranges of ratios of the axial length of the valve seal 54 to the axial distance between the cavity opening 82 and the cavity end 84 are contemplated.

In at least some embodiments consistent with FIGS. 5A-5E, the cavity 78 in the valve head 68, the concave portion 135 of the exterior surface 91 of the valve head 68, and/or the combination thereof may reduce the amount of material and weight of the valve member 50, while substantially maintaining the strength of the valve member 50. In at least some embodiments, the concave portion 135 further may contribute to the reduction of material and weight of the valve member 50, while providing relatively improved support and/or engagement between the valve head 68 and the valve seal 54. This, in turn, may provide support sufficient for the valve seal 54 to have a relatively extended axial length. The extended axial length of the valve seal 54, in at least some embodiments, may increase the surface area of contact between the valve head 68 (e.g., via the seal engaging surface 72) and the valve seal 54, for example, an engagement such as shown in FIGS. 5A and 5B. This may improve the integrity of the engagement between the valve seal 54 and valve head 68, which also may improve the durability of the valve seal 54, for example, due at least in part to the extended axial support of the valve seal 54. The axial length of the engagement also may provide a relatively improved seal between the valve seal 54 and a valve seat 56 (FIG. 2A) against which the valve seal 54 closes. In at least some embodiments consistent with FIGS. 5A-5E, the cavity 78 also may define one or more hollow lobes 112 between adjacent guide legs 88, further reducing the amount of material and the weight of the valve member 50, while substantially maintaining the strength of the valve member 50.

In at least some embodiments consistent with FIGS. 5A-5E, the valve head 68 may include the axially extending seal retainer lip 131, which may serve to increase the integrity of the engagement between the valve seal 54 and the valve head 68, for example, by providing a mechanical engagement between the valve seal 54 and the valve head 68, which may provide resistance to radially outward expansion of the valve seal 54 when the valve seal 54 is pressed against the valve seat 56 (FIG. 2A) upon closing of the valve member 50. In some embodiments, the cross-section of the seal engaging surface 72 further may contribute to the integrity of the engagement between the valve seal 54 and the valve head 68. For example, as shown in FIGS. 5A and 5B, the cross-section of the seal engaging surface 72 of the valve head 68 may be generally serpentine, thus providing a further positive mechanical engagement to secure the valve seal 54 to the valve head 68. For example, in some embodiments, the combination of the seal retainer lip 131 followed by the concave annular pocket 126 may act to secure the valve seal 54 relative to the valve head 68 in the radial direction and/or the axial direction.

In at least some embodiments consistent with FIGS. 5A-5E, the guide legs 88 may each extend in the axial direction from the cavity opening perimeter 110 of the cavity 78, rather than, for example, extending radially as well as axially from a centrally located support stem. Consistent with at least some embodiments, by eliminating such a support stem and related structure, the amount of material and weight of the valve member 50 may be further reduced, while substantially maintaining the functionality of the guide legs 88, for example, in particular, to assist with maintaining the proper orientation of the valve member 50 relative to the valve seat 56 (FIG. 2A) as the valve member 50 reciprocates.

In at least some embodiments consistent with FIGS. 5A-5E, the valve member 50 may include a protrusion 96 extending axially from the concave portion 135 of the valve head 68. The protrusion 96, in at least some embodiments, may substantially maintain a centrally located position of the end of a valve spring 93 that contacts the valve member 50 (FIG. 2A). At least a portion of the end coil of the valve spring 93 may fit around the protrusion 96. In some embodiments, the remote end 106 of the protrusion 96 may include recesses 104 (e.g., four recesses 104). As shown in FIG. 3, in some embodiments, the recesses 104 may be positioned to receive distal ends 90 of respective guide legs 88 of another valve member 50 for stacking. This may relatively improve and/or stabilize the stacking of multiple valve members 50, for example, thereby to facilitate improved storage and/or shipping of the valve members 50.

Figure 6:
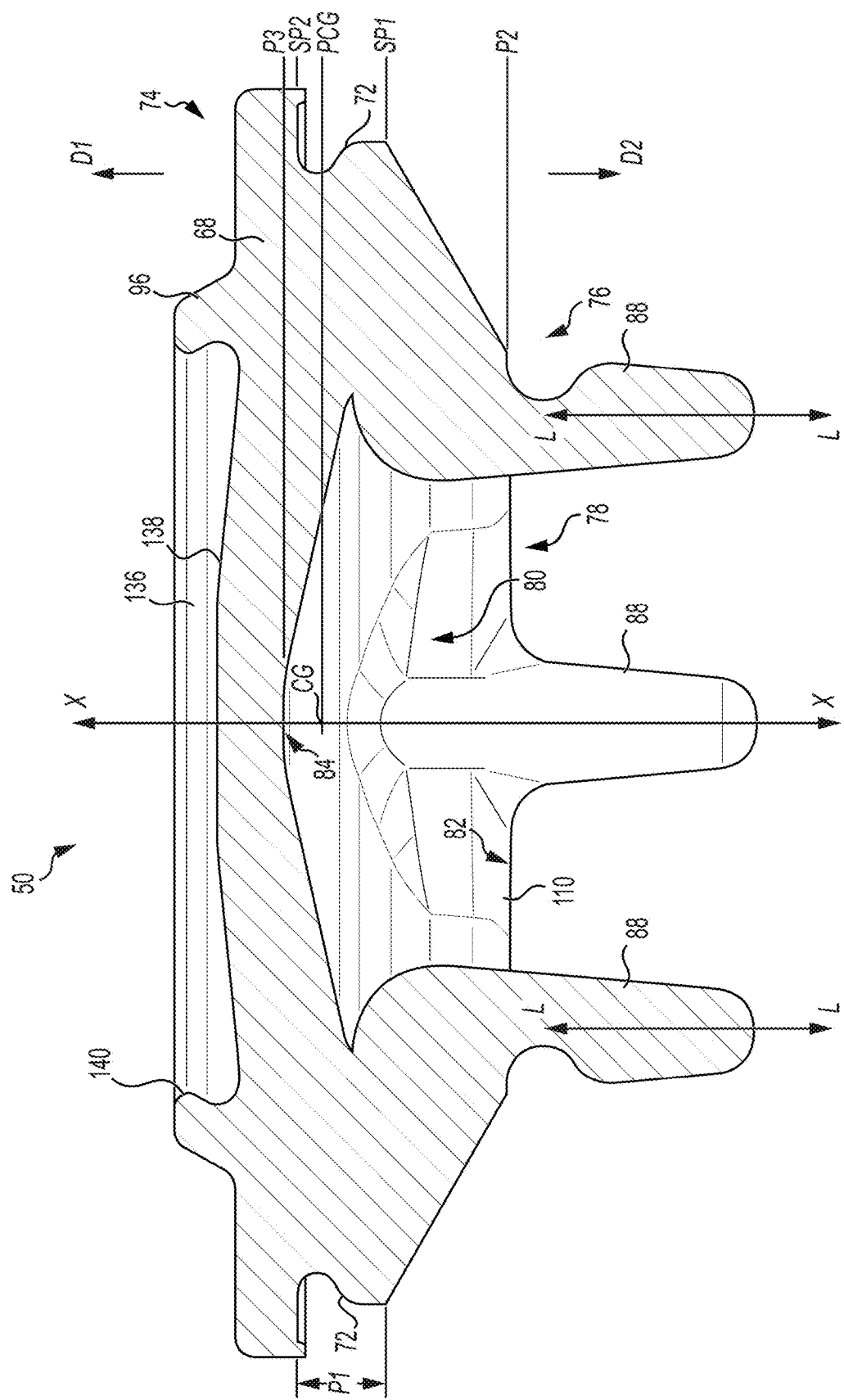
FIG. 6 is a schematic side section view of another example valve member, according to embodiments of the disclosure.

FIG. 6 is a schematic side section view of another example valve member 50, according to embodiments of the disclosure. In embodiments consistent with FIG. 6, the cavity opening 82 faces in the second direction D2 along the valve body axis X. As shown, the cavity interior 80 of the valve head 68 may extend from the second axial position P2 of the cavity opening 82 beyond the first axial position P1 of the seal engaging surface 72 to the third axial position P3 of the cavity end 84, for example, with the third axial position P3 being opposite the second axial position P2 relative to the first axial position P1. In addition, embodiments consistent with FIG. 6 may include a protrusion 96 extending in the first direction D1 from the exterior side 74 of the valve head 68 opposite the cavity 78. In some embodiments, the protrusion 96 may at least partially define a recess 136 having a recess base 138. The recess base 138 may have an at least partially convex surface, and the recess 136 may at least partially define an annular recess lip 140 extending radially inward, for example, as shown. In at least some embodiments consistent with FIG. 6, the example configuration of the cavity 78 and/or other portions of the valve member 50 may result in the valve member 50 having one or more of: (1) a relatively reduced mass or weight as compared to other valve members; (2) a relatively higher strength-to-weight ratio as compared to other valve members; (3) a relatively higher fatigue-resistance as compared to other valve members, or (4) relatively more cost-efficient manufacturing and/or shipping as compared to other valve members. Where not inconsistent with the example embodiment of the valve member 50 shown in FIGS. 2A-2G, embodiments consistent with FIG. 6 may have one or more similarities and/or characteristics in common with the embodiment shown in FIGS. 2A-2G.

Figure 7:
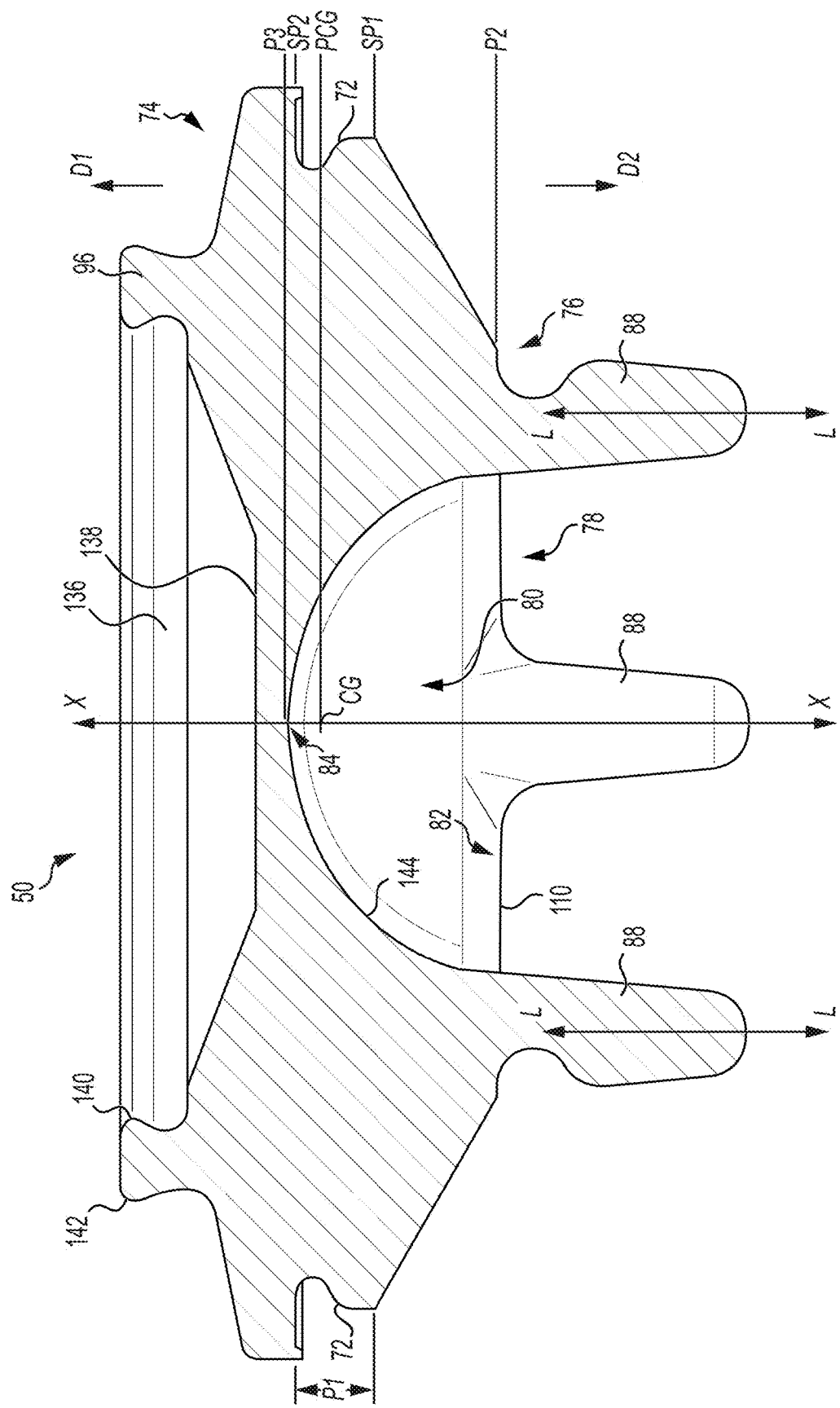
FIG. 7 is a schematic side section view of another example valve member, according to embodiments of the disclosure.

FIG. 7 is a schematic side section view of another example valve member 50, according to embodiments of the disclosure. In embodiments consistent with FIG. 7, the cavity opening 82 faces in the second direction D2 along the valve body axis X. As shown in FIG. 7, the cavity interior 80 may extend from the second axial position P2 of the cavity opening 82 beyond the first axial position P1 associated with the seal engaging surface 72 to the third axial position P3 of the cavity end 84, with the third axial position P3 being opposite the second axial position P2 relative to the first axial position P1. The valve member 50 further may include a protrusion 96 extending in the first direction D1 from the exterior side 74 of the valve head 68 opposite the cavity 78. In some embodiments, the protrusion 96 may at least partially define a recess 136 having a recess base 138, with the recess base 138 having an at least partially concave surface. In some embodiments, as shown in FIG. 7, the recess 136 may at least partially define a first annular recess lip 140, with the first annular recess lip 140 extending radially inward. The protrusion 96 may at least partially define a second annular recess lip 142, with the second annular recess lip 142 extending radially outward. In some embodiments, as shown, a radial cross-section of the cavity interior 80 may at least partially define a substantially semi-circular cavity 144, for example, as shown in FIG. 7. In at least some embodiments consistent with FIG. 7, the example configuration of the cavity 78 and/or other portions of the valve member 50 may result in the valve member 50 having one or more of: (1) a relatively reduced mass or weight as compared to other valve members; (2) a relatively higher strength-to-weight ratio as compared to other valve members; (3) a relatively higher fatigue-resistance as compared to other valve members, or (4) relatively more cost-efficient manufacturing and/or shipping as compared to other valve members. Where not inconsistent with the example embodiment of the valve member 50 shown in FIGS. 2A-2G, embodiments consistent with FIG. 7 may have one or more similarities and/or characteristics in common with the embodiment shown in FIGS. 2A-2G.

Figure 8:
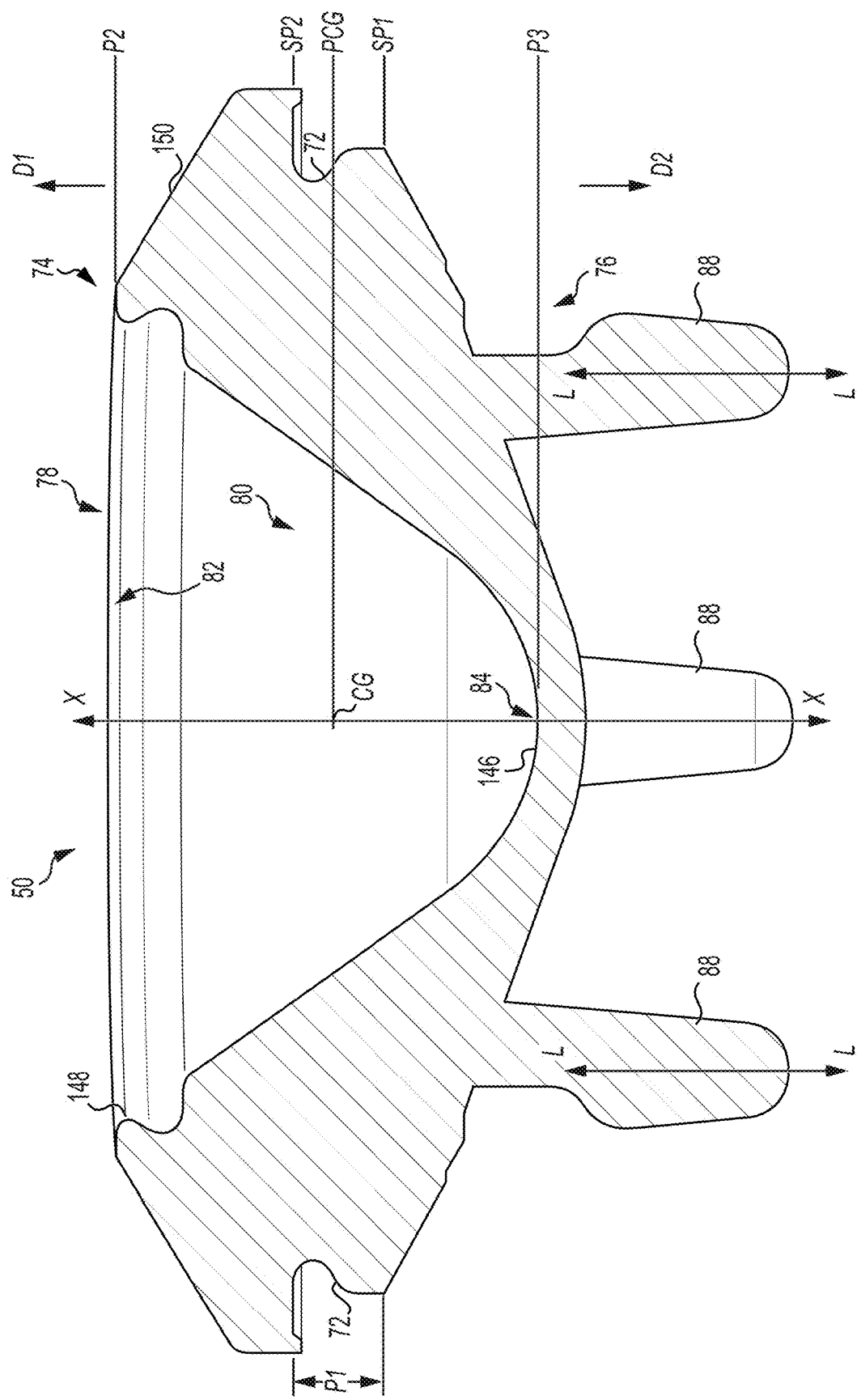
FIG. 8 is a schematic side section view of another example valve member, according to embodiments of the disclosure.

FIG. 8 is a schematic side section view of another example valve member 50, according to embodiments of the disclosure. In embodiments consistent with FIG. 8, the cavity opening 82 may face in the first direction D1 along the valve body axis X, for example, instead of facing the second direction D2. In at least some such embodiments, the cavity interior 80 may extend from the second axial position P2 of the cavity opening 82 beyond the first axial position P1 of the seal engaging surface 72 of the valve head 68 to the third axial position P3 of the cavity end 84, for example, with the third axial position P3 being opposite the second axial position P2 relative to the first axial position P1. In at least some such embodiments, the cavity interior 80 may at least partially define an at least partially concave surface, for example, as shown. The cavity interior 80 may at least partially define a conical surface having a rounded base 146. In some embodiments, the interior side 76 of the valve head 68 may be at least partially convex. In some embodiments, the cavity opening 82 may at least partially define an annular lip 148, and the annular lip 148 may extend radially inward. As shown in FIG. 8, some embodiments of the valve head 68 further may include a substantially conical surface 150 extending radially outward from the cavity opening 82 to the radially outer perimeter 70 of the valve head 68. In at least some embodiments consistent with FIG. 8, the example configuration of the cavity 78 and/or other portions of the valve member 50 may result in the valve member 50 having one or more of: (1) a relatively reduced mass or weight as compared to other valve members; (2) a relatively higher strength-to-weight ratio as compared to other valve members; (3) a relatively higher fatigue-resistance as compared to other valve members, or (4) relatively more cost-efficient manufacturing and/or shipping as compared to other valve members. Where not inconsistent with the example embodiment of the valve member 50 shown in FIGS. 2A-2G, embodiments consistent with FIG. 8 may have one or more similarities and/or characteristics in common with the embodiment shown in FIGS. 2A-2G.

FIG. 9 is a schematic partial side section view of another example valve member 50, according to embodiments of the disclosure. As shown in FIG. 9, in some embodiments, the seal engaging surface 72 may be located on the interior side 76 of the valve head 68, and may be radially interior relative the radially outer perimeter 70 of the valve head 68. In some embodiments, for example, as shown, the interior side 76 of the valve head 68 may at least partially define an interior truncated conical surface 152 extending radially inward from the radially outer perimeter 70 of the valve head 68 toward the valve body axis X. In at least some such embodiments, the seal engaging surface 72 may at least partially define an annular recess 154 in the interior truncated conical surface 152. In some embodiments consistent with FIG. 9, the exterior side 74 of the valve head 68 may at least partially define a recess 156 and an annular recess lip 158, with the annular recess lip 158 extending radially inward. The exterior side 74 of the valve head 68 may at least partially define an exterior truncated conical surface 160 extending radially outward from the annular recess lip 158 toward the radially outer perimeter 70 of the valve head 68.

In at least some embodiments consistent with FIG. 9, the example configuration of the cavity 78 and/or other portions of the valve member 50 may result in the valve member 50 having one or more of: (1) a relatively reduced mass or weight as compared to other valve members; (2) a relatively higher strength-to-weight ratio as compared to other valve members; (3) a relatively higher fatigue-resistance as compared to other valve members, or (4) relatively more cost-efficient manufacturing and/or shipping as compared to other valve members. Where not inconsistent with the example embodiment of the valve member 50 shown in FIGS. 2A-2G, embodiments consistent with FIG. 9 may have one or more similarities and/or characteristics in common with the embodiment shown in FIGS. 2A-2G.

According to some embodiments, a method for increasing a strength-to-weight ratio of a valve member for a high-power pump may include positioning a valve head of the valve member, such that the valve head includes a cavity having a cavity interior extending from a cavity opening to a cavity end. In some embodiments, the cavity may be one or more of substantially concave or substantially dome-shaped. In some embodiments, the cavity interior may be one or more of substantially concave or substantially dome-shaped. The method further may include positioning the cavity interior, such that the cavity opening is spaced from a seal engaging surface of the valve head and the cavity end is one of: (a) substantially aligned with the seal engaging surface or (b) on an opposite side of the seal engaging surface relative to the cavity opening. In some embodiments, the method further may include providing a plurality of guide legs on a first side of the valve head adjacent the cavity opening. In some embodiments, providing the plurality of guide legs may include providing the plurality of guide legs adjacent a perimeter of the cavity opening and spaced from the cavity interior. Providing the plurality of guide legs may include, in some embodiments, substantially aligning the guide legs with a valve body axis of the valve member. In some embodiments, the method also may include providing a plurality of recesses in a second side of the valve head opposite the first side of the valve head. In some embodiments, the method further may include providing a plurality of hollow lobes between adjacent guide legs. In some embodiments, the cavity opening may open from a first side of the valve head, and the method may include providing a plurality of guide legs on a second side of the valve head opposite the first side of the valve head. In some embodiments, the method may include associating a valve seal with the valve engaging surface of the valve head. The valve seal may have a center of gravity, and the method further may include providing the cavity interior, such that the cavity opening is spaced from the center of gravity of the valve seal and the cavity end is one of: (a) substantially aligned with the center of gravity of the valve seal or (b) on an opposite side of the center of gravity of the valve seal relative to the cavity opening. In some embodiments, providing the valve head may include forging the valve member to form a forged valve member. The method also may include, in some embodiments, machining portions of the forged valve member.

Having now described some illustrative embodiments of the disclosure, it should be apparent to those skilled in the art that the foregoing is merely illustrative and not limiting, having been presented by way of example only. Numerous modifications and other embodiments are within the scope of one of ordinary skill in the art and are contemplated as falling within the scope of the disclosure. In particular, although many of the examples presented herein involve specific combinations of method acts or system elements, it should be understood that those acts and those elements may be combined in other ways to accomplish the same objectives. Those skilled in the art should appreciate that the parameters and configurations described herein are exemplary and that actual parameters and/or configurations will depend on the specific application in which the systems, methods, and/or aspects or techniques of the disclosure are used. Those skilled in the art should also recognize or be able to ascertain, using no more than routine experimentation, equivalents to the specific embodiments of the disclosure. It is, therefore, to be understood that the embodiments described herein are presented by way of example only and that, within the scope of any appended claims and equivalents thereto, the disclosure may be practiced other than as specifically described.

This U.S. non-provisional patent application claims priority to and the benefit of U.S. Provisional Application No. 63/518,840, filed Aug. 10, 2023, titled "VALVE MEMBER INCLUDING CAVITY, AND RELATED ASSEMBLIES, SYSTEMS, AND METHODS," the disclosure of which is incorporated herein by reference in its entirety.

Furthermore, the scope of the present disclosure shall be construed to cover various modifications, combinations, additions, alterations, etc., above and to the above-described embodiments, which shall be considered to be within the scope of this disclosure. Accordingly, various features and characteristics as discussed herein may be selectively interchanged and applied to other illustrated and non-illustrated embodiment, and numerous variations, modifications, and additions further may be made thereto without departing from the spirit and scope of the present disclosure as set forth in the appended claims.

What is claimed is:

1. A valve member for a high-power pump, the valve member comprising:
   a valve body defining a valve body axis, an axial cross-section transverse to the valve body axis, and a radial cross-section defined by a radial plane extending through the valve body and coextensive with the valve body axis, the valve body including:
   (a) a valve head having:
      a substantially circular axial cross-section including a radially outer perimeter,
      a seal engaging surface associated with the radially outer perimeter and having a first axial position relative to the valve body axis, the first axial position extending axially from a first axial seal engaging surface position to a second axial seal engaging surface position,
      an exterior side facing in a first direction along the valve body axis,
      an interior side facing in a second direction opposite the first direction, and
      a cavity at least partially defining a cavity interior, the cavity interior extending between a cavity opening and a cavity end, the cavity interior extending from the cavity opening at a second axial position spaced from the first axial position of the seal engaging surface relative to the valve body axis and to at least an axial mid-point of the first axial position to the cavity end at a third axial position relative to the valve body axis, the cavity opening facing in the second direction along the valve body axis and at least partially defining a cavity opening perimeter; and
   (b) a plurality of guide legs extending from the interior side of the valve head, each of the plurality of guide legs at least partially defining a guide leg axis extending in the second direction, one or more of the plurality of guide legs connected from the cavity opening perimeter to the valve head.

2. The valve member of claim 1, wherein one of:
   (a) the cavity interior extends from the second axial position and at least partially overlaps the first axial position,
   (b) the cavity interior extends from the second axial position beyond the first axial position to the third axial position, the third axial position being opposite the second axial position relative to the first axial position,
   (c) the cavity interior is configured such that the cavity interior is subjected to substantially only compressive forces when force is applied against the exterior side of the valve head, or
   (d) a radial cross-section of the cavity interior at least partially defines a substantially semi-circular cavity.

3. The valve member of claim 2, wherein:
   the cavity interior extends from the second axial position beyond the first axial position to the third axial position, the third axial position being axially opposite the second axial position relative to the first axial position,
   the valve member further comprises a protrusion extending in the first direction from the exterior side of the valve head opposite the cavity, and
   one of:

(a) the protrusion at least partially defines a recess having a recess base, the recess base having an at least partially convex surface, the recess at least partially defining an annular recess lip, and the annular recess lip extending radially inward, or (b) the protrusion at least partially defines a recess having a recess base, the recess base having an at least partially concave surface, the recess at least partially defining a first annular recess lip and a second annular recess lip, the first annular recess lip extending radially inward and the second annular recess lip extending radially outward.

4. The valve member of claim 1, wherein:
the cavity interior extends from the second axial position beyond the first axial position to the third axial position, the third axial position being opposite the second axial position relative to the first axial position, and
one of:
(a) the third axial position is axially aligned with the axial mid-point of the first axial position associated with the seal engaging surface, or
(b) the third axial position of the cavity end is axially located between the first axial seal engaging surface position and the second axial seal engaging surface position.

5. The valve member of claim 1, wherein
one or more of:
(a) the valve member further comprises a protrusion extending in the first direction from the exterior side of the valve head opposite the cavity,
(b) an interior side of the protrusion is coexistent with the cavity end, or
(c) the exterior side of the valve head at least partially defines an exterior surface, the exterior surface substantially lies in an exterior plane having an axial plane position relative to the valve body axis, and the third axial position of the cavity end is opposite the second axial position of the cavity opening relative to the axial plane position of the exterior surface.

6. The valve member of claim 1, wherein
one or more of:
(a) the each of the plurality of guide legs extends in the second direction, such that one or more of the guide leg axes extends in a direction substantially parallel to the valve body axis,
(b) the cavity interior at least partially defines an axial cross-section of the cavity transverse to the valve body axis, and the axial cross-section of the cavity interior at least partially defines one or more hollow lobes between adjacent guide legs, or
(c) the valve member includes four guide legs, and the axial cross-section of the cavity at least partially defines four hollow lobes between the adjacent guide legs.

7. The valve member of claim 1, wherein:
the valve member further comprises a protrusion extending in the first direction from the exterior side of the valve head opposite the cavity,
each of the plurality of guide legs includes a distal end opposite the interior side of the valve head, and
one or more of:
(a) the protrusion at least partially defines a plurality of recesses, each of the plurality of recesses being positioned to receive a distal end of one of the plurality of guide legs of another valve member, or
(b) the protrusion extends from the exterior side of the valve head to a remote end of the protrusion, the remote end of the protrusion at least partially defining a protrusion perimeter, and a plurality of recesses located at the protrusion perimeter.

8. The valve member of claim 1, wherein the valve head has a radial cross-section including:
a flange face facing the first direction, and
a flange edge extending substantially axially in the first direction.

9. The valve member of claim 8, wherein the seal engaging surface at least partially defines a radial cross-section, the radial cross-section of the seal engaging surface including:
a return edge extending radially inward from the flange edge and terminating at a neck edge of the seal engaging surface at least partially defined by a neck of the valve body,
a pocket edge extending from the neck edge, thereby to at least partially form an annular pocket positioned to receive the valve seal, the pocket edge extending obliquely relative to the valve body axis and radially outward, and
an axial edge extending axially from the pocket edge to a conical edge at least partially defined by the radial cross-section of valve body, the conical edge extending radially inward and obliquely relative to the valve body axis, the radial cross-section of the seal engaging surface further including a seal retainer lip at an intersection between the flange edge and the return edge, the seal retainer lip extending axially in the second direction.

10. The valve member of claim 1, further comprising a valve seal engaged with the seal engaging surface of the valve head, the valve seal having a center of gravity, the center of gravity of the valve seal having an axial seal position coextensive with the first axial position of the seal engaging surface, wherein one of:
(a) the cavity interior extends from the second axial position beyond the axial seal position to the third axial position, the third axial position being opposite the second axial position relative to the axial seal position, or
(b) the cavity interior extends from the second axial position to the axial seal position, the third axial position being substantially axially aligned with the axial seal position.

11. The valve member of claim 1, wherein one or more of:
(a) the cavity is one or more of substantially concave or substantially dome-shaped,
(b) the cavity interior is one or more of substantially concave or substantially dome-shaped,
(c) the cavity end is located at one or more of (i) a most axially remote extent of the cavity interior or (ii) a cavity apex, or
(d) the seal engaging surface is located on the interior side of the valve head and is radially interior relative to the radially outer perimeter of the valve head, and one of:
(i) the exterior side of the valve head at least partially defines a recess and an annular recess lip, the annular recess lip extending radially inward, and the exterior side of the valve head at least partially defining an exterior truncated conical surface extending radially outward from the annular recess lip toward the radially outer perimeter of the valve head, or
(ii) the interior side of the valve head at least partially defines an interior truncated conical surface extending radially inward from the radially outer perimeter of the valve head toward the valve body axis, and the seal engaging surface comprising an annular recess in the interior truncated conical surface.

12. A valve assembly to enhance sealing of a fluid flow in a high-pressure pump assembly, the valve assembly comprising:
   the valve member of claim 1;
   a valve seal engaged with the seal engaging surface of the valve head and having a seat engaging surface; and
   a valve seat including a substantially cylindrical body at least partially defining an opening therethrough and a seat surface, the seat surface being positioned to abut the seat engaging surface of the valve seal to thereby prevent fluid flow through the valve assembly.

13. A fluid end assembly for a high-pressure reciprocating pump, the fluid end assembly comprising:
   a fluid end housing at least partially defining a chamber and a port positioned to provide fluid communication with the chamber; and
   the valve assembly of claim 12 received in the port of the fluid end housing and positioned to control fluid flow through the port.

14. A valve member for a high-power pump, the valve member comprising:
   a valve body defining a valve body axis, an axial cross-section transverse to the valve body axis, and a radial cross-section defined by a radial plane extending through the valve body and coextensive with the valve body axis, the valve body including:
   a valve head having:
      a substantially circular axial cross-section including a radially outer perimeter,
      a seal engaging surface associated with the radially outer perimeter and having a first axial position relative to the valve body axis, the first axial position extending axially from a first axial seal engaging surface position to a second axial seal engaging surface position,
      an exterior side facing in a first direction along the valve body axis,
      an interior side facing in a second direction opposite the first direction, and
      a cavity at least partially defining a cavity interior, the cavity interior extending between a cavity opening and a cavity end, the cavity interior extending from the cavity opening at a second axial position spaced from the first axial position of the seal engaging surface relative to the valve body axis and to at least an axial mid-point of the first axial position to the cavity end at a third axial position relative to the valve body axis,
   the cavity opening facing in the second direction along the valve body axis,
   the valve member further comprising a protrusion extending in the first direction from the exterior side of the valve head opposite the cavity,
   the valve body further comprising a plurality of guide legs extending from the interior side of the valve head, each of the plurality of guide legs including a distal end opposite the interior side of the valve head, and
   one or more of:
      (a) the protrusion at least partially defines a plurality of recesses, each of the plurality of recesses being positioned to receive a distal end of one of the plurality of guide legs of another valve member, or
      (b) the protrusion extends from the exterior side of the valve head to a remote end of the protrusion, the remote end of the protrusion at least partially defining a protrusion perimeter, and a plurality of recesses located at the protrusion perimeter.

15. A valve member for a high-power pump, the valve member comprising:
   a valve body defining a valve body axis, an axial cross-section transverse to the valve body axis, and a radial cross-section defined by a radial plane extending through the valve body and coextensive with the valve body axis, the valve body including:
   a valve head having:
      a substantially circular axial cross-section including a radially outer perimeter,
      a seal engaging surface associated with the radially outer perimeter and having a first axial position relative to the valve body axis, the first axial position extending axially from a first axial seal engaging surface position to a second axial seal engaging surface position,
      an exterior side facing in a first direction along the valve body axis,
      an interior side facing in a second direction opposite the first direction, and
      a cavity at least partially defining a cavity interior, the cavity interior extending between a cavity opening and a cavity end, the cavity interior extending from the cavity opening at a second axial position spaced from the first axial position of the seal engaging surface relative to the valve body axis and to at least an axial mid-point of the first axial position to the cavity end at a third axial position relative to the valve body axis,
   the valve head having: (a) a radial cross-section including a flange face facing the first direction, and (b) a flange edge extending substantially axially in the first direction, and
   the seal engaging surface at least partially defining a radial cross-section, the radial cross-section of the seal engaging surface including:
      (a) a return edge extending radially inward from the flange edge and terminating at a neck edge of the seal engaging surface at least partially defined by a neck of the valve body,
      (b) a pocket edge extending from the neck edge, thereby to at least partially form an annular pocket positioned to receive the valve seal, the pocket edge extending obliquely relative to the valve body axis and radially outward, and
      (c) an axial edge extending axially from the pocket edge to a conical edge at least partially defined by the radial cross-section of valve body, the conical edge extending radially inward and obliquely relative to the valve body axis, the radial cross-section of the seal engaging surface further including a seal retainer lip at an intersection between the flange edge and the return edge, the seal retainer lip extending axially in the second direction.

16. A valve member for a high-power pump, the valve member comprising:
   a valve body defining a valve body axis, an axial cross-section transverse to the valve body axis, and a radial cross-section defined by a radial plane extending through the valve body and coextensive with the valve body axis, the valve body including:
   a valve head having:
      a substantially circular axial cross-section including a radially outer perimeter, a seal engaging surface associated with the radially outer perimeter and having a first axial position relative to the valve body axis, the first axial position extending axially from a first axial seal engaging surface position to a second axial seal engaging surface position, an exterior side facing in a first direction along the valve body axis;

an interior side facing in a second direction opposite the first direction and a cavity at least partially defining a cavity interior, the cavity interior extending between a cavity opening and a cavity end, the cavity interior extending from the cavity opening at a second axial position spaced from the first axial position of the seal engaging surface relative to the valve body axis and to at least an axial mid-point of the first axial position to the cavity end at a third axial position relative to the valve body axis, the cavity opening facing in the second direction along the valve body axis, and one of:
- (a) the cavity interior extends from the second axial position and at least partially overlaps the first axial position,
- (b) the cavity interior extends from the second axial position beyond the first axial position to the third axial position, the third axial position being opposite the second axial position relative to the first axial position,
- (c) the cavity interior is configured such that the cavity interior is subjected to substantially only compressive forces when force is applied against the exterior side of the valve head, or
- (d) a radial cross-section of the cavity interior at least partially defines a substantially semi-circular cavity, the cavity interior extending from the second axial position beyond the first axial position to the third axial position, the third axial position being axially opposite the second axial position relative to the first axial position, the valve member further comprising a protrusion extending in the first direction from the exterior side of the valve head opposite the cavity, and one of:
- (a) the protrusion at least partially defines a recess having a recess base, the recess base having an at least partially convex surface, the recess at least partially defining an annular recess lip, and the annular recess lip extending radially inward, or
- (b) the protrusion at least partially defines a recess having a recess base, the recess base having an at least partially concave surface, the recess at least partially defining a first annular recess lip and a second annular recess lip, the first annular recess lip extending radially inward and the second annular recess lip extending radially outward.

\* \* \* \* \*